(12) United States Patent
Kandele et al.

(10) Patent No.: US 12,143,313 B1
(45) Date of Patent: Nov. 12, 2024

(54) SYSTEM AND METHOD FOR A PIPELINED MULTI-LAYER SWITCHING NETWORK

(71) Applicant: Ceremorphic, Inc., San Jose, CA (US)

(72) Inventors: Suyash Kandele, Bhilai (IN); Sumant Kumar Singh, Bhilai (IN); Joydeep Kumar Devnath, Guwahati (IN); Venkat Mattela, San Jose, CA (US); Govardhan Mattela, Hyderabad (IN); Heonchul Park, Pleasanton, CA (US)

(73) Assignee: Ceremorphic, Inc., San Jose, CA (US)

( * ) Notice: Subject to any disclaimer, the term of this patent is extended or adjusted under 35 U.S.C. 154(b) by 72 days.

(21) Appl. No.: 17/671,569

(22) Filed: Feb. 14, 2022

(51) Int. Cl.
*H04L 49/1546* (2022.01)
*H04L 49/00* (2022.01)

(52) U.S. Cl.
CPC ...... *H04L 49/1546* (2013.01); *H04L 49/3063* (2013.01)

(58) Field of Classification Search
None
See application file for complete search history.

(56) References Cited

U.S. PATENT DOCUMENTS

2013/0088969 A1* 4/2013 Mukherjee .............. H04L 43/12 370/236
2022/0124025 A1* 4/2022 Li ......................... H04L 47/115

* cited by examiner

*Primary Examiner* — Jason E Mattis
*Assistant Examiner* — Bao G Nguyen
(74) *Attorney, Agent, or Firm* — Minisandram Law Firm; Raghunath S. Minisandram

(57) ABSTRACT

A system and method for a switching network is disclosed. A plurality of first switching assemblies, second switching assemblies and intermediate switching assemblies with each of the first switching assemblies, second switching assemblies and intermediate switching assemblies having at least two input ports and output ports is provided. Selective one of the two input ports is configured to receive a data to be processed and delivered at a designated one of the output ports. Received data passes through one or more selective first switching assemblies, one or more intermediate switching assemblies and one or more selective second switching assemblies, before the received data is delivered to the designated port. A plurality of additional data is received in one or more of the input ports to be delivered to one or more designated output ports is processed before the received data is delivered to the designated one of the output ports.

18 Claims, 35 Drawing Sheets

130

| Number of TX/RX ports = n | $\log_2 n$ | $\log_2 n/2$ | Number of layers |
|---|---|---|---|
| 2 | 1 | 0.5 | 1 |
| 4 | 2 | 1 | 1 |
| 8 | 3 | 1.5 | 2 |
| 16 | 4 | 2 | 2 |
| 32 | 5 | 2.5 | 3 |
| 64 | 6 | 3 | 3 |
| 128 | 7 | 3.5 | 4 |
| 256 | 8 | 4 | 4 |
| 512 | 9 | 4.5 | 5 |
| 1024 | 10 | 5 | 5 |

FIGURE 1B

FIRST PASS : TX1 -> OUT1 -> In1 -> SpOt1 -> rewire based on Forward Input Matrix
SECOND PASS : SpIn1 -> OUT1 -> In1 -> U-turn inside Second Switching Assembly THIRD PASS : RvOt1 -> RvIn1 -> SpRvOt1 -> rewire based on Reverse Input Matrix
FOURTH PASS : SpRvIn1 -> RvOt1 -> RvIn1 -> RX2

| Number of TX & RX ports = $n$ | $\log_2 n = P$ | Number of layers = $L$ $L := round(P/2)$ | | Output Transform Matrix | |
|---|---|---|---|---|---|
| | | | | C Columns = $2^L$ | R Rows = $2^{(P-L)}$ |
| 16 | $\log_2 16 = 4$ | $round(4/2)$ | $= round(2) = 2$ | $2^2 = 4$ | $2^{(4-2)} = 2^2 = 4$ |
| 32 | $\log_2 32 = 5$ | $round(5/2)$ | $= round(2.5) = 3$ | $2^3 = 8$ | $2^{(5-3)} = 2^2 = 4$ |
| 64 | $\log_2 64 = 6$ | $round(6/2)$ | $= round(3) = 3$ | $2^3 = 8$ | $2^{(6-3)} = 2^3 = 8$ |
| 128 | $\log_2 128 = 7$ | $round(7/2)$ | $= round(3.5) = 4$ | $2^4 = 16$ | $2^{(7-4)} = 2^3 = 8$ |
| 256 | $\log_2 256 = 8$ | $round(8/2)$ | $= round(4) = 4$ | $2^4 = 16$ | $2^{(8-4)} = 2^4 = 16$ |
| 512 | $\log_2 512 = 9$ | $round(9/2)$ | $= round(4.5) = 5$ | $2^5 = 32$ | $2^{(9-5)} = 2^4 = 16$ |
| 1024 | $\log_2 1024 = 10$ | $round(10/2)$ | $= round(5) = 5$ | $2^5 = 32$ | $2^{(10-5)} = 2^5 = 32$ |
| 2048 | $\log_2 2048 = 11$ | $round(11/2)$ | $= round(5.5) = 6$ | $2^6 = 64$ | $2^{(11-6)} = 2^5 = 32$ |
| 4096 | $\log_2 4096 = 12$ | $round(12/2)$ | $= round(6) = 6$ | $2^6 = 64$ | $2^{(12-6)} = 2^6 = 64$ |
| 8192 | $\log_2 8192 = 13$ | $round(13/2)$ | $= round(6.5) = 7$ | $2^7 = 128$ | $2^{(13-7)} = 2^6 = 64$ |
| 16384 | $\log_2 16384 = 14$ | $round(14/2)$ | $= round(7) = 7$ | $2^7 = 128$ | $2^{(14-7)} = 2^7 = 128$ |
| 32768 | $\log_2 32768 = 15$ | $round(15/2)$ | $= round(7.5) = 8$ | $2^8 = 256$ | $2^{(15-8)} = 2^7 = 128$ |
| 65536 | $\log_2 65536 = 16$ | $round(16/2)$ | $= round(8) = 8$ | $2^8 = 256$ | $2^{(16-8)} = 2^8 = 256$ |

| Number of TX & RX ports = n | P = Log₂ n | No. of Layers L = round (P/2) | # of SAs per layer (#SA = n2) | # of ALs = L-1 | # of SAs in SG in AL #1 = SAL1 | # of SG in AL#1 | # of SAs in SG in AL #2 | # of SG in AL#2 | # of SAs in SG in AL #3 | # of SG in AL#3 | # of SAs in SG in AL #4 | # of SG in AL#4 | # of SAs in SG in AL #5 | # of SG in AL#5 | # of SAs in SG in AL #6 | # of SG in AL#6 | # of SAs in SG in AL #7 | # of SG in AL#7 |
|---|---|---|---|---|---|---|---|---|---|---|---|---|---|---|---|---|---|---|
| 16 | 4 | 2 | 8 | 1 | 2 | 4 | NA | NA | NA | NA | NA | NA | NA | NA | NA | NA | NA | NA |
| 32 | 5 | 3 | 16 | 2 | 2 | 8 | 4 | 4 | NA | NA | NA | NA | NA | NA | NA | NA | NA | NA |
| 64 | 6 | 3 | 32 | 2 | 2 | 16 | 4 | 8 | NA | NA | NA | NA | NA | NA | NA | NA | NA | NA |
| 128 | 7 | 4 | 64 | 3 | 2 | 32 | 4 | 16 | 8 | 8 | NA | NA | NA | NA | NA | NA | NA | NA |
| 256 | 8 | 4 | 128 | 3 | 2 | 64 | 4 | 32 | 8 | 16 | NA | NA | NA | NA | NA | NA | NA | NA |
| 512 | 9 | 5 | 256 | 4 | 2 | 128 | 4 | 64 | 8 | 32 | 16 | 16 | NA | NA | NA | NA | NA | NA |
| 1024 | 10 | 5 | 512 | 4 | 2 | 256 | 4 | 128 | 8 | 64 | 16 | 32 | NA | NA | NA | NA | NA | NA |
| 2048 | 11 | 6 | 1024 | 5 | 2 | 512 | 4 | 256 | 8 | 128 | 16 | 64 | 32 | 32 | NA | NA | NA | NA |
| 4096 | 12 | 6 | 2048 | 5 | 2 | 1024 | 4 | 512 | 8 | 256 | 16 | 128 | 32 | 64 | NA | NA | NA | NA |
| 8192 | 13 | 7 | 4096 | 6 | 2 | 2048 | 4 | 1024 | 8 | 512 | 16 | 256 | 32 | 128 | 64 | 64 | NA | NA |
| 16384 | 14 | 7 | 8192 | 6 | 2 | 4096 | 4 | 2048 | 8 | 1024 | 16 | 512 | 32 | 256 | 64 | 128 | NA | NA |
| 32768 | 15 | 8 | 16384 | 7 | 2 | 8192 | 4 | 4096 | 8 | 2048 | 16 | 1024 | 32 | 512 | 64 | 256 | 128 | 128 |
| 65536 | 16 | 8 | 32768 | 7 | 2 | 16384 | 4 | 8192 | 8 | 4096 | 16 | 2048 | 32 | 1024 | 64 | 512 | 128 | 256 |

FIGURE 6C

FIRST PASS : TX1 -> OUT1(FL) -> In1(IL) -> Out1(IL)-> In1(LL)->SpOt1 -> rewire based on Forward Input Matrix
SECOND PASS : SpIn1 -> OUT1(FL) -> In1(IL) -> Out1(IL)->In1(LL)-> U-turn inside Second Switching Assembly THIRD PASS: RvOt1(LL) -> RvIn1(IL)->RvOt1(IL)->RvIn1(FL) -> SpRvOt1-> rewire based on Reverse Input Matrix
FOURTH PASS : SpRvIn1 -> RvOt1(LL) -> RvIn1(IL) ->RvOt1(IL)->RvIn1(FL)-> RX1

| | | SFSR | | FRSR | | |
|---|---|---|---|---|---|---|
| Clock | I/P | F1-F4 | F5-F8 | DL1-R7-R5 | R4-R1 | O/P |
| 0 | D1 | D1 | | | | |
| 1 | | | D1 | | | |
| 2 | D2 | D2 | | D1 | | |
| 3 | | | D2 | | D1 | |
| 4 | D3 | D3 | | D2 | | D1 |
| 5 | | | D3 | | D2 | |
| 6 | D4 | D4 | | D3 | | D2 |
| 7 | | | D4 | | D3 | |
| 8 | D5 | D5 | | D4 | | D3 |
| 9 | | | D5 | | D4 | |
| 10 | D6 | D6 | | D5 | | D4 |
| 11 | | | D6 | | D5 | |

FIGURE 8E

SYSTEM AND METHOD FOR A PIPELINED MULTI-LAYER SWITCHING NETWORK

RELATED APPLICATION

None

TECHNICAL FIELD

The present invention relates generally to switching networks and more specifically, to a pipelined multi-layer switching network.

DESCRIPTION OF RELATED ART

Switching networks are used to selectively couple an input received in an input port to an output at an output port. Switching networks use a plurality of switches that are selectively interconnected to permit a plurality of input ports to establish a path to a plurality of output ports. Some switching networks are used in communication networks. Some switching networks may be used in embedded field programmable gate arrays (sometimes referred to as eFPGA) solutions that may be incorporated in system on a chip (sometimes referred to as SoC) solutions to establish various connection paths between logical blocks. In some applications, a switching network implemented in such a solution may need to conserve space in the limited available silicon area. In other words, there is a need to conserve the hardware footprint of the switching network.

With this need in mind, the current disclosure arises. This brief summary has been provided so that the nature of the disclosure may be understood quickly. A more complete understanding of the disclosure can be obtained by reference to the following detailed description of the various embodiments thereof in connection with the attached drawings.

SUMMARY OF THE INVENTION

In one embodiment, a switching network is disclosed. A plurality of first switching assemblies, a plurality of second switching assemblies, and a plurality of intermediate switching assemblies with each of the first switching assemblies, second switching assemblies and intermediate switching assemblies having at least two input ports and two output ports is provided. Selective one of the two input ports is configured to receive a data to be processed by the switching network and deliver the received data at a designated one of the two output ports. The received data passes through one or more selective first switching assemblies, one or more intermediate switching assemblies and one or more selective second switching assemblies, before the received data is delivered at the designated one of the two output ports.

In another embodiment, a method for a switching network is disclosed. A plurality of first switching assemblies, a plurality of second switching assemblies, and a plurality of intermediate switching assemblies with each of the first switching assemblies, second switching assemblies and intermediate switching assemblies having at least two input ports and two output ports is provided. Selective one of the two input ports is configured to receive a data to be processed by the switching network and deliver the received data at a designated one of the two output ports. The received data passes through one or more selective first switching assemblies, one or more intermediate switching assemblies and one or more selective second switching assemblies, before the received data is delivered at the designated one of the two output ports.

This brief summary is provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are described with reference to the drawings. In the drawings, the same components have the same reference numerals. The illustrated embodiments are intended to illustrate but not limit the invention. The drawings include the following figures:

FIG. 1B shows an example table showing number of layers required based on various number of transmit ports and receive ports, according to one aspect of the present disclosure;

FIG. 6 shows an example table describing characteristics of output transform matrices to be used for switching networks with different numbers of TX ports and RX ports, according to one aspect of the present disclosure;

FIG. 6B shows an example transformation of a reverse output matrix to a reverse input matrix, for a 32×32 switching network as shown in FIG. 1C, according to one aspect of the present disclosure;

FIG. 6C shows an example table used for determining various attributes of adjacent layers for switching network with different number of TX ports and RX ports, according to one aspect of the present disclosure;

FIG. 8E shows an example table, showing data flow through the switching network of FIG. 8D;

DETAILED DESCRIPTION

To facilitate an understanding of the adaptive aspects of the present disclosure, an example switching network will be described. The specific construction and operation of the adaptive aspects of various elements of the example switching network is described.

Figure 1:
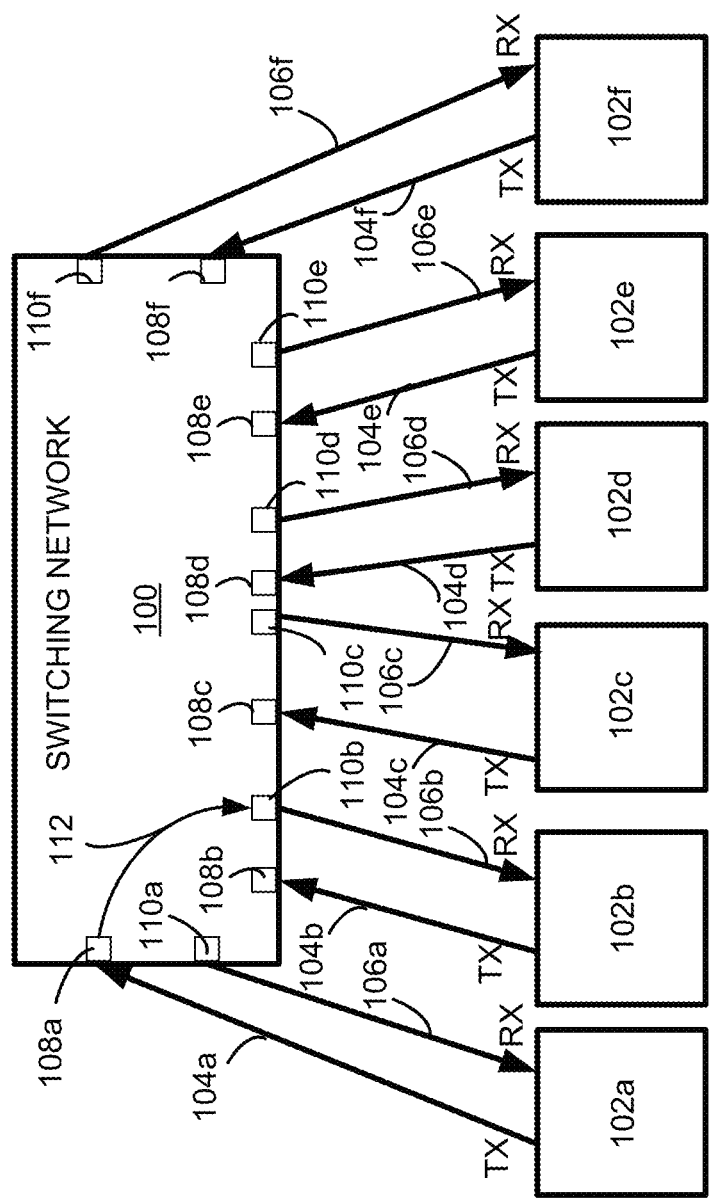
FIG. 1 shows an example switching network, according to one aspect of the present disclosure.

FIG. 1 shows an example environment in which a switching network 100 will be used. The switching network 100 is coupled to a plurality of communication devices 102a-102f. In some examples, the communication devices may be an Internet of Things (IoT) device, a computer, a mobile device, a router, a head phone, a camera and the likes. In some examples, communication devices may be different logic blocks in a device. During operation of the device, one or more logic blocks may be selectively configured to communicate with other logic blocks in the device. In some examples, logic blocks may be part of an eFPGA solutions that may be incorporated in an SoC solution and configured to selectively communicate with each other. The communication devices are configured to communicate with the switching network 100 over a plurality of transmission (TX) links 104a-104f and a plurality of receiving (RX) links 106a-106f. TX links 104a-104f are used to send data from the communication device to the switching network 100. RX links 106a-106f are used to receive data from the switching network 100. In one example, the switching network 100 will have a plurality of TX ports 108a-108f to receive data over the TX links 104a-104f and a plurality of RX ports 110a-110f to send data over the RX links 106a-106f.

As an example, the communication device 102a may want to send data to communication device 102b. The switching network 100 is selectively configured to receive data from the communication device 102a over TX link 104a, using TX port 108a. The switching network 100 is also selectively configured to send data to communication device 102b over RX link 106b using RX port 110b. The switching network 100 will have a plurality of switching elements (not shown) that are selectively configured to establishing a path 112 between the TX port 108a and RX port 110b. Then, the communication device 102a will send data over TX link 104a to the switching network 100 and the switching network 100 will send received data to the communication device 102b over the RX link 106b, using the established path 112 between the TX port 108a and the RX port 110b.

As one skilled in the art appreciates, a switching network 100 may have a plurality of TX ports and a plurality of RX ports. In general, number of TX ports and number of RX ports is of the order of $2^x$, where x is an integer. As an example, the switching network 100 may have 4, 8, 16, 32, 64 or more TX ports and RX ports. Communication link within a switching network 100 may be configured to be unicast (one TX port to one RX port), multicast (one TX port to multiple RX ports), or broadcast (one TX port to all RX ports). When number of TX ports is equal to number of RX ports in the switching network 100, it is referred to as a symmetric network. When number of TX ports is not equal to number of RX ports in the switching network 100, it is referred to as an asymmetric network. Folded networks are networks in which RX ports are connected back to the TX ports. Non-folded networks are networks in which TX ports and RX ports are considered independent entities.

A blocking switching network is one where even if we have a free TX port and some free RX ports, we still cannot set a path between them, irrespective of the re-arrangement of the paths or operational algorithm. Strictly non-blocking switching network is where if we have a free TX port and some free RX ports, then we can always set a path between them, without changing previously established paths. Re-arrangeably non-blocking switching network is where if we have a free TX port and some free RX ports, then, we can always set a path between them, which may require dismantling and re-establishing the previously established paths. Having generally described the switching network 100, details of an example switching network 100a will now be described.

Now, referring to FIG. 1A, functions and features of an example switching network 100a will now be described. The switching network 100a is similar to switching network 100 in that it has TX ports and RX ports and is configured to communicate with various communication devices. In one example, the switching network 100a has sixteen TX ports (TX1-TX16) to receive data from one or more communication devices and sixteen RX ports (RX1-RX16) to send data to one or more communication devices. In one example, the switching network 100a is a multipath network, in that there are multiple paths between a given TX port and a given RX port. In one example, this is accomplished by having a plurality of first switching assemblies 120a-120h selectively coupled to a plurality of second switching assemblies 122a-122h. In this example, each of the first switching assembly is receiving two TX inputs and provides two RX outputs.

Further, a bank of first switching assembly is referred to as a first layer 124 and a bank of second switching assembly is referred to as a last layer 126. Selective switching assemblies in the first layer 124 and selective switching assemblies in the last layer 126 are interconnected so as to establish selective communication path between a given TX port and a given RX port.

In one example, number of layers L required for a given number of TX and RX ports is given by the formula number of layers $L=\text{Log}_2 n$ divided by 2            Equation 1.

If the value of Logan divided by 2 is a fraction, it is rounded to the next integer value. So, in this example, for 16 TX ports and 16 RX ports, number of layers $L=\text{Log}_2 16/2=2$. For another example network with 32 TX ports and 32 RX ports, number of layers $L=\text{Log}_2 32/2=2.5$, rounded to 3. For yet another example network with 64 TX ports and 64 RX ports, number of layers $L=\text{Log}_2 64/2=3$. Similarly, for yet another example network with 1024 TX ports and 1024 RX ports, number of layers $L=\text{Log}_2 1024/2=5$. In examples where we need more than two layers (first layer and last layer), additional layers may be referred to as intermediate layers (not shown). Intermediate layers may have a plurality of intermediate switching assemblies (not shown).

Referring to FIG. 1B, table 130 shows number of layers required for various values of TX ports and RX ports. For example, column 132 shows number n of TX/RX ports. Column 134 shows the value of $\text{Log}_2$ n. Column 136 shows the value of $\text{Log}_2$ n divided by 2. Column 138 shows number of layers L required ($\text{Log}_2$ n/2 rounded to next integer value).

Figure 1A:
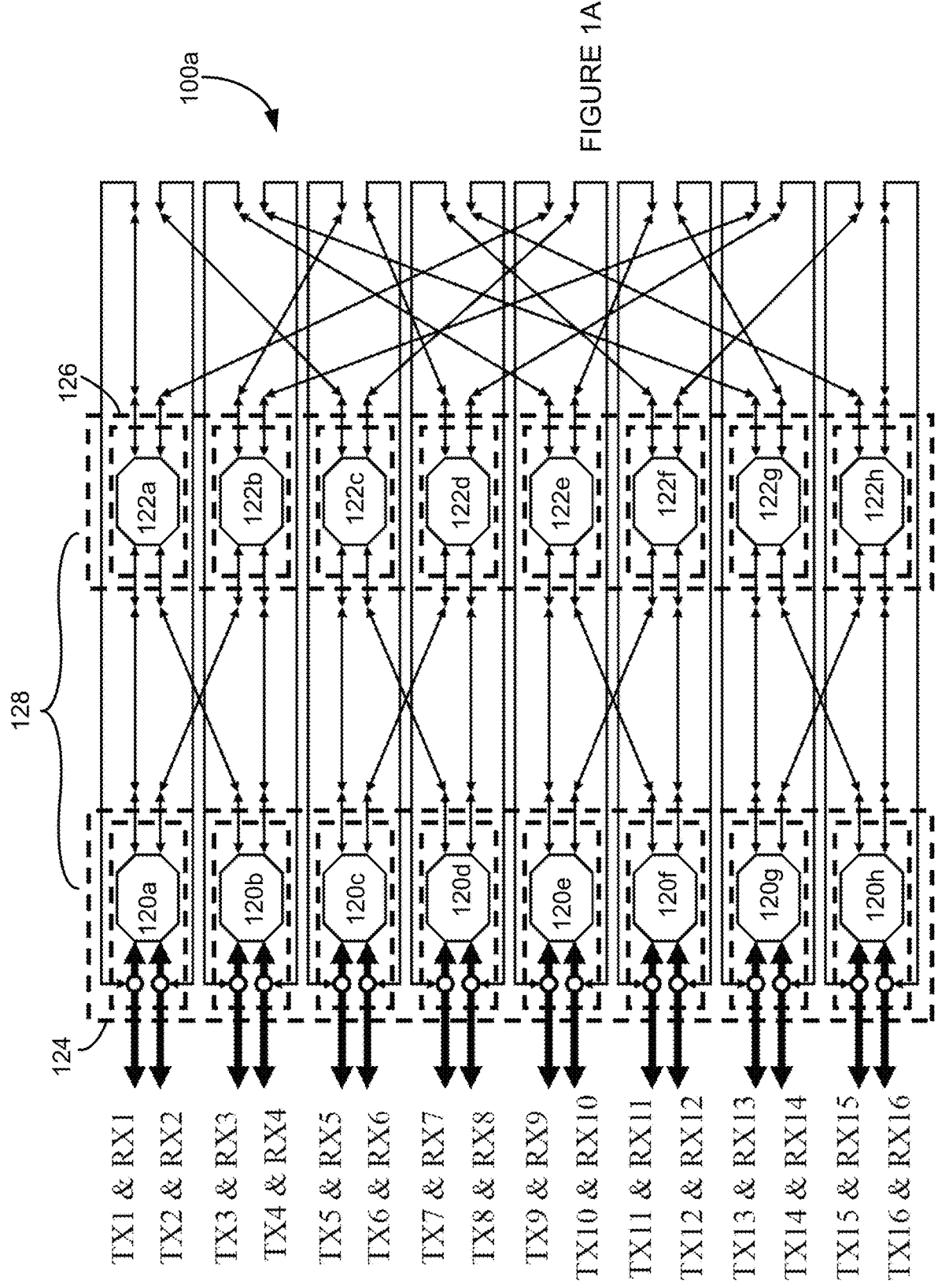
FIG. 1A shows an example 16×16 switching network, according to one aspect of the present disclosure.
Figure 1C:
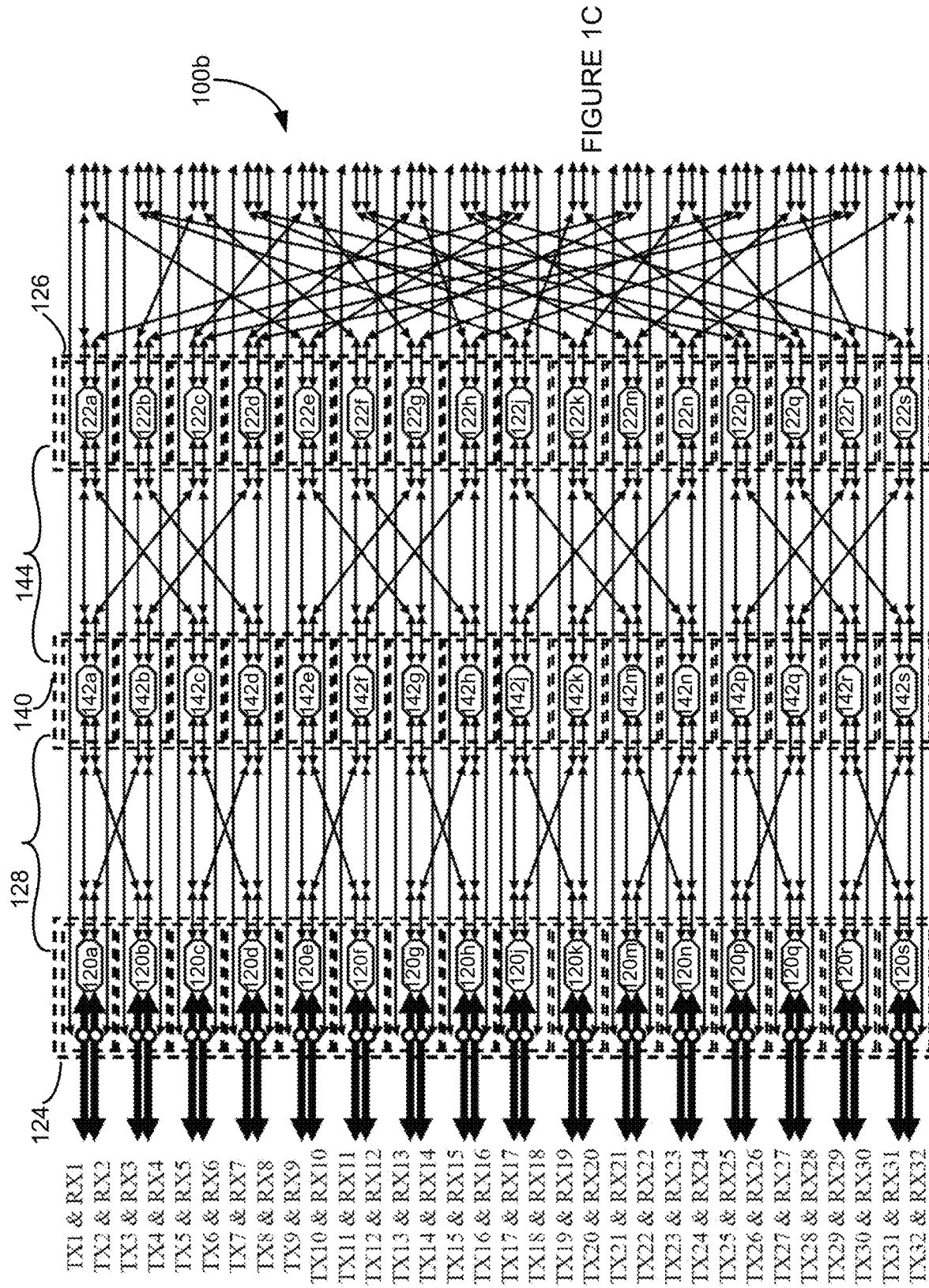
FIG. 1C shows an example 32×32 switching network, according to one aspect of the present disclosure.

Now, referring to FIG. 1C, another example switching network 100b, with 32 TX ports and 32 RX ports, with a first layer 124, last layer 126 and an intermediate layer 140 is shown. In this example, for 32 TX ports and 32 RX ports, the number of first switching assemblies, number of second switching assemblies and number of intermediate switching assemblies will be 16. The first layer 124 includes a plurality of first switching assemblies 120a-120h, 120j-120k, 120m-120n, and 120p-120s. The intermediate layer 140 includes a plurality of intermediate switching assemblies 142a-142h, 142j-142k, 142m-142n, and 142p-142s. The last layer 126 includes a plurality of second switching assemblies 122a-122h, 122j-122k, 122m-122n, and 122p-122s.

In one example, selective switching assemblies in one layer are coupled to selective switching assemblies in an adjacent layer. In other words, outputs of selective subset of switching assemblies in one layer are coupled to inputs of selective subset of switching assemblies of adjacent layer.

Now, referring back to FIG. 1A, in the switching network 100a, there are only two layers that are adjacent to each other, for example, first layer 124 and last layer 126. In this example, the first layer 124 and last layer 126 form a pair of first adjacent layer 128. In one example, selective groups of switching assemblies in the pair of first adjacent layers 128 are selectively coupled.

Now, referring to first adjacent layer 128, we notice, each group of switching assemblies contains two switching assemblies in each layer. In one example, adjacent switching assemblies in a layer in the pair of adjacent layers form a group. For example, first switching assemblies 120a and 120b in the first layer and second switching assemblies 122a and 122b in the last layer form a first group. Similarly, first switching assemblies 120c and 120d in the first layer and second switching assemblies 122c and 122d in the last layer form a second group. Similarly, first switching assemblies 120e and 120f in the first layer and second switching assemblies 122e and 122f in the last layer form a third group. Finally, first switching assemblies 120g and 120h in the first layer and second switching assemblies 122g and 122h in the last layer form a fourth group. As one skilled in the art appreciates, for each group, the number of switching assemblies in each layer of the pair of first adjacent layers 128 is two. Sometimes, number of switching assemblies in each layer of the pair of first adjacent layers may be referred to as a subgroup. And, one subgroup from one of the layers in the pair of first adjacent layers and one subgroup from another one of the layers in the pair of first adjacent layers form a group. In this example, the number of switching assemblies in each subgroup is two, and the number of switching assemblies in a group is four, for the pair of first adjacent layers.

In one example, outputs of selective pairs of first switching assemblies 120a and 120b are selectively coupled to inputs of selective pairs of second switching assemblies 122a and 122b. Similarly, outputs of selective pairs of first switching assemblies 120c and 120d are selectively coupled to inputs of selective pairs of second switching assemblies 122c and 122d. And, outputs of selective pairs of first switching assemblies 120e and 120f are selectively coupled to inputs of selective pairs of second switching assemblies 122e and 122f. And, outputs of selective pairs of first switching assemblies 120g and 120h are selectively coupled to inputs of selective pairs of second switching assemblies 122g and 122h.

As one skilled in the art appreciates, in some examples, by pairing two adjacent first switching assemblies with two adjacent second switching assemblies and selectively coupling the output of the selected pair of two adjacent first switching assemblies with the input of the selected pair of two adjacent second switching assemblies, connection wire length between the first switching assemblies and the second switching assemblies can be minimized. As shown in FIG. 1A, we notice that such a connection wire is a two straight connector wires (with minimal length) and two crossed connector wires (slightly longer length). Same efficient connection between selective first switching assemblies and selective second switching assemblies are again used in subsequent passes of processing of input data, as further described below in detail.

In some examples, selective outputs of the selective second switching assemblies are coupled to the input of the selective first switching assemblies. Detailed example connection between the selective first switching assemblies and the second switching assemblies will be later described with reference to FIGS. 5A to 5F. It will be apparent from the description of FIGS. 5A to 5F, selective outputs of the second switching assemblies are selectively coupled to selective special inputs of the first switching assemblies. Further, selective special outputs of the first switching assemblies are selectively coupled to selective special inputs of the second switching assemblies. These special inputs and special outputs for the first switching assembly are not the conventional TX inputs and RX outputs. Moreover, the TX inputs and RX outputs are considered separate wires and independent entities. Thus, the switching network 100a is considered a non-folded network.

Now, referring back to FIG. 1C, in the switching network 100b, there are three layers that are adjacent to each other, for example, first layer 124, intermediate layer 140 and last layer 126. In this example, the first layer 124 and the intermediate layer 140 form a pair of first adjacent layers 128. Further, the intermediate layer 140 and the last layer 126 form a pair of second adjacent layers 144. In one example, selective groups of switching assemblies in the pair of first adjacent layers 128 are selectively coupled. Further, selective groups of switching assemblies in the pair of second adjacent layers 144 are selectively coupled.

Now, referring to the pair of first adjacent layers 128, we notice that each group of switching assemblies contains two switching assemblies in each layer. For example, first switching assemblies 120a and 120b in the first layer and intermediate switching assemblies 142a and 142b in the intermediate layer form a fifth group. Similarly, first switching assemblies 120c and 120d in the first layer and intermediate switching assemblies 142c and 142d in the intermediate layer form a sixth group. Similarly, first switching assemblies 120e and 120f in the first layer and intermediate switching assemblies 142e and 142f in the intermediate layer form a seventh group. Similarly, first switching assemblies 120g and 120h in the first layer and intermediate switching assemblies 142g and 142h in the intermediate layer form an eighth group.

Continuing on, first switching assemblies 120j and 120k in the first layer and intermediate switching assemblies 142j and 142k in the intermediate layer form a ninth group. Similarly, first switching assemblies 120m and 120n in the first layer and intermediate switching assemblies 142m and 142n in the intermediate layer form a tenth group. Similarly, first switching assemblies 120p and 120q in the first layer and intermediate switching assemblies 142p and 142q in the intermediate layer form an eleventh group. Similarly, first switching assemblies 120r and 120s in the first layer and intermediate switching assemblies 142r and 142s in the intermediate layer form a twelfth group. As one skilled in the art appreciates, for each group, the number of switching assemblies in each layer of the pair of first adjacent layers 128 is two.

In one example, outputs of selective pairs of first switching assemblies 120a and 120b are selectively coupled to inputs of selective pairs of intermediate switching assemblies 142a and 142b. Similarly, outputs of selective pairs of first switching assemblies 120c and 120d are selectively coupled to inputs of selective pairs of intermediate switching assemblies 142c and 142d. And, outputs of selective pairs of first switching assemblies 120e and 120f are selectively coupled to inputs of selective pairs of intermediate switching assemblies 142e and 142f. And, outputs of selective pairs of first switching assemblies 120g and 120h are selectively coupled to inputs of selective pairs of intermediate switching assemblies 142g and 142h.

Similarly, outputs of selective pairs of first switching assemblies 120j and 120k are selectively coupled to inputs of selective pairs of intermediate switching assemblies 142j and 142k. Similarly, outputs of selective pairs of first switching assemblies 120m and 120n are selectively coupled to inputs of selective pairs of intermediate switching assemblies 142m and 142n. And, outputs of selective pairs of first switching assemblies 120p and 120q are selectively coupled to inputs of selective pairs of intermediate switching assemblies 142p and 142q. And, outputs of selective pairs of first switching assemblies 120r and 120s are selectively coupled to inputs of selective pairs of intermediate switching assemblies 142r and 142s.

As one skilled in the art appreciates, in some examples, by pairing two adjacent first switching assemblies with two adjacent intermediate switching assemblies and selectively coupling the output of the selected pair of two adjacent first switching assemblies with the input of the selected pair of two adjacent intermediate switching assemblies, connection wire length between the first switching assemblies and the intermediate switching assemblies can be minimized. As shown in FIG. 1C, we notice that such a connection wire is a two straight connector wires (with minimal length) and two crossed connector wires (slightly longer length). Same efficient connection between selective first switching assemblies and selective intermediate switching assemblies are again used in subsequent passes of processing of input data, as further described below in detail.

Now, referring to the pair of second adjacent layers 144, we notice that each group of switching assemblies contains four switching assemblies in each layer. For example, intermediate switching assemblies 142a, 142b, 142c, and 142d in the intermediate layer and second switching assemblies 122a, 122b, 122c, and 122d in the last layer form a thirteenth group. Similarly, intermediate switching assemblies 142e, 142f, 142g, and 142h in the intermediate layer and second switching assemblies 122e, 122f, 122g, and 122h in the last layer form a fourteenth group. Similarly, intermediate switching assemblies 142j, 142k, 142m, and 142n in the intermediate layer and second switching assemblies 122j, 122k, 122m, and 122n in the last layer form a fifteenth group. Similarly, intermediate switching assemblies 142p, 142q, 142r, and 142s in the intermediate layer and second switching assemblies 122p, 122q, 122r, and 122s in the last layer form a sixteenth group. As one skilled in the art appreciates, for each group, the number of switching assemblies in each layer of the pair of second adjacent layer 144 is four.

As an example, referring to the pair of second adjacent layer 144, outputs of selective pairs of intermediate switching assemblies 142a, 142b, 142c, and 142d are selectively coupled to inputs of selective pairs of second switching assemblies 122a, 122b, 122c, and 122d. Similarly, outputs of selective pairs of intermediate switching assemblies 142e, 142f, 142g, and 142h are selectively coupled to inputs of selective pairs of second switching assemblies 122e, 122f, 122g, and 122h. And, outputs of selective pairs of intermediate switching assemblies 142j, 142k, 142m, and 142n are selectively coupled to inputs of selective pairs of second switching assemblies 122j, 122k, 122m, and 122n. And, outputs of selective pairs of intermediate switching assemblies 142p, 142q, 142r, and 142s are selectively coupled to inputs of selective pairs of second switching assemblies 122p, 122q, 122r, and 122s.

In this configuration, we notice that output of first two of the intermediate switching assemblies are selectively coupled to input of last two of the second switching assemblies. And, the output of last two of the intermediate switching assemblies are selectively coupled to input of the first two of the second switching assemblies. For example, one output of intermediate switching assembly 142a is coupled to one input of second switching assembly 122c. Similarly, one output of intermediate switching assembly 142b is coupled to one input of second switching assembly 122d. And, one output of intermediate switching assembly 142c is coupled to one input of second switching assembly 122a. Similarly, one output of intermediate switching assembly 142d is coupled to one input of second switching assembly 122b.

As one skilled in the art appreciates, in some examples, by pairing four adjacent intermediate switching assemblies with four adjacent second switching assemblies and selectively coupling the output of the selected pair of four adjacent intermediate switching assemblies with the input of the selected pair of four adjacent second switching assemblies, connection wire length between the intermediate switching assemblies and the second switching assemblies can be minimized. As shown in FIG. 1C, we notice that such a connection wire is a four straight connector wires (with minimal length) and four crossed connector wires (slightly longer length). Same efficient connection between selective intermediate switching assemblies and selective second switching assemblies are again used in subsequent passes of processing of input data, as further described below in detail.

Now, functions and features of an example first switching assembly, a second switching assembly and an intermediate switching assembly will be described with reference to FIGS. 2A, 2B, and 2C.

Figure 2A:
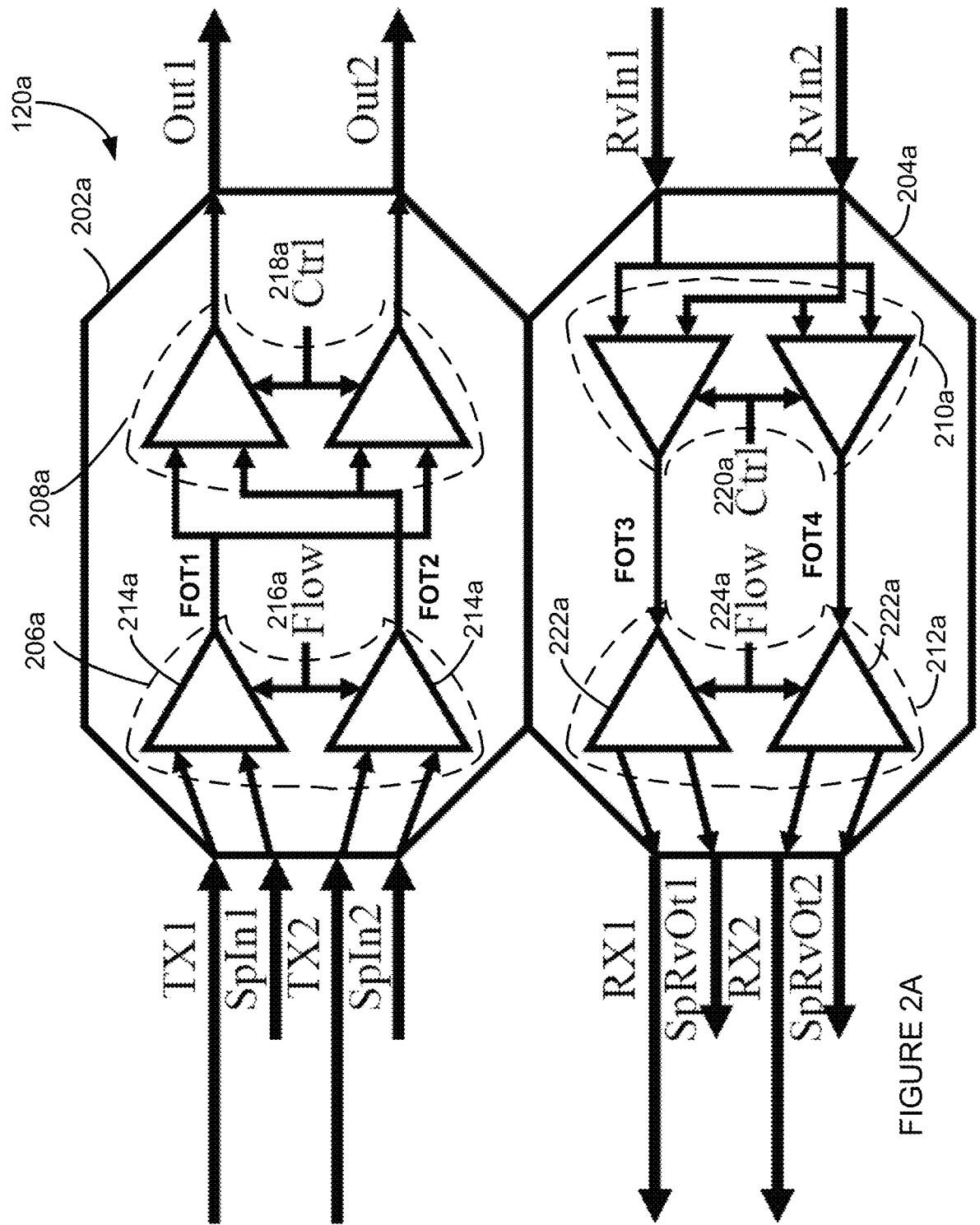
FIG. 2A shows an example first switching assembly, according to one aspect of the present disclosure.

Now, referring to FIG. 2A, an example first switching assembly, for example, first switching assembly 120a is described. In one example, first switching assemblies 120b-120h, 120j, 120k, 120m, 120n, 120p-120s are similar in construction as the first switching assembly 120a. First switching assembly 120a includes a first forward element 202a and a first reverse element 204a.

First forward element 202a includes a first input selector 206a coupled to a first forward switch 208a. The first input selector 206a is configured to receive four inputs. The inputs are TX1, TX2, SpIn1 and SpIn2. Inputs TX1 and TX2 correspond to input data over transmit ports TX1 and TX2. The first input selector 206a is configured to selectively output either TX1 and TX2 or SpIn1 and SpIn2. The outputs of first input selector 206a are coupled to inputs of first forward switch 208a. In one example, the first input selector 206a includes a pair of two input to one output multiplexers 214a1 and 214a2 and configured to receive a first forward flow control signal 216a. The inputs of multiplexer 214a1 are TX1 and SpIn1 and the inputs of multiplexer 214a2 are TX2 and SpIn2. The output of multiplexer 214a1 FOT1 is coupled to one of the inputs to the first forward switch 208a. The output of multiplexer 214a2 FOT2 is coupled to one of the other inputs to the first forward switch 208a. The first forward flow control signal 216a fed to the first input selector 206a determines which pair of inputs to the first input selector 206a is selected and selectively presented at the input of the first forward switch 208a.

The first forward switch 208a is configured to provide two outputs, Out1 and Out2. In one example, the first forward switch 208a is a 2×2 switch, with first forward control signal 218a determining which of the inputs are selectively presented at the two outputs Out1 and Out2 of the first forward switch 208a. For example, let us consider a scenario where input to the first forward switch 208a is TX1 and TX2. Based on the first forward control signal 218a, the first forward switch 208a will either output TX1 to Out1 and TX2 to Out2 or output TX1 to Out2 and TX2 to Out1.

The first reverse element 204a includes a first reverse switch 210a coupled to a first output selector 212a. The first reverse switch 210a is configured to receive two inputs RvIn1 and RvIn2 and provide two outputs FOT3 and FOT4, which are coupled to the first output selector 212a. In one example, the first reverse switch 210a is a 2×2 switch, with first reverse control signal 220a determining which of the inputs are selectively presented at the two outputs of the first reverse switch 210a. For example, let us consider a scenario where input to the first reverse switch 210a is RvIn1 and RvIn2. Based on the first reverse control signal 220a, the first reverse switch 210a will either output RvIn1 to FOT3 and RvIn2 to FOT4 or output RvIn1 to FOT4 and RvIn2 to FOT3.

The first output selector 212a is configured to receive two inputs. The inputs are FOT3 and FOT4. The first output selector 212a is also configured to output four outputs, RX1, SpRvOt1, RX2, and SpRvOt2. Outputs RX1 and RX2 correspond to output data sent over receive ports RX1 and RX2. The first output selector 212a is configured to selectively output FOT3 and FOT4 at either RX1 and RX 2 or SpRvOt1 and SpRvOt2, respectively. In one example, the first output selector 212a includes a pair of one input to two output de-multiplexers 222a and configured to receive a first reverse flow control signal 224a. The first reverse flow control signal 224a fed to the first output selector 212a determines which pair of outputs of the first output selector 212a is selected and selectively presented at the output of the first output selector 212a.

Figure 2B:
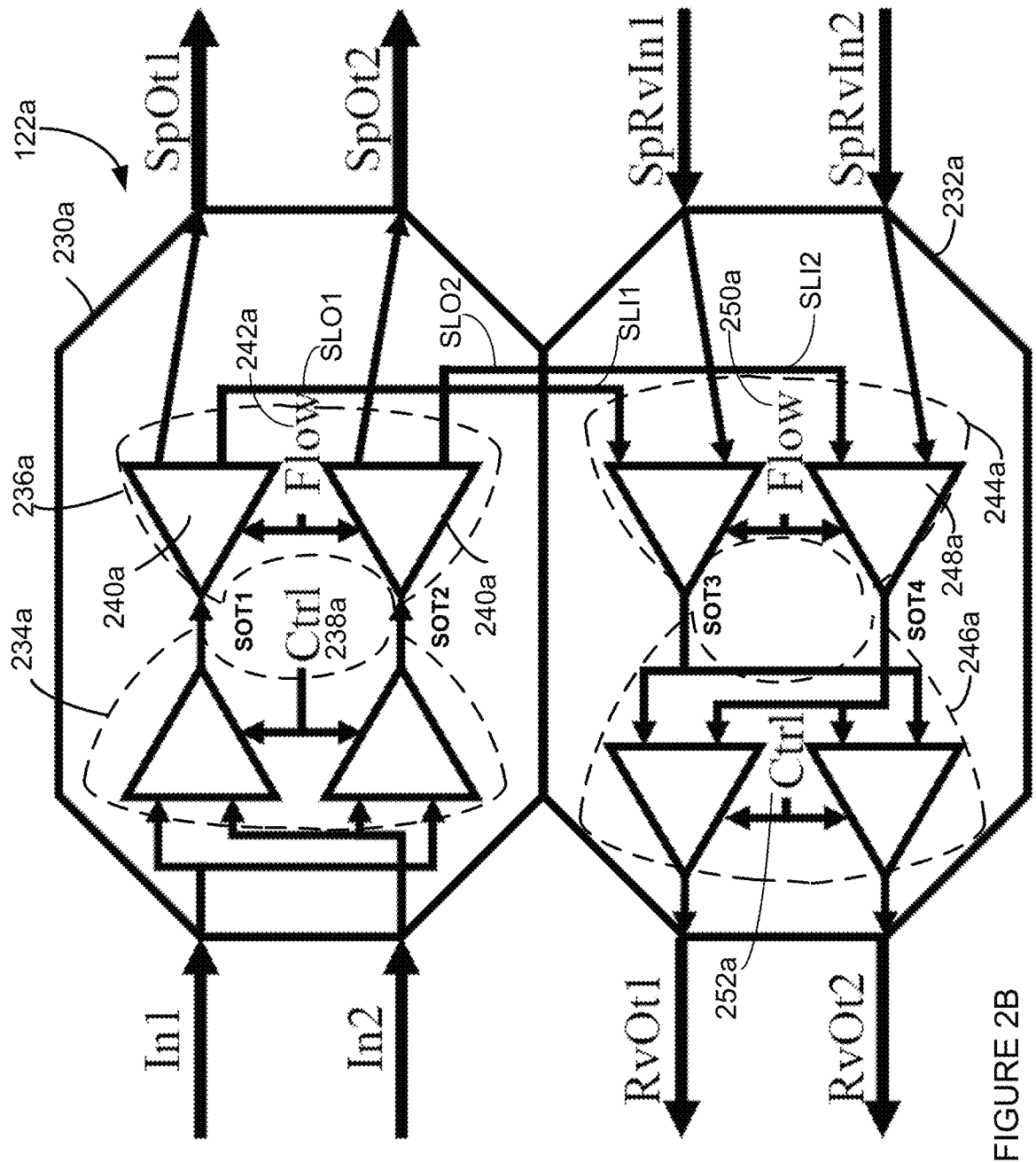
FIG. 2B shows an example second switching assembly, according to one aspect of the present disclosure.

Now, referring to FIG. 2B, an example second switching assembly, for example, second switching assembly 122a is described. In one example, second switching assemblies 122b-122h, 122j, 122k, 122m, 122n, 122p-122s are similar in construction as the second switching assembly 122a. Second switching assembly 122a includes a second forward element 230a and a second reverse element 232a.

The second forward element 230a includes a second forward switch 234a coupled to a second output selector 236a. The second forward switch 234a is configured to receive two inputs In1 and In2 and provide two outputs SOT1 and SOT2, which are coupled to the second output selector 236a. In one example, the second forward switch 234a is a 2×2 switch, with a second forward control signal 238a determining which of the inputs are selectively presented at the two outputs of the second forward switch 234a. For example, let us consider a scenario where input to the second forward switch 234a is In1 and In2. Based on the second forward control signal 238a, the second forward switch 234a will either output In1 to SOT1 and In2 to SOT2 or output In1 to SOT2 and In2 to SOT1.

The second output selector 236a is configured to receive two inputs. The inputs are SOT1 and SOT2. The second output selector 236a is also configured to output four outputs, SpOt1, SLO1, SpOt2, and SLO2. The second output selector 236a is configured to selectively output SOT1 and SOT2 at either SpOt1 and SpOt2 or SLO1 and SLO2, respectively. In one example, the second output selector 236a includes a second pair of one input to two output de-multiplexers 240a and configured to receive a second forward flow control signal 242a. The second forward flow control signal 242a fed to the second output selector 236a determines which pair of outputs of the second output selector 236a is selected and selectively presented at the output of the second output selector 236a.

Second reverse element 232a includes a second input selector 244a coupled to a second reverse switch 246a. The second input selector 244a is configured to receive four inputs. The inputs are SLI1, SpRvIn1, SLI2 and SpRvIn2. In one example, the output SLO1 of second forward element 230a is looped back as input SLI1 and output SLO2 of second forward element 230a is looped back as input SLI2. In one example, this loop back connection is performed inside the second switching assembly. The second input selector 244a is configured to selectively output either SLI1 and SLI2 or SpRvIn1 and SpRvIn2. The outputs of second input selector 244a are coupled to inputs of second reverse switch 246a. In one example, the second input selector 244a includes a second pair of two input to one output multiplexer 248a and configured to receive a second reverse flow control signal 250a. The second reverse flow control signal 250a fed to the second input selector 244a determines which pair of inputs to the second input selector 244a is selected and selectively presented at the input of the second reverse switch 246a. The inputs to the second reverse switch 246a are SOT3 and SOT4.

The second reverse switch 246a is configured to provide two outputs, RvOt1 and RvOt2. In one example, the second reverse switch 246a is a 2×2 switch, with second reverse control signal 252a determining which of the inputs are selectively presented at the two outputs RvOt1 and RvOt2 of the second reverse switch 246a. For example, let us consider a scenario where input to the second reverse switch 246a is SLI1 and SLI2. Based on the second reverse control signal 252a, the second reverse switch 246a will either output SLI1 to RvOt1 and SLI2 to RvOt2 or output SLI1 to RvOt2 and SLI2 to RvOt1.

Figure 2C:
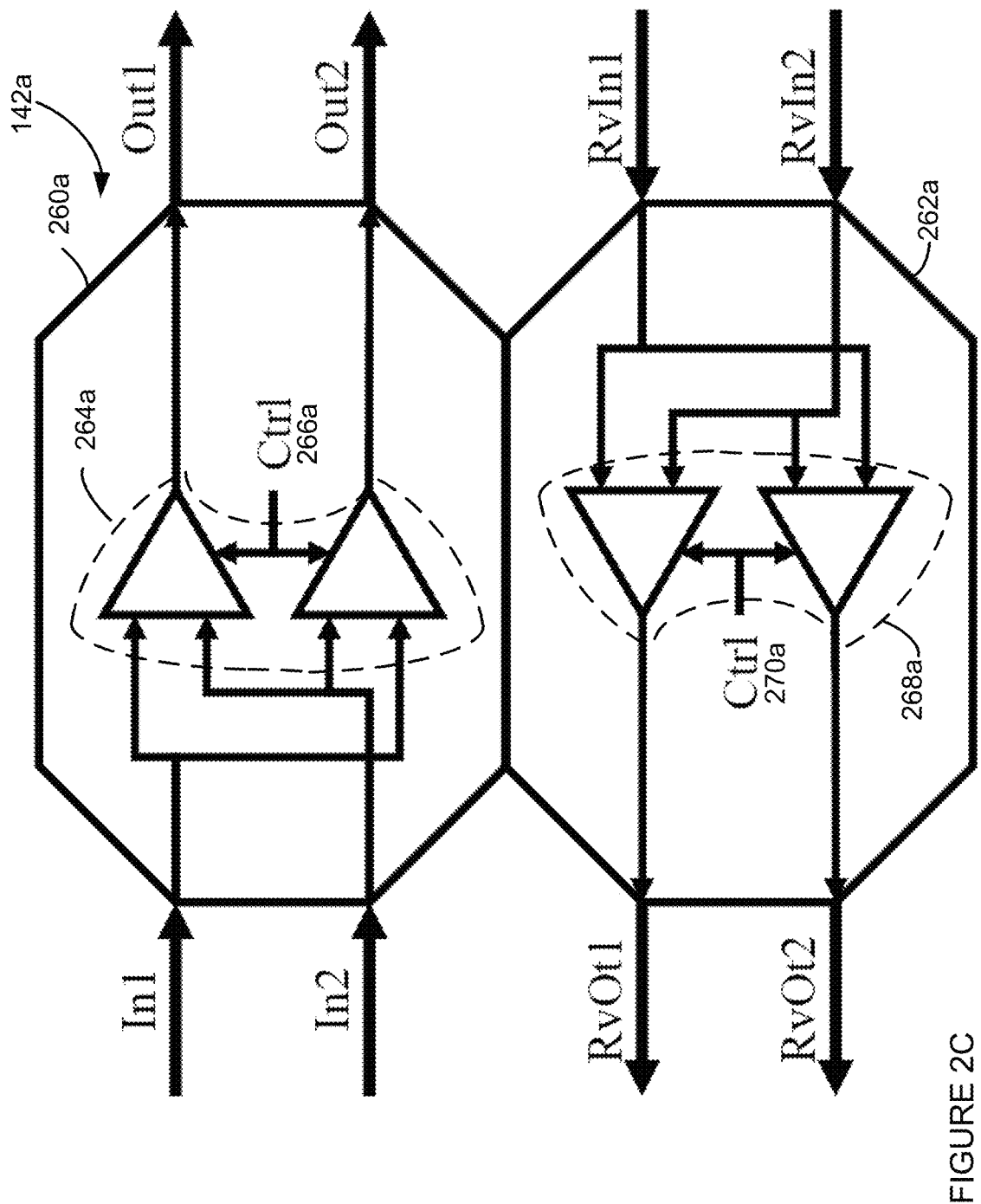
FIG. 2C shows an example intermediate switching assembly, according to one aspect of the present disclosure.

Now, referring to FIG. 2C, an example intermediate switching assembly, for example, intermediate switching assembly 142a is described. In one example, intermediate switching assemblies 142b-142h, 142j, 142k, 142m, 142n, 142p-142s are similar in construction as the intermediate switching assembly 142a. Intermediate switching assembly 142a includes an intermediate forward element 260a and an intermediate reverse element 262a. Intermediate forward element 260a includes an intermediate forward switch 264a.

The intermediate forward switch 264a is configured to receive two inputs In1 and In2 and provide two outputs Out1 and Out2. In one example, the intermediate forward switch 264a is a 2×2 switch, with an intermediate forward control signal 266a determining which of the inputs are selectively presented at the two outputs Out1 and Out2 of the intermediate forward switch 264a. For example, let us consider a scenario where input to the intermediate forward switch 264a is In1 and In2. Based on the intermediate forward control signal 266a, the intermediate forward switch 264a will either output In1 to Out1 and In2 to Out2 or output In1 to Out2 and In2 to Out1.

Intermediate reverse element 262a includes an intermediate reverse switch 268a. The intermediate reverse switch 268a is configured to receive two inputs RvIn1 and RvIn2 and provide two outputs RvOt1 and RvOt2. In one example, the intermediate reverse switch 268a is a 2×2 switch, with an intermediate reverse control signal 270a determining which of the inputs are selectively presented at the two outputs RvOt1 and RvOt2 of the intermediate reverse switch 268a. For example, let us consider a scenario where input to the intermediate reverse switch 268a is RvIn1 and RvIn2. Based on the intermediate reverse control signal 270a, the intermediate reverse switch 268a will either output RvIn1 to RvOt1 and RvIn2 to RvOt2 or output RvIn1 to RvOt2 and RvIn2 to RvOt1.

Having described example construction of the first switching assembly, the second switching assembly and the intermediate switching assembly, example interconnection between the first switching assembly and the second switching assembly will now be described, with reference to FIG. 3.

Figure 3:
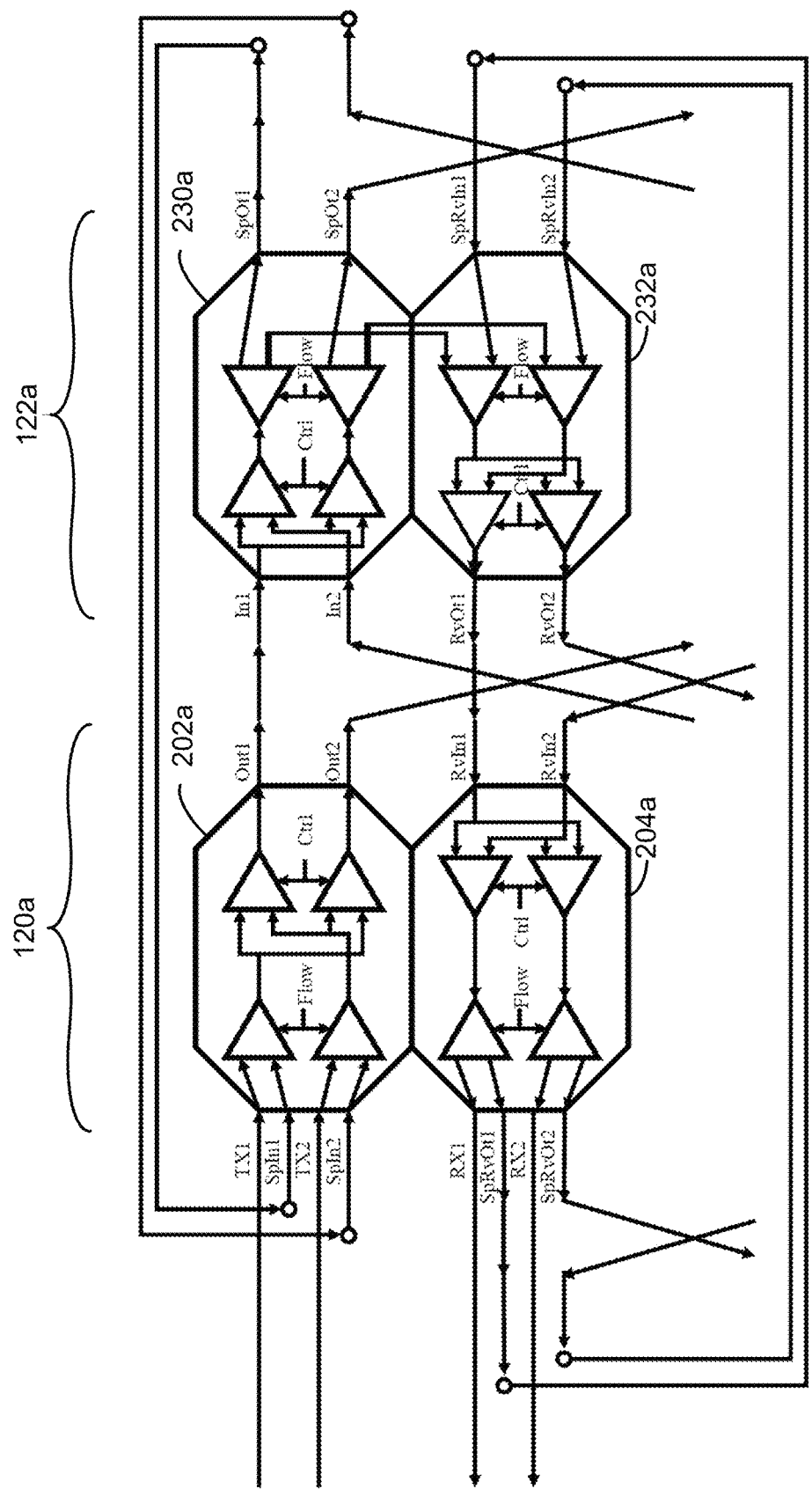
FIG. 3 shows an example interconnection between the first switching assembly and the second switching assembly of example switching network shown in FIG. 1A, according to one aspect of the present disclosure.

Now, referring to FIG. 3, an example interconnection between the first switching assembly 120a and the second switching assembly 122a is shown. For example, first switching assembly 120a includes the first forward element 202a and the first reverse element 204a. The second switching assembly 122a includes the second forward element 230a and the second reverse element 232a. For example, TX1 and TX2 are received by the first forward element 202a and the RX1 and RX2 are output by the first reverse element 204a. Further, we notice, some of the inputs may flow from the first forward element 202a to the second forward element 230a and may loop back into first forward element 202a. In one example, the TX1 input to the first forward element 202a may flow to the second forward element 230a, and thereafter, the SpOt1 output of the second forward element 230a may loopback into first forward element 202a as SpIn1 input. In one example, the input to the first forward element 202a may flow to the second forward element 230a, and thereafter, may be fed as an input to the second reverse element 232a, come out of the second reverse element 232a as RvOt1 output, which is fed to the first reverse element 204a as RvIn1 and thereafter, come out of the first reverse element 204a. In some examples, it may come out as RX1 output. In some examples, it may come out as RX2 output. In some examples, it may come out as SpRvOt1 output, which is fed back to the second reverse element 232a as SpRvIn1 input, which may selectively follow another path, based on the second reverse flow control signal and the second reverse control signal, as previously described with reference to FIG. 2B and second switching assembly 122a.

Further, we notice that there are multiple other inputs that may be selectively received from outputs of other first switching assemblies and second switching assemblies. And, there are multiple other outputs that may be selectively received by inputs of other first switching assemblies and second switching assemblies. In summary, data flow from the first switching assemblies (for example, first switching assembly 120a) to second switching assemblies (for example, second switching assembly 122a) is selectively permitted by using the first forward elements (for example, first forward element 202a) of the first switching assemblies (for example, first switching assembly 120a) and second forward elements (for example, second forward element 230a) of second switching assemblies (for example, second switching assembly 122a). Similarly, data flow from the second switching assemblies (for example, second switching assembly 122a) to first switching assemblies (for example, first switching assembly 120a) is selectively permitted by using the second reverse elements (for example, second reverse element 232a) of the second switching assemblies (for example, second switching assembly 122a) and first reverse elements (for example, first reverse element 204a) of first switching assemblies (for example, first switching assembly 120a). As one skilled in the art appreciates, such a flow of data between selective first switching assemblies and second switching assemblies will permit establishing path between a TX port and an RX port in the switching network 100a as previously described in FIG. 1A. Example data flow paths between selective first switching assemblies and selective second switching assemblies is later explained in detail, with reference to FIGS. 5A, 5B, 5C, 5D, 5E, and 5F. Example connection paths between selective first switching assemblies and selective second switching assemblies are later explained with reference to FIGS. 6C and 6D.

Figure 4:
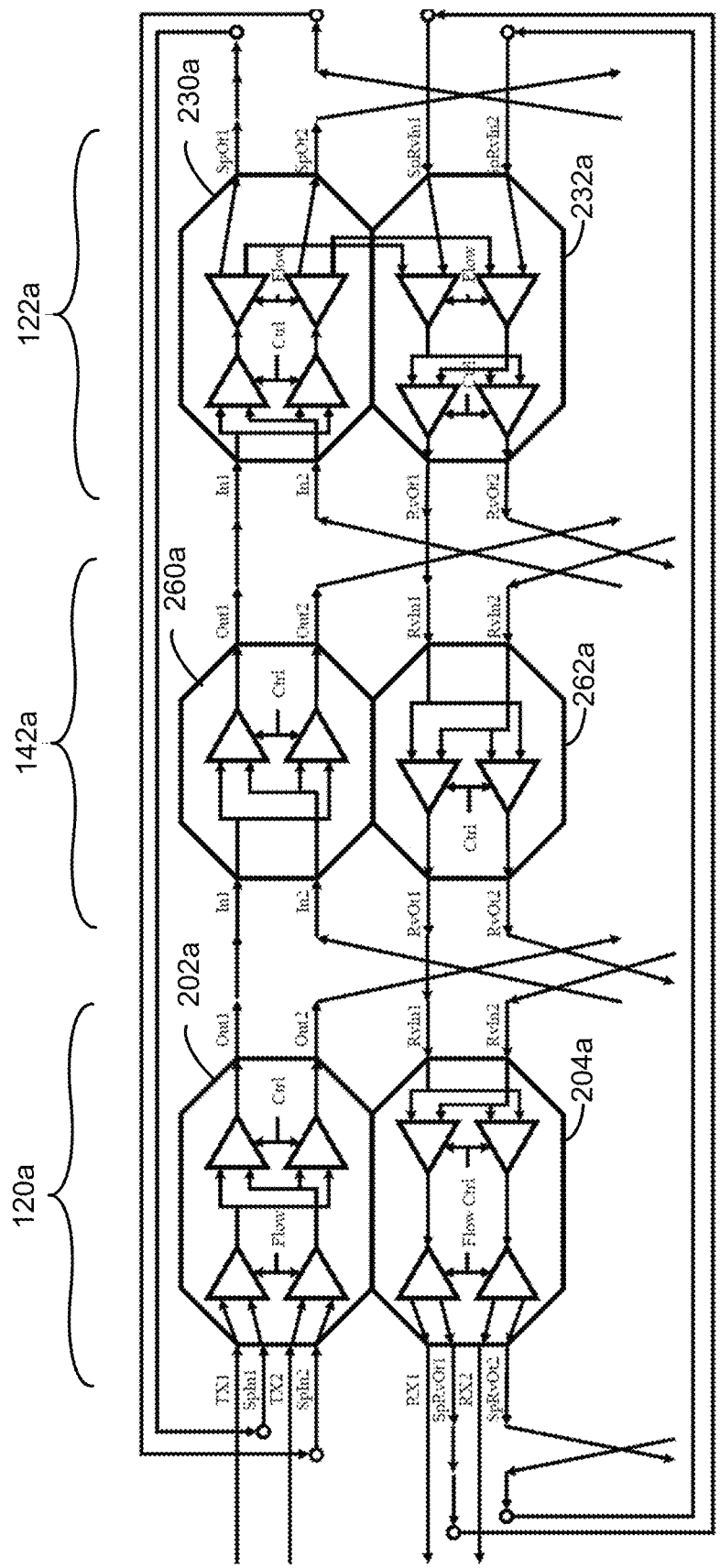
FIG. 4 shows an example interconnection between the first switching assembly, intermediate switching assembly and second switching assembly of example switching network shown in FIG. 1C, according to one aspect of the present disclosure.

Now, referring to FIG. 4, an example interconnection between the first switching assembly 120a, intermediate switching assembly 142a and the second switching assembly 122a for the switching network 100b previously described with reference to FIG. 1C is shown. For example, first switching assembly 120a includes the first forward element 202a and the first reverse element 204a. The second switching assembly 122a includes the second forward element 230a and the second reverse element 232a. And, the intermediate switching assembly 142a includes an intermediate forward element 260a and intermediate reverse element 262a. For example, TX1 and TX2 are received by the first forward element 202a and the RX1 and RX2 are output by the first reverse element 204a. Further, we notice, some of the inputs may flow from the first forward element 202a to the intermediate forward element 260a and then to second forward element 230a and may loop back into first forward element 202a. In one example, the TX1 input to the first forward element 202a may flow to the intermediate forward element 260a and then to the second forward element 230a, and thereafter, the SpOt1 output of the second forward element 230a may loopback into first forward element 202a as SpIn1 input. In one example, the input to the first forward element 202a may flow to the intermediate forward element 260a and then to the second forward element 230a, and thereafter, may be fed as an input to the second reverse element 232a, come out of the second reverse element 232a as RvOt1 output, which is fed to the intermediate reverse element 262a as RvIn1 and comes out from the intermediate reverse element 262a as RvOt1, which is fed to the first reverse element 204a as RvIn1 and thereafter, come out of the first reverse element 204a. In some examples, it may come out as RX1 output. In some examples, it may come out as RX2 output. In some examples, it may come out as SpRvOt1 output, which is fed back to the second reverse element 232a as SpRvIn1 input, which may selectively follow another path, based on the second reverse flow control signal and the second reverse control signal, as previously described with reference to FIG. 2B and second switching assembly 122a.

Further, we notice that there are multiple other inputs that may be selectively received from outputs of other first switching assemblies, intermediate switching assemblies and second switching assemblies. And, there are multiple other outputs that may be selectively received by inputs of other first switching assemblies, intermediate switching assemblies and second switching assemblies. In summary, data flow from the first switching assemblies (for example, first switching assembly 120a) to second switching assemblies (for example, second switching assembly 122a) through the intermediate switching assemblies (for example, intermediate switching assembly 142a) is selectively permitted by using the first forward elements (for example, first forward element 202a) of the first switching assemblies (for example, first switching assembly 120a) and intermediate forward elements (for example, intermediate forward element 260a) of the intermediate switching assemblies (for example, intermediate switching assembly 142a) and second forward elements (for example, second forward element 230a) of the second switching assemblies (for example, second switching assembly 122a). Similarly, data flow from the second switching assemblies (for example, second switching assembly 122a) to first switching assemblies (for example, first switching assembly 120a) is selectively permitted by using the second reverse elements (for example, second reverse element 232a) of the second switching assemblies (for example, second switching assembly 122a), through the intermediate reverse elements (for example, intermediate reverse element 262a) of the intermediate switching assemblies (for example, intermediate switching assembly 142a) and first reverse elements (for example, first reverse element 204a) of first switching assemblies (for example, first switching assembly 120a). As one skilled in the art appreciates, such a flow of data will permit establishing path between a TX port and an RX port in the switching network 100b as previously described in FIG. 1C. Example connection paths between selective first switching assemblies, selective intermediate switching assemblies and selective second switching assemblies are later explained in detail, with reference to FIGS. 6C, 6D, and 6E. Example data flow path between the selective first switching assemblies, selective intermediate switching assemblies and selective second switching assemblies is later explained in detail with reference to FIG. 6F.

Now, referring to FIGS. 5A, 5B, 5C, 5D, 5E, and 5F an example interconnection between the plurality of first switching assemblies and the plurality of second switching assemblies in the switching network 100a will be described.

Figure 5A:
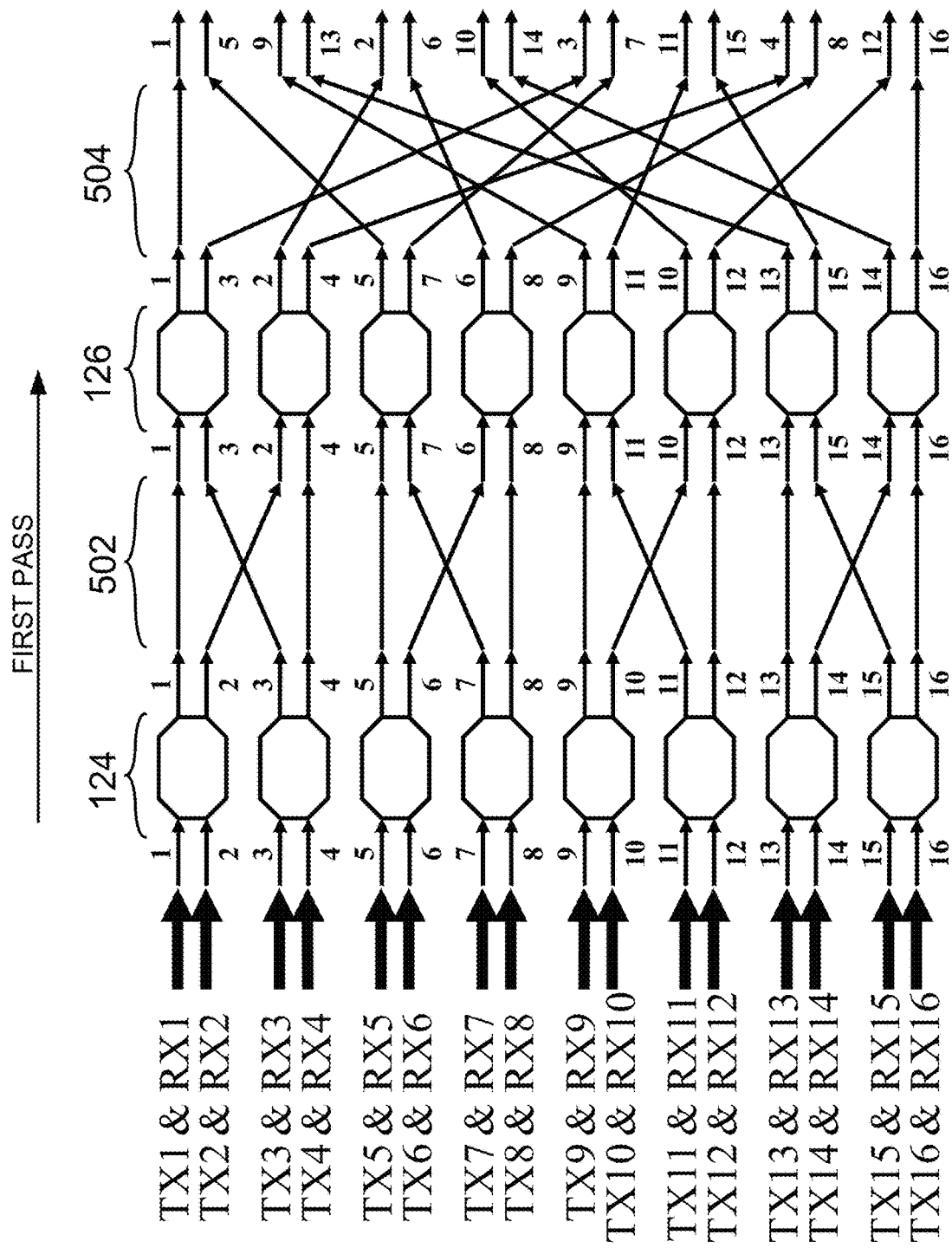
FIGS. 5A, 5B, 5C, 5D, 5E, and 5F show example interconnection between a plurality of first switching assemblies and a plurality of second switching assemblies of example switching network shown in FIG. 1A, according to one aspect of the present disclosure.

Now, referring to FIG. 5A, first layer 124 shows bank of first switching assemblies and last layer 126 shows bank of second switching assemblies. Bank of first switching assemblies include first switching assemblies 120a-120h and bank of second switching assemblies include second switching assemblies 122a-122h. Now, first pass of processing input through the bank of first switching assemblies 120a-120h and the bank of second switching assemblies 122a-122h will be described.

In one example, FIG. 5A also shows a first forward connection 502 between selective first switching assemblies and selective second switching assemblies. In the first forward connection 502, a selective pair of first switching assemblies are coupled to a selective pair of second switching assemblies. First forward connection 502 was earlier described in detail, with reference to FIG. 1A. In this example, input data 1-16 presented in sequence at input of selective first switching assemblies 120a-120h come out of the selective second switching assemblies as outputs in the sequence {1, 3, 2, 4, 5, 7, 6, 8, 9, 11, 10, 12, 13, 15, 14, and 16}.

An example connection between selective second switching assemblies and the first switching assemblies is shown by first modified forward connection 504. In one example, manipulation of the sequence of outputs at the second switching assemblies, before presenting as inputs to the first switching assemblies will be described with reference to FIG. 5B.

Figure 5B:
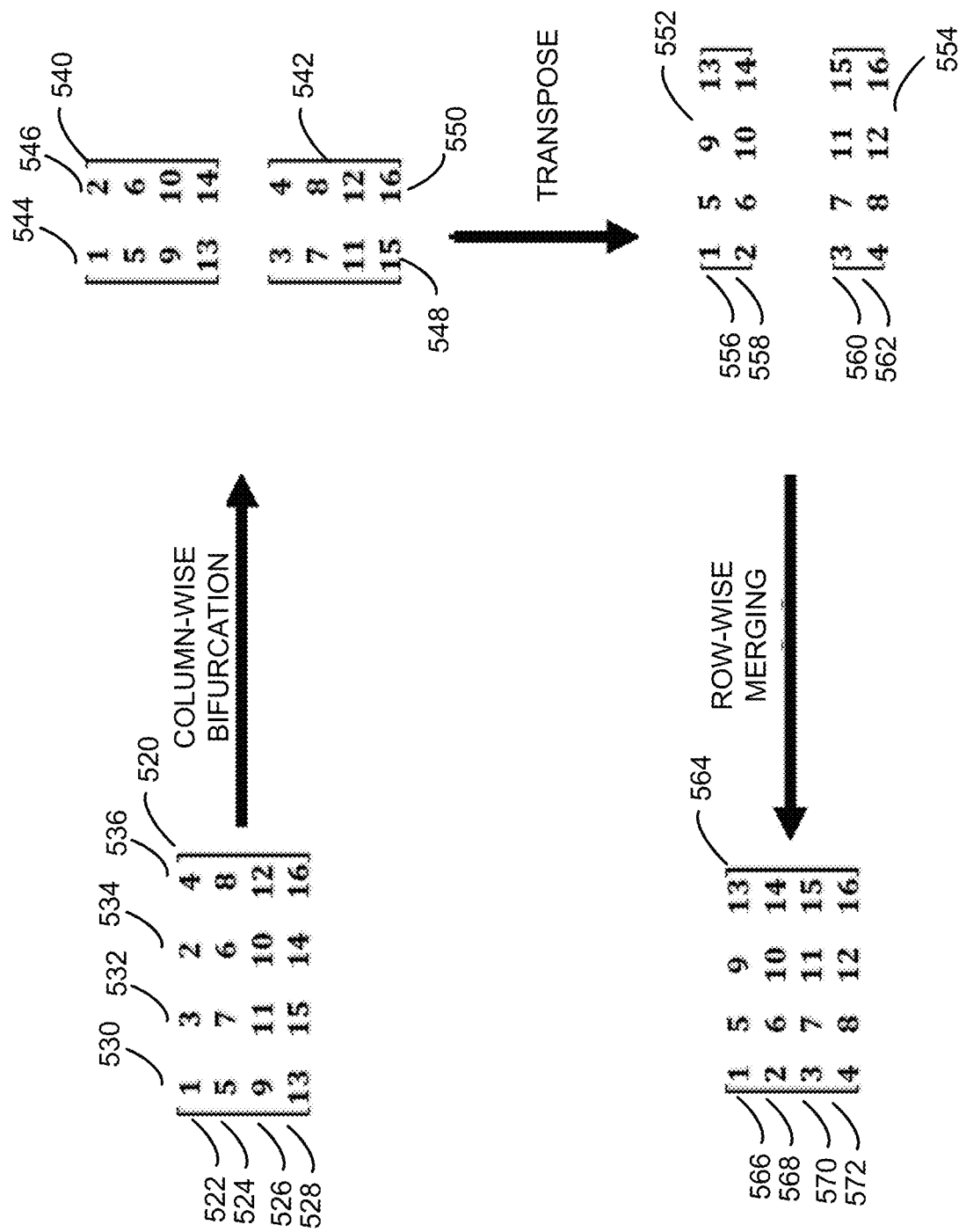

Now, referring to FIG. 5B, the outputs of the second switching assemblies are selectively arranged in a forward output matrix 520. The forward output matrix 520 is selectively transformed into a forward input matrix 564. The forward input matrix 564 provides the sequence in which the outputs of second switching assemblies are presented as inputs to the first switching assemblies.

In general, the outputs of the second switching assemblies are selectively arranged in sequence, in a forward output matrix 520. The forward output matrix 520 is selectively transformed into a forward input matrix 564. First, the outputs of the second switching assemblies 122a-122h are arranged as an R×C forward output matrix 520. Next, the forward output matrix 520 is column-wise bifurcated and rearranged as forward odd BM matrix 540 and forward even BM matrix 542, each arranged as an R×C/2 matrix. Next, the forward odd BM matrix 540 and forward even BM matrix 542 are each transposed and rearranged as forward odd TR matrix 552 and forward even TR matrix 554, each arranged as a C/2×R matrix. Finally, each of the forward odd TR matrix 552 and forward even TR matrix 554 are selectively merged to form the forward input matrix 564, arranged as an R×C matrix. The outputs of the forward input matrix 564 are row-wise arranged in sequence to form the input to selective first switching assemblies. Having generally described the transformation of the forward output matrix 520 into forward input matrix 564, the transformation is described below in detail. Determination of the values of R and C is later described in detail, with reference to FIG. 6.

The forward output matrix 520 is a 4×4 matrix, with four rows 522, 524, 526, and 528. The forward output matrix 520 is of the order of R×C matrix, where R is number of rows (here, 4) and C is number of columns (here, 4). Outputs of the second switching assemblies are sequentially arranged in each of the four rows 522, 524, 526, and 528. For example, row 522 includes outputs {1, 3, 2, 4}, row 524 includes outputs {5, 7, 6, 8}, row 526 includes outputs {9, 11, 10, 12}, and row 528 includes outputs {13, 15, 14, 16}. Now, the first column 530 of the output matrix includes outputs {1, 5, 9, 13}, second column 532 includes outputs {3, 7, 11, 15}, third column 534 includes outputs {2, 6, 10, 14} and fourth column 536 includes outputs {4, 8, 12, 16}. In summary, the forward output matrix 520 is of the order of R×C matrix, where R is number of rows and C is number of columns.

Next, the forward output matrix 520 is bifurcated and rearranged as two 4×2 matrices (four rows and two columns), for example, as forward odd BM matrix 540 and forward even BM matrix 542. In one example, the forward output matrix 520 is column-wise bifurcated. Each of the forward odd BM matrix 540 and forward even BM matrix 542 is of the order of R×C/2 matrix, where R is number of rows and C is number of columns of the forward output matrix 520. In the forward odd BM matrix 540, the outputs of first column 530 and third column 534 of the forward output matrix 520 form the forward odd BM first column 544 and forward odd BM second column 546, respectively, of the forward odd BM matrix 540. The outputs of the second column 532 and fourth column 536 of the forward output matrix 520 form the forward even BM first column 548 and forward even BM second column 550, respectively, of the forward even BM matrix 542. As one skilled in the art appreciates, forward odd BM first column 544 now has outputs {1, 5, 9, 13} and forward odd BM second column 546 now has outputs {2, 6, 10, 14}. And, forward even BM first column 548 now has outputs {3, 7, 11, 15} and forward even BM second column 550 has outputs {4, 8, 12, 16}.

Next, each of the forward odd BM matrix 540 and the forward even BM matrix 542 are transposed and rearranged as two 2×4 matrices, for example, as forward odd TR matrix 552 and forward even TR matrix 554. Each of the forward odd TR matrix 552 and forward even TR matrix 554 is of the order of C/2×R, where C is number of columns and R is number of rows in the forward output matrix 520. In the forward odd TR matrix 552, the forward odd BM first column 544 and forward odd BM second column 546 become forward odd TR first row 556 and forward odd TR second row 558, respectively. And, the forward even BM first column 548 and forward even BM second column 550 become forward even TR first row 560 and forward even TR second row 562. As one skilled in the art appreciates, forward odd TR first row 556 now has outputs {1, 5, 9, 13} and forward odd TR second row 558 now has outputs {2, 6, 10, 14}. And, forward even TR first row 560 now has outputs {3, 7, 11, 15} and forward even TR second row 562 has outputs {4, 8, 12, 16}.

Next, each of the forward odd TR matrix 552 and the forward even TR matrix 554 are merged and rearranged as a single 4×4 matrix, for example, to form forward input matrix 564. The forward input matrix 564 is of the order of R×C matrix, where R is number of rows and C is number of columns of the forward output matrix 520. In one example, the forward odd TR matrix 552 and the forward even TR matrix 554 are row-wise merged to form forward input matrix 564. During the merge operation, the rows of the forward odd TR matrix 552 and the forward even TR matrix 554 are sequentially placed to form the forward input matrix 564. For example, forward input matrix 564 has forward input first row 566, forward input second row 568, forward input third row 570, and forward input fourth row 572. The forward input first row 566 has {1, 5, 9, 13}, forward input second row 568 has {2, 6, 10, 14}, forward input third row 570 has {3, 7, 11, 15} and forward input fourth row 572 has {4, 8, 12, 16}.

The outputs in forward input first row 566, forward input second row 568, forward input third row 570, and forward input fourth row 572 are arranged in sequence to form the input to the selective first switching assemblies. In this example, the input to the selective first switching assemblies is {1, 5, 9, 13, 2, 6, 10, 14, 3, 7, 11, 15, 4, 8, 12, 16}. As one skilled in the art appreciates, the input to selective first switching assemblies is based on row-wise sequence of forward input matrix 564.

Now, referring back to FIG. 5A, an example connection between selective second switching assemblies and selective first switching assemblies is shown by first modified forward connection 504, according to the sequence determined by the forward input matrix 564, as described above. Selective first switching assemblies will now receive the inputs {1, 5, 9, 13, 2, 6, 10, 14, 3, 7, 11, 15, 4, 8, 12, 16} and these inputs are again processed by the bank of first switching assemblies 120a-120h and the bank of second switching assemblies 122a-122h, provide an output, as a second pass. Now, second pass of processing input through the bank of first switching assemblies 120a-120h and bank of second switching assemblies 122a-122h will be described.

Figure 5C:
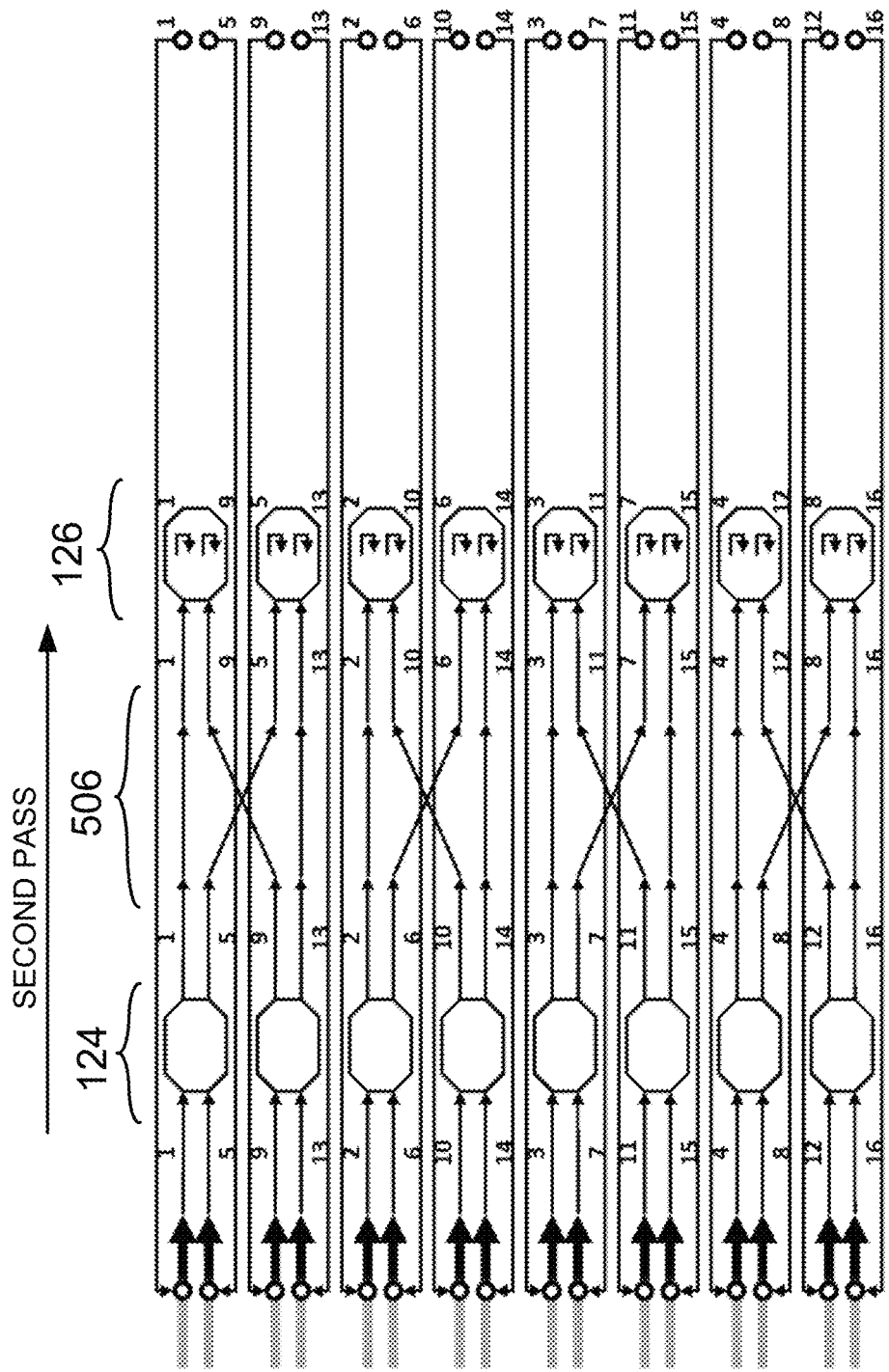

Now, referring to FIG. 5C, second pass of processing input through the bank of first switching assemblies 120a-120h and bank of second switching assemblies 122a-122h will be described. FIG. 5C also shows a second forward connection 506 between selective first switching assemblies and selective second switching assemblies. In the second forward connection 506, a selective pair of first switching assemblies are coupled to a selective pair of second switching assemblies. Second forward connection 506 is similar to first forward connection 502 which was earlier described in detail, with reference to FIG. 5A and FIG. 1A. In this example, input data 1-16 is presented in the sequence as previously shown in the forward input matrix 564 described with reference to FIG. 5B, in the sequence {1, 5, 9, 13, 2, 6, 10, 14, 3, 7, 11, 15, 4, 8, 12, 16} at input of selective first switching assemblies 120a-120h. These selective inputs to the selective first switching assemblies 120a-120h come out of the selective second switching assemblies as outputs in the sequence {1, 9, 5, 13, 2, 10, 6, 14, 3, 11, 7, 15, 4, 12, 8, 16}.

Figure 5D:
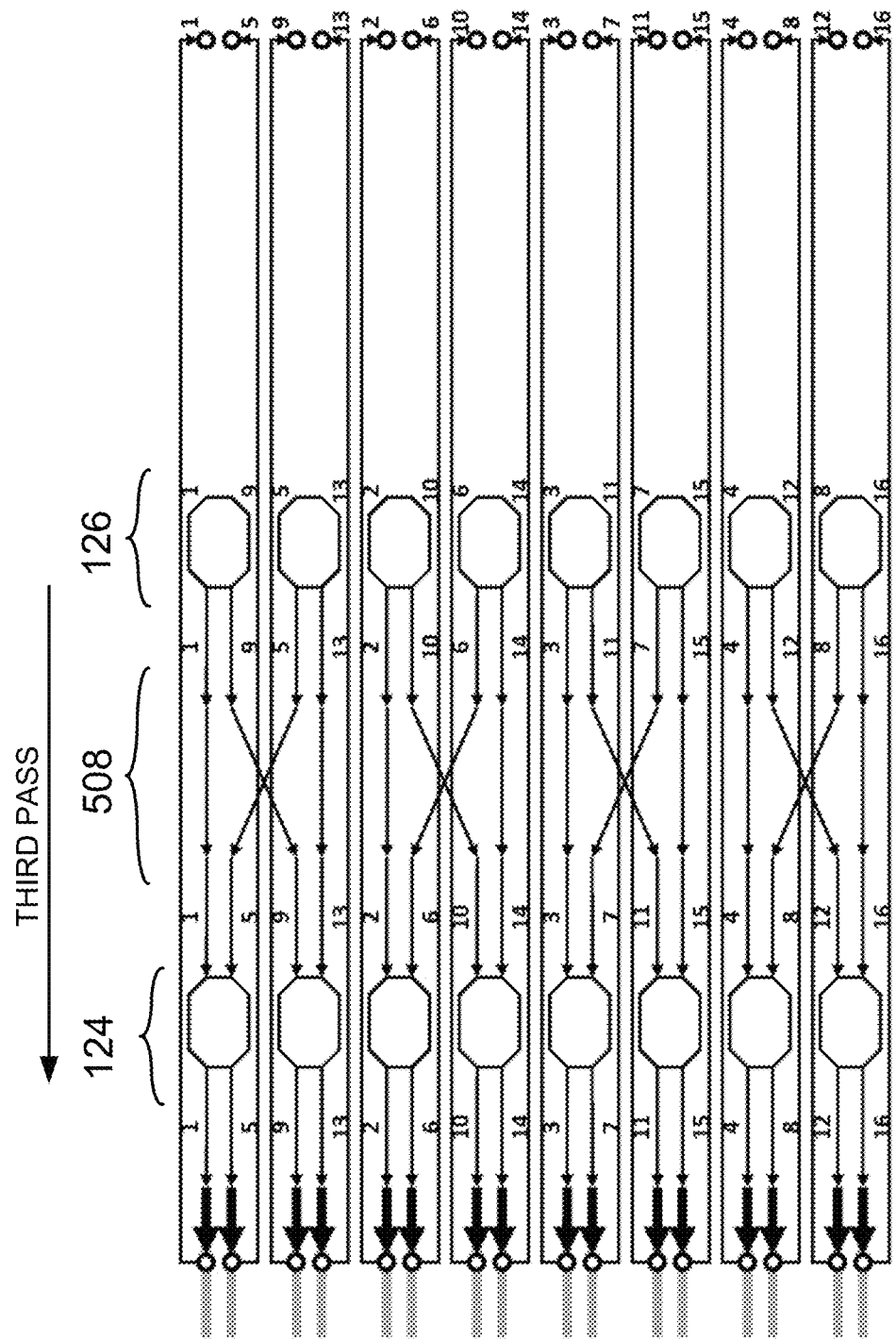

Now, referring to FIG. 5D, selective second switching assemblies will now receive the inputs sequence {1, 9, 5, 13, 2, 10, 6, 14, 3, 11, 7, 15, 4, 12, 8, and 16}, which was the output sequence of the selective second switching assemblies at the end of second pass. This is accomplished by selectively looping back the output of the second forward elements of second switching assemblies to second reverse elements of the second switching assemblies, as previously described with reference to FIG. 2B. For example, these outputs are coming out of the second forward elements of the second switching assemblies, out of second output selector switch (for example, second output selector switch 236a of second switching assembly 122a), which is internally looped back into second input selector switch (for example, second input selector switch 244a of second switching assembly 122a). Looped back inputs are again processed by the bank of second switching assemblies 122a-122h and the first switching assemblies 120a-120h, provide an output, as a third pass. Now, third pass of processing input through the bank of second switching assemblies 122a-122h and bank of first switching assemblies 120a-120h will be described.

Continuing to reference FIG. 5D, third pass of processing input through the bank of second switching assemblies 122a-122h and bank of first switching assemblies 120a-

120*h* will be described. FIG. 5D also shows a first reverse connection 508 between selective second switching assemblies and selective first switching assemblies. In the first reverse connection 508, a selective pair of second switching assemblies are coupled to a selective pair of first switching assemblies. In the third pass, the data flows from the second reverse element of selective second switching assemblies to the first reverse element of selective first switching assemblies, as previously described with reference to FIG. 3. First reverse connection 508 is similar to first forward connection 502 and second forward connection 506, except that the data is flowing in the reverse direction, in other words from selective second switching assemblies to selective first switching assemblies. In this example, input data 1-16 is presented in the sequence {1, 9, 5, 13, 2, 10, 6, 14, 3, 11, 7, 15, 4, 12, 8, 16} as previously described, after looping back in the second switching assemblies, as loop back input of selective second reverse elements of the second switching assemblies 122*a*-122*h*. The selective outputs of the selective second reverse elements of the second switching assemblies 122*a*-122*h* are presented as inputs to the selective first reverse elements of the first switching assemblies 120*a*-120*h*. These selective inputs then come out of the selective first switching assemblies as special reverse outputs in the sequence {1, 5, 9, 13, 2, 6, 10, 14, 3, 7, 11, 15, 4, 8, 12, 16}.

Having described the processing of the third pass and obtaining the outputs at the selective first switching assemblies, these outputs are again selectively fed back to the second switching assemblies in a fourth pass. Now, referring to FIG. 5E, an example connection between selective first switching assemblies and the second switching assemblies is shown by first modified reverse connection 510. In one example, manipulation of the sequence of outputs at the first switching assemblies, before presenting as inputs to the second switching assemblies will be described with reference to FIG. 5F.

Figure 5E:
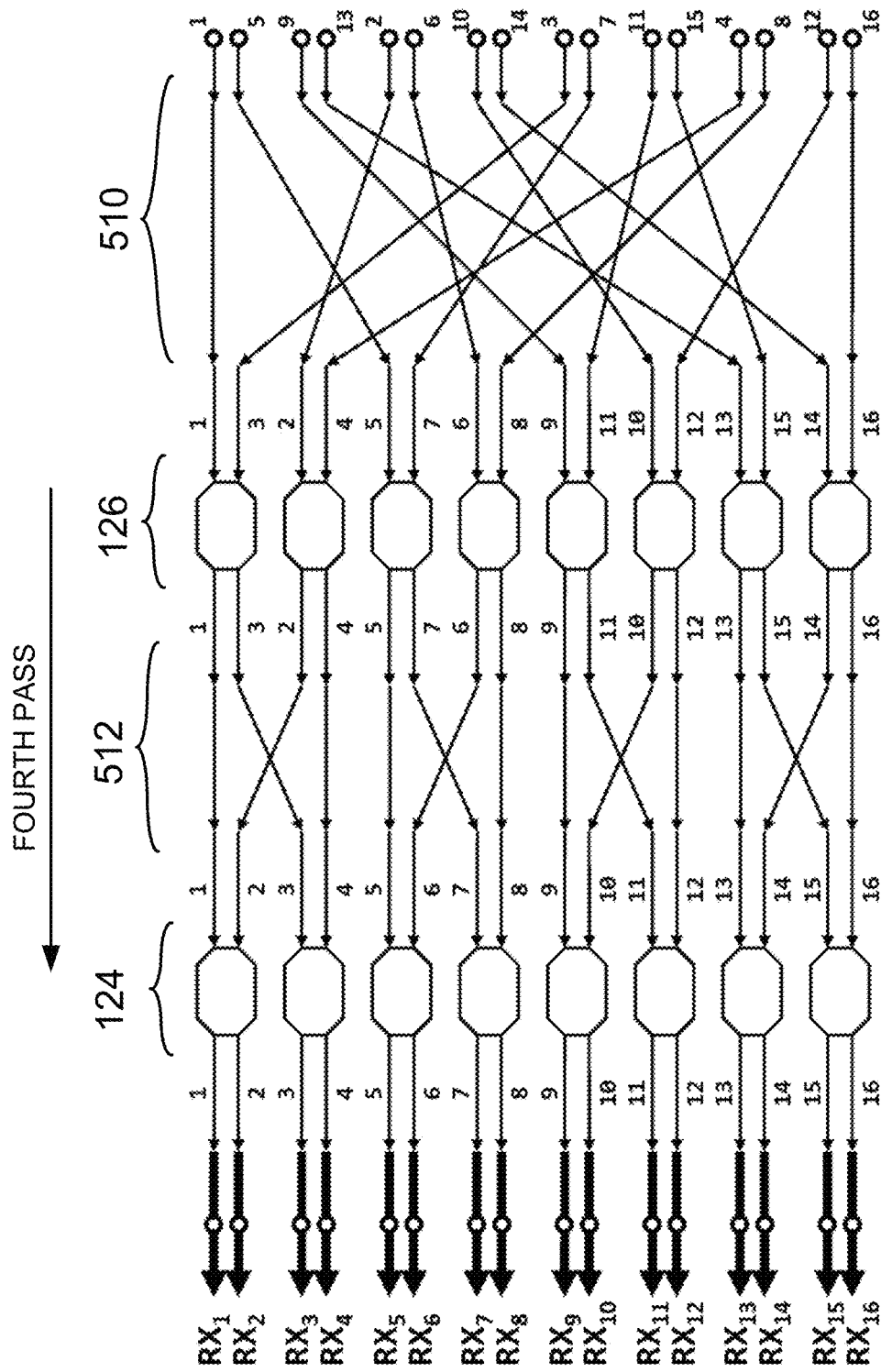
Figure 5F:
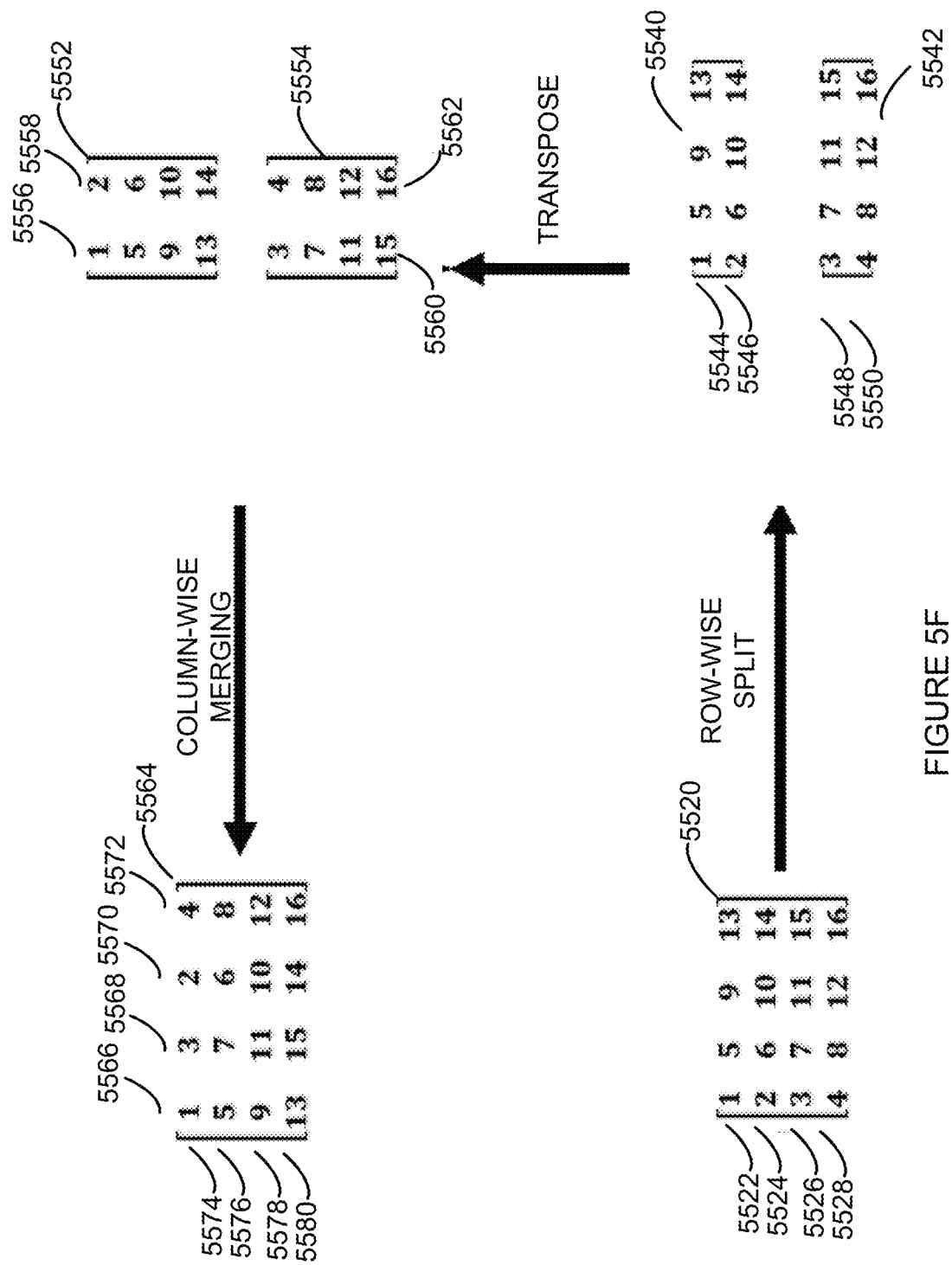

Now, referring to FIG. 5F, the outputs of the first switching assemblies are selectively arranged in a reverse output matrix 5520. The reverse output matrix 5520 is selectively transformed into a reverse input matrix 5564. The reverse input matrix 5564 provides the sequence in which the outputs of first switching assemblies are presented as inputs to the second switching assemblies.

In general, the outputs of the first switching assemblies are selectively arranged in sequence, in a reverse output matrix 5520. The reverse output matrix 5520 is selectively transformed into a reverse input matrix 5564. First, the outputs of the first switching assemblies 120*a*-120*h* are arranged as an R×C reverse output matrix 5520. Next, the reverse output matrix 5520 is row-wise split and rearranged as reverse first SM matrix 5540 and reverse second SM matrix 5542, each arranged as a C/2×R matrix. Next, the reverse first SM matrix 5540 and reverse second SM matrix 5542 are each transposed and rearranged as reverse first TR matrix 5552 and reverse second TR matrix 5554, each arranged as an R×C/2 matrix. Finally, each of the reverse first TR matrix 5552 and reverse second TR matrix 5554 are selectively merged to form the reverse input matrix 5564, arranged as an R×C matrix. The outputs of the reverse input matrix 5564 are row-wise arranged in sequence to form the input to selective second switching assemblies. Having generally described the transformation of the reverse output matrix 5520 into reverse input matrix 5564, the transformation is described below in detail. Determination of the values of R and C is later described in detail, with reference to FIG. 6.

The reverse output matrix 5520 is a 4×4 matrix, with four rows 5522, 5524, 5526, and 5528. Outputs of the first switching assemblies are sequentially arranged in each of the four rows, for example, first RM row 5522, second RM row 5524, third RM row 5526, and fourth RM row 5528. For example, first RM row 5522 includes outputs {1, 5, 9, 13}, second RM row 5524 includes outputs {2, 6, 10, 14}, third RM row 5526 includes outputs {3, 7, 11, 15}, and fourth RM row 5528 includes outputs {4, 8, 12, 16}.

Next, the reverse output matrix 5520 is split and arranged as two 2×4 matrices (two rows and four columns), for example, as reverse first SM matrix 5540 and reverse second SM matrix 5542. In one example, the reverse output matrix 5520 is row-wise split. In the reverse first SM matrix 5540, the outputs of first RM row 5522 and second RM row 5524 of the reverse output matrix 5520 form the reverse first SM first row 5544 and reverse first SM second row 5546. The outputs of the third RM row 5526 and the fourth RM row 5528 of the reverse output matrix 5520 form the reverse second SM first row 5548 and reverse second SM second row 5550. As one skilled in the art appreciates, reverse first SM first row 5544 now has outputs {1, 5, 9, 13} and reverse first SM second row 5546 now has outputs {2, 6, 10, 14}. And, reverse second SM first row 5548 now has outputs {3, 7, 11, 15} and reverse second SM second row 5550 has outputs {4, 8, 12, 16}.

Next, each of the reverse first SM matrix 5540 and reverse second SM matrix 5542 are transposed and rearranged as two 4×2 matrices, for example, as reverse first TR matrix 5552 and reverse second TR matrix 5554. In the reverse first TR matrix 5552, the reverse first SM first row 5544 and reverse first SM second row 5546 become reverse first TR first column 5556 and reverse first TR second column 5558, respectively. And, in the reverse second TR matrix 5554, the reverse second SM first row 5548 and reverse second SM second row 5550 become reverse second TR first column 5560 and reverse second TR second column 5562, respectively. As one skilled in the art appreciates, reverse first TR first column 5556 now has outputs {1, 5, 9, 13} and reverse first TR second column 5558 now has outputs {2, 6, 10, 14}. And, reverse second TR first column 5560 now has outputs {3, 7, 11, 15} and reverse second TR second column 5562 has outputs {4, 8, 12, 16}.

Next, each of the reverse first TR matrix 5552 and the reverse second TR matrix 5554 are selectively merged and rearranged as a single 4×4 matrix, for example, to form reverse input matrix 5564. In one example, the reverse first TR matrix 5552 and the reverse second TR matrix 5554 are column-wise alternatively merged to form reverse input matrix 5564. During the merge operation, the columns of the reverse first TR matrix 5552 and the reverse second TR matrix 5554 are alternatively placed to form the reverse input matrix 5564. For example, reverse input matrix 5564 has reverse input first column 5566 (same as reverse first TR first column 5556), reverse input second column 5568 (same as reverse second TR first column 5560), reverse input third column 5570 (same as reverse first TR second column 5558), and reverse input fourth column 5572 (same as reverse second TR second column 5562). The reverse input matrix 5564 now has reverse input first row 5574, reverse input second row 5576, reverse input third row 5578, and reverse input fourth row 5580. The reverse input first row 5574 has {1, 3, 2, 4}, reverse input second row 5576 has {5, 7, 6, 8}, reverse input third row 5578 has {9, 11, 10, 12}, and reverse input fourth row 5580 has {13, 15, 14, 16}.

The outputs in reverse input first row 5574, reverse input second row 5576, reverse input third row 5578, and reverse input fourth row 5580 are arranged in sequence to form the input to the selective second switching assemblies. In this example, the input to the selective second switching assemblies is {1, 3, 2, 4, 5, 7, 6, 8, 9, 11, 10, 12, 13, 15, 14, 16}.

As one skilled in the art appreciates, comparing the sequence {1, 3, 2, 4, 5, 7, 6, 8, 9, 11, 10, 12, 13, 15, 14, 16} from reverse input matrix with the forward output matrix sequence of {1, 3, 2, 4, 5, 7, 6, 8, 9, 11, 10, 12, 13, 15, 14, 16}, we notice that the sequence is same, but the direction of flow is reverse, in the sense, the connection is from first reverse element to second reverse element. In other words, the first modified forward connection 504 described with reference to FIG. 5A and the first modified reverse connection 510 described with reference to FIG. 5E are same, but the direction of flow of data is different, in the sense, the flow of data in first modified reverse connection 510 is reverse of flow of data in first modified forward connection 504.

Now, referring back to FIG. 5E, fourth pass of processing input through the bank of second switching assemblies 122a-122h and bank of first switching assemblies 120a-120h will be described. FIG. 5E also shows a second reverse connection 512 between selective second switching assemblies and selective first switching assemblies. In the second reverse connection 512, a selective pair of second switching assemblies are coupled to a selective pair of first switching assemblies. In the fourth pass, the data flows from the second reverse element of selective second switching assemblies to the first reverse element of selective first switching assemblies, as previously described with reference to FIG. 3. Second reverse connection 512 is similar to first forward connection 502 and second forward connection 506, except that the data is flowing in the reverse direction, in other words from selective second switching assemblies to selective first switching assemblies. Second reverse connection 512 is similar to first reverse connection 508 which was earlier described in detail, with reference to FIG. 5D. In this example, input data 1-16 is presented in the sequence {1, 3, 2, 4, 5, 7, 6, 8, 9, 11, 10, 12, 13, 15, 14, 16} as previously described, at input of selective second switching assemblies 122a-122h. These selective inputs to the selective second switching assemblies 122a-122h come out of the selective first switching assemblies as outputs in the sequence {1, 2, 3, 4, 5, 6, 7, 8, 9, 10, 11, 12, 13, 14, 15, 16}. In this example, the outputs correspond to outputs RX1-RX16 respectively. This concludes the processing of input data sequence of {1, 2, 3, 4, 5, 6, 7, 8, 9, 10, 11, 12, 13, 14, 15, 16} received at inputs TX1-TX16 which are presented in the sequence of {1, 2, 3, 4, 5, 6, 7, 8, 9, 10, 11, 12, 13, 14, 15, 16} at the outputs RX1-RX16.

Figure 5G:
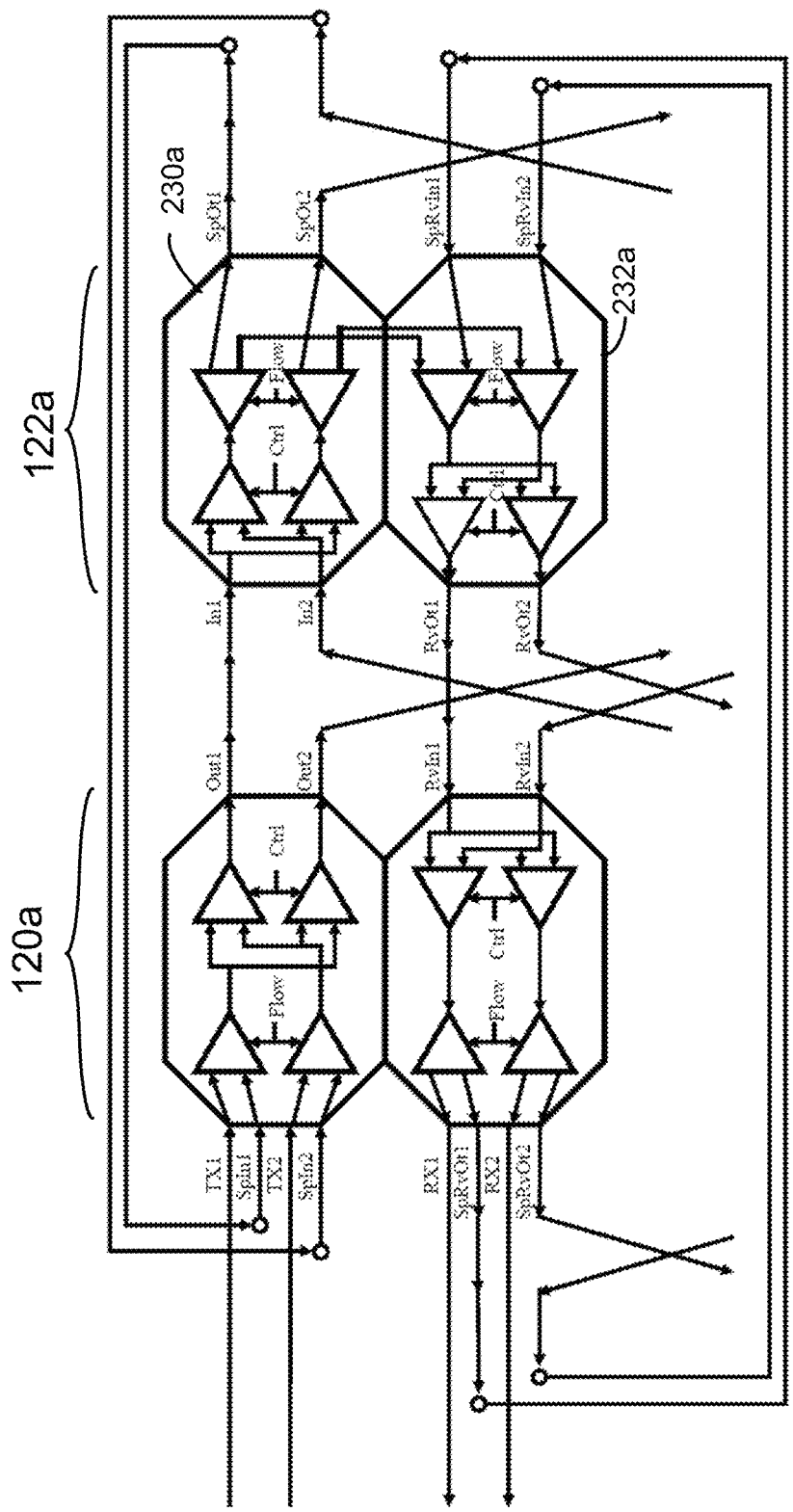
FIG. 5G shows an example flow of data from TX1 port to RX1 port of example switching network shown in FIG. 1A, according to one aspect of the present disclosure.

Now, referring to FIG. 5G, an example flow of data from TX1 to RX1 is described, for the 16×16 switching network 100a. FIG. 5G shows the first switching assembly 120a and second switching assembly 122a. In the first pass, the TX1 data moves to the output of first switching assembly 120a as Out1. This output is presented as input In1 to second switching assembly 122a. The input In1 received by the second switching assembly 122a comes out as output SpOt1. Next, as previously described with reference to FIG. 5B, this output is used in the forward output matrix 520 (corresponding to first entry in first row 522) and rearranged in forward input matrix 564. Based on the rearrangement in forward input matrix 564, this input corresponds to first entry in the forward input first row 566, with a value of 1.

Based on this rearrangement, the output SpOt1 is fed back as input SpIn1 in the first switching assembly 120a. Now, in the second pass, the SpIn1 input moves to output of first switching assembly 120a as Out1. This output is presented as input In1 to second switching assembly 122a. The input In1 received by the second switching assembly 122a is looped back inside the second switching assembly, from second forward element 230a to second reverse element 232a.

Now, in the third pass, the looped back input to second reverse element 232a comes out of second switching assembly 122a as output RvOt1. This output is fed as input RvIn1 to first switching assembly 120a, and comes out as output SpRvOt1.

Next, as previously described with reference to FIG. 5F, this output is used in the reverse output matrix 5520 (corresponding to first entry in first RM row 5522) and rearranged in reverse input matrix 5564. Based on the rearrangement in the reverse input matrix 5564, this input corresponds to first entry in the reverse input first row 5574, with a value of 1.

Based on this rearrangement, the output SpRvOt1 is fed back as input SpRvIn1 in the second switching assembly 122a. Now, in the fourth pass, the SpRvIn1 input moves to output of second switching assembly 122a as RvOt1. This output is presented as input RvIn1 to first switching assembly 120a. The input RvIn1 received by the first switching assembly 120a is output as output RX1. This concludes the flow of data presented at input TX1 flowing through the first switching assembly 120a and second switching assembly 122a and comes out as output at RX1.

Figure 5H:
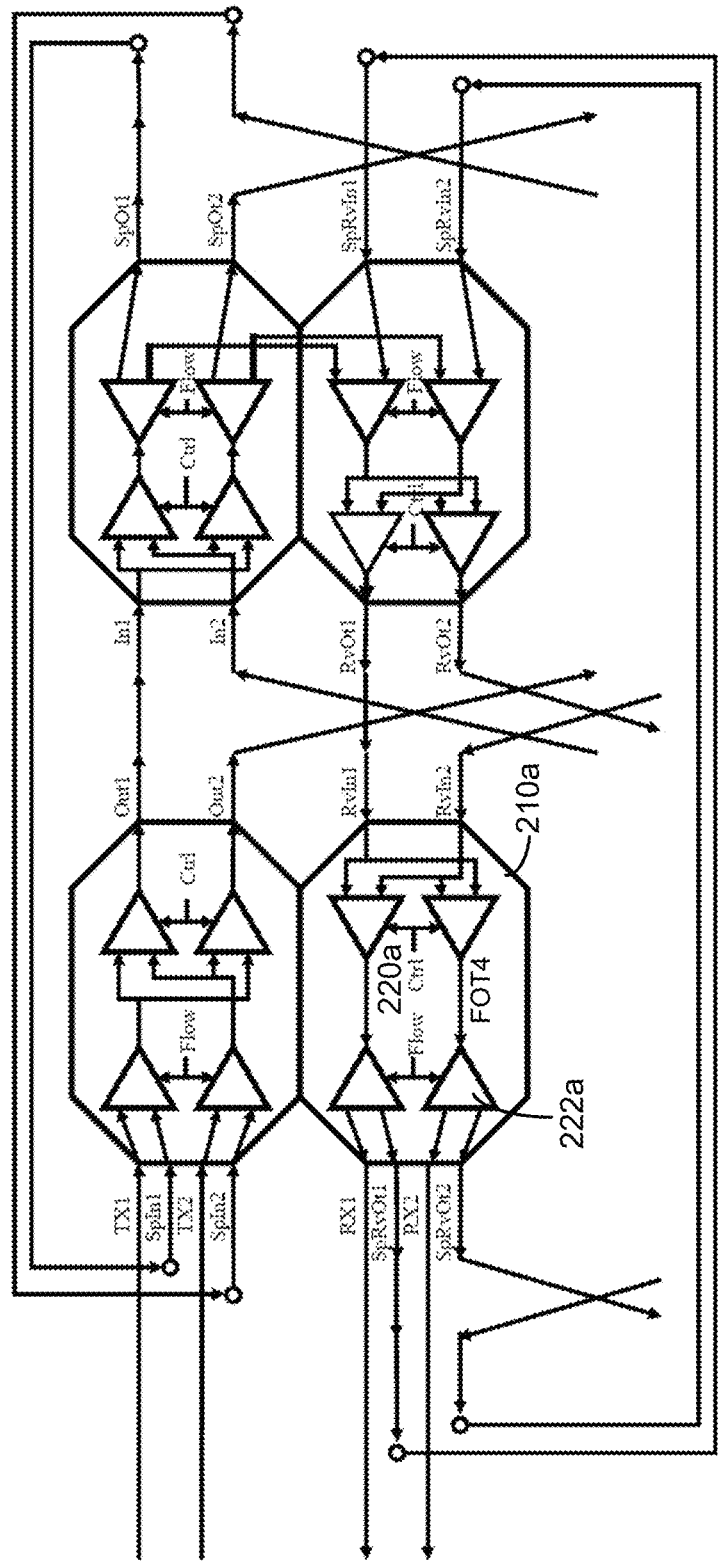
FIG. 5H shows an example flow of data from TX1 port to RX2 port of example switching network shown in FIG. 1A, according to one aspect of the present disclosure.

Now, referring to FIG. 5H, an example flow of data from TX1 to RX2 is described. FIG. 5H shows the first switching assembly 120a and second switching assembly 122a. In this example, the first pass, second pass, and third pass are same as previously described with reference to FIG. 5G. In the fourth pass, the SpRvIn1 input moves to output of second switching assembly 122a as RvOt1. This output is presented as input RvIn1 to first switching assembly 120a. The input RvIn1 received by the first switching assembly 120a is output as output RX2. This is accomplished by selectively setting the first reverse control signal 220a so that the output of first reverse switch 210a comes out as output FOT4 and thereafter, comes out of the de-multiplexer 222a as output RX2, as previously described in detail, with reference to FIG. 2A. This concludes the flow of data presented at input TX1 flowing through the first switching assembly 120a and second switching assembly 122a and comes out as output at RX2.

Having described an example forward output matrix 520 that is transformed into a forward input matrix 564 in FIG. 5B and a reverse output matrix 5520 that is transformed into a reverse input matrix 5564 in FIG. 5F, for a 16×16 switching network, the output matrices were 4×4 matrices and transformed input matrices were also 4×4 matrices. Now referring to FIG. 6, characteristics of output matrices to be used in switching assemblies with different number of TX ports and RX ports will now be described. These matrices are generally referred to as output transform matrix.

Referring to FIG. 6, table 600, column 602 shows number of TX ports and number of RX ports n. Column 604 shows the value of P, which is equal to log $2n$, column 606 shows number of layers L, which is equal to round (P/2), column 608 shows number of columns in the output transform matrix, which is equal to $2^L$, and column 610 shows number of rows in the output transform matrix, which is equal to $2^{P-L}$.

Now referring to row 612, we notice that number of TX and RX ports are 16, P=4, L=2, number of columns=4, and number of rows=4. So, output matrix will be a 4×4 matrix. As one skilled in the art appreciates, after transformation of the output matrix to generate the input matrix, the input matrix will also be a 4×4 matrix.

Now, referring to row 614, we notice that number of TX and RX ports are 32, P=5, L=3 (as value 2.5 is rounded up to 3), number of columns=8, and number of rows=4. So, output matrix will be a 4×8 matrix (four rows and eight columns). As one skilled in the art appreciates, after transformation of the output matrix to generate the input matrix, the input matrix will also be a 4×8 matrix.

Now, referring to row 616, we notice that number of TX and RX ports are 64, P=6, L=3, number of columns=8, and number of rows=8. So, output matrix will be an 8×8 matrix (eight rows and eight columns). As one skilled in the art appreciates after transformation of the output matrix to generate the input matrix, the input matrix will also be an 8×8 matrix.

Figure 6A:
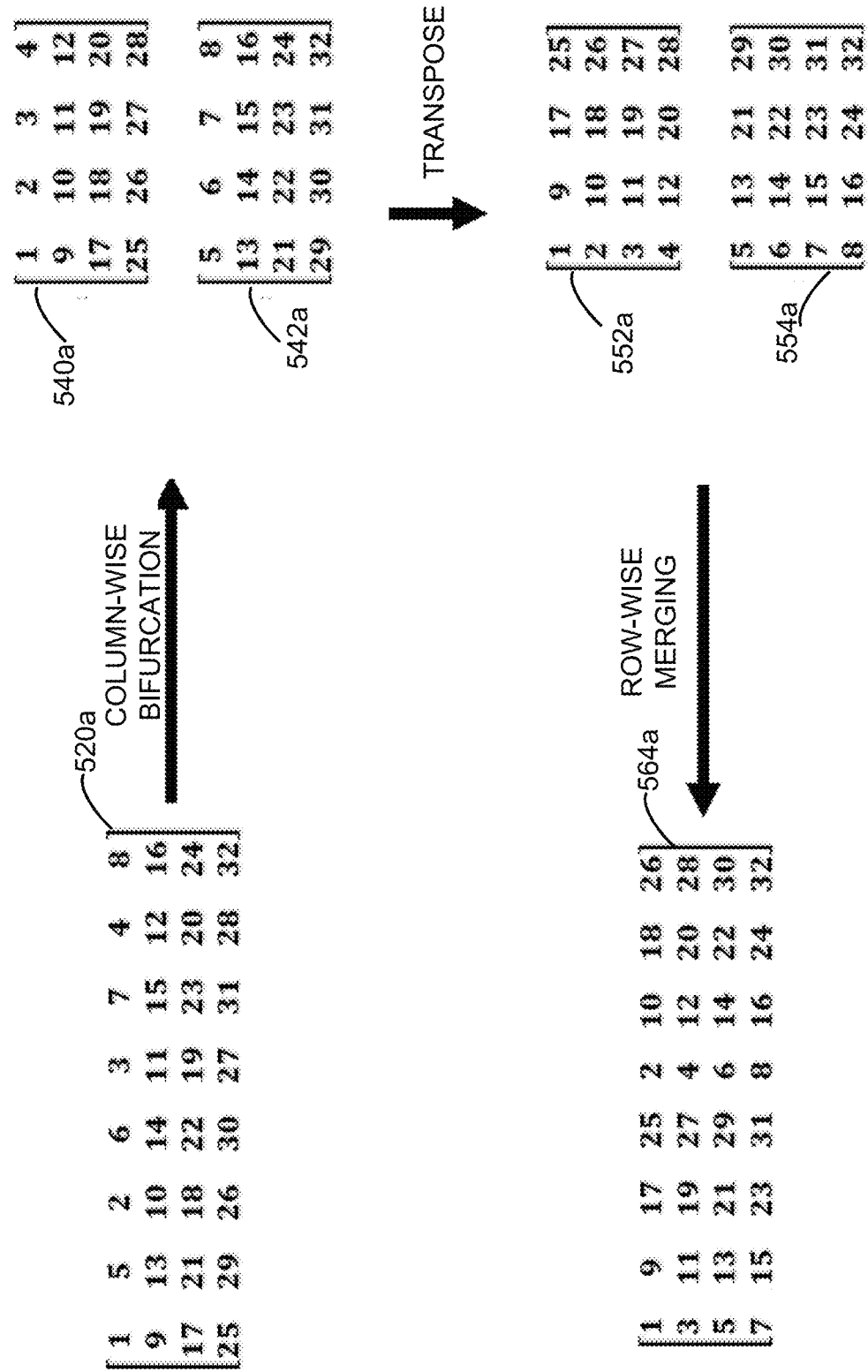
FIG. 6A shows an example transformation of a forward output matrix to a forward input matrix, for a 32×32 switching network as shown in FIG. 1C, according to one aspect of the present disclosure.

Now, referring to FIG. 6A, an example transformation of a forward output matrix 520a into a forward input matrix 564a for a 32×32 switching network is described. In this example, the forward output matrix 520a is a 4×8 matrix (row R=4, column C=8). And, the forward input matrix 564a is a 4×8 matrix. The size of the forward output matrix 520a is shown in FIG. 6, columns 608 and 610 of row 614. An example 32×32 switching network was previously described in detail, with reference to FIG. 1C.

The outputs of the second switching assemblies are selectively arranged in sequence, in a forward output matrix 520a. The forward output matrix 520a is selectively transformed into a forward input matrix 564a. First, the outputs of the second switching assemblies are arranged as an R×C forward output matrix 520a. In this example, R=4 and C=8. Next, the forward output matrix 520a is column-wise bifurcated and rearranged as forward odd BM matrix 540a and forward even BM matrix 542a, each arranged as an R×C/2 matrix, in this case as a 4×4 matrix. Next, the forward odd BM matrix 540a and forward even BM matrix 542a are each transposed and rearranged as forward odd TR matrix 552a and forward even TR matrix 554a, each arranged as a C/2×R matrix, in this case, as a 4×4 matrix. Finally, each of the forward odd TR matrix 552a and forward even TR matrix 554a are selectively merged to form the forward input matrix 564a, arranged as an R×C matrix. The outputs of the forward input matrix 564a are row-wise arranged in sequence to form the input to selective first switching assemblies. Detailed transformation operation of the forward output matrix 520a into forward input matrix 564a is similar to transformation operation previously described with reference to FIG. 5B.

Figure 6B:
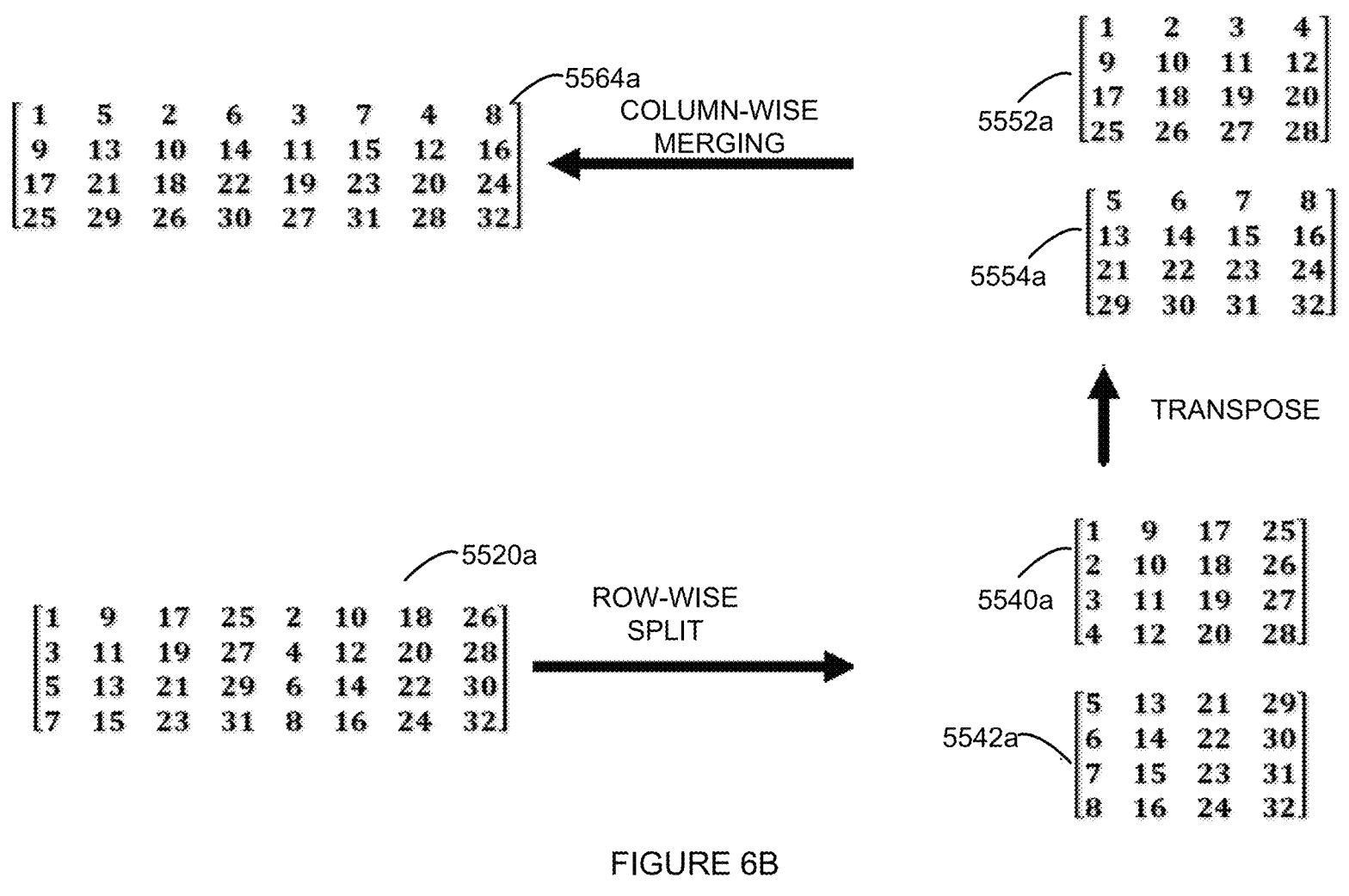

Now, referring to FIG. 6B, the outputs of the first switching assemblies are selectively arranged in a reverse output matrix 5520a. The reverse output matrix 5520a is selectively transformed into a reverse input matrix 5564a. The reverse input matrix 5564a provides the sequence in which the outputs of first switching assemblies are presented as inputs to the second switching assemblies.

The outputs of the first switching assemblies are selectively arranged in sequence, in a reverse output matrix 5520a. The reverse output matrix 5520a is selectively transformed into a reverse input matrix 5564a. First, the outputs of the first switching assemblies are arranged as an R×C reverse output matrix 5520a. In this example, the reverse output matrix 5520a is a 4×8 matrix. Next, the reverse output matrix 5520a is row-wise split and rearranged as reverse first SM matrix 5540a and reverse second SM matrix 5542a, each arranged as a C/2×R matrix, in this example, a 4×4 matrix. As one skilled in the art appreciates, as the number of columns C is twice the number of rows R in this example, the data in the row of reverse output matrix 5520a (8 items) is split into two (4 items) and arranged as sequential rows in the reverse first SM matrix 5540a and reverse second SM matrix 5542a. Next, the reverse first SM matrix 5540a and reverse second SM matrix 5542a are each transposed and rearranged as reverse first TR matrix 5552a and reverse second TR matrix 5554a, each arranged as an R×C/2 matrix. Finally, each of the reverse first TR matrix 5552a and reverse second TR matrix 5554a are selectively merged to form the reverse input matrix 5564a, arranged as an R×C matrix. The outputs of the reverse input matrix 5564a are row-wise arranged in sequence to form the input to selective second switching assemblies. Detailed transformation operation of the reverse output matrix 5520a into reverse input matrix 5564a is similar to transformation operation previously described with reference to FIG. 5F.

Having described the operation of a 16×16 switching network as shown in FIG. 1A and a 32×32 switching network as shown in FIG. 1C, now, example interconnection between selective switching assemblies in first adjacent layer and second adjacent layer will be further described. Now, referring to FIG. 6C, an example table 620 is shown. Some of the columns of table 620 are similar to some of the columns in table 600 shown in FIG. 6. For example, column 622, 624, and 626 of table 620 are same as columns 602, 604, and 606. Column 628 shows number of switching assemblies in each of the layers of the switching assembly. Column 630 shows number of adjacent layers in the switching assembly. Column 632 shows number of switching assemblies in each subgroup within each layer of the switching assemblies in the first adjacent layer. Column 634 shows number of subgroups in each layer of the switching assemblies in the first adjacent layer. Similarly, column 636 shows number of switching assemblies in each subgroup within each layer of the switching assemblies in the second adjacent layer. And, column 638 shows number of subgroups in each layer of the switching assemblies in the second adjacent layer. As previously described, one subgroup from one of the layer of the switching assemblies in the adjacent layer together with one subgroup from one of the other layer in the adjacent layer together form a group.

Now, referring to row 640, for a 16×16 switching network 100a as previously shown in FIG. 1A, referring to column 626, the switching assembly 100a has two layers of switching assemblies, referring to column 628, number of switching assemblies per layer is eight, referring to column 630, number of adjacent layers is one, referring to column 632, number of switching assemblies in each subgroup for each layer in the first adjacent layer is 2, and referring to column 634, number of subgroups in each layer of the first adjacent layer is four.

Now, referring to row 642, for a 32×32 switching network 100b as previously shown in FIG. 1C, referring to column 626, the switching assembly 100b has three layers of switching assemblies, referring to column 628, number of switching assemblies per layer is sixteen, referring to column 630, number of adjacent layers is two, referring to column 632, number of switching assemblies in each subgroup for each layer in the first adjacent layer is 2, and referring to column 634, number of subgroups in each layer of the first adjacent layer is eight. Further, referring to column 636, number of switching assemblies in each subgroup for each layer in the second adjacent layer is 4, and referring to column 638, number of subgroups in each layer of the second adjacent layer is four.

As one skilled in the art appreciates, as the number of TX and RX ports increase, additional intermediate layers may have to be added to configure the switching network. Columns 644 and 646 show number of switching assemblies and number of subgroups for each layer in third adjacent layers, which can be configured to provide 128×128 and 256×256 switching networks. Columns 648 and 650 show number of switching assemblies and number of subgroups for each layer in fourth adjacent layers, which can be configured to provide 512×512 and 1024×1024 switching networks. Columns 652 and 654 show number of switching assemblies and number of subgroups for each layer in fifth adjacent layers, which can be configured to provide 2048×2048 and 4096×4096 switching networks. Columns 656 and 658 show number of switching assemblies and number of subgroups for each layer in sixth adjacent layers, which can be configured to provide 8192×8192 and 16384×16384 switching networks. Columns 660 and 662 show number of switching assemblies and number of subgroups for each layer in seventh adjacent layers, which can be configured to provide 32768×32768 and 65536×65536 switching networks.

Now, generalizing, if we number adjacent layers in sequence as AL1, AL2, . . . ALx, the number of switching assemblies in each subgroup of adjacent layer ALx will be $2^x$. As an example, for an adjacent layer 3, the number of switching assemblies in each subgroup will be 8, as shown in column 644.

Figure 6D:
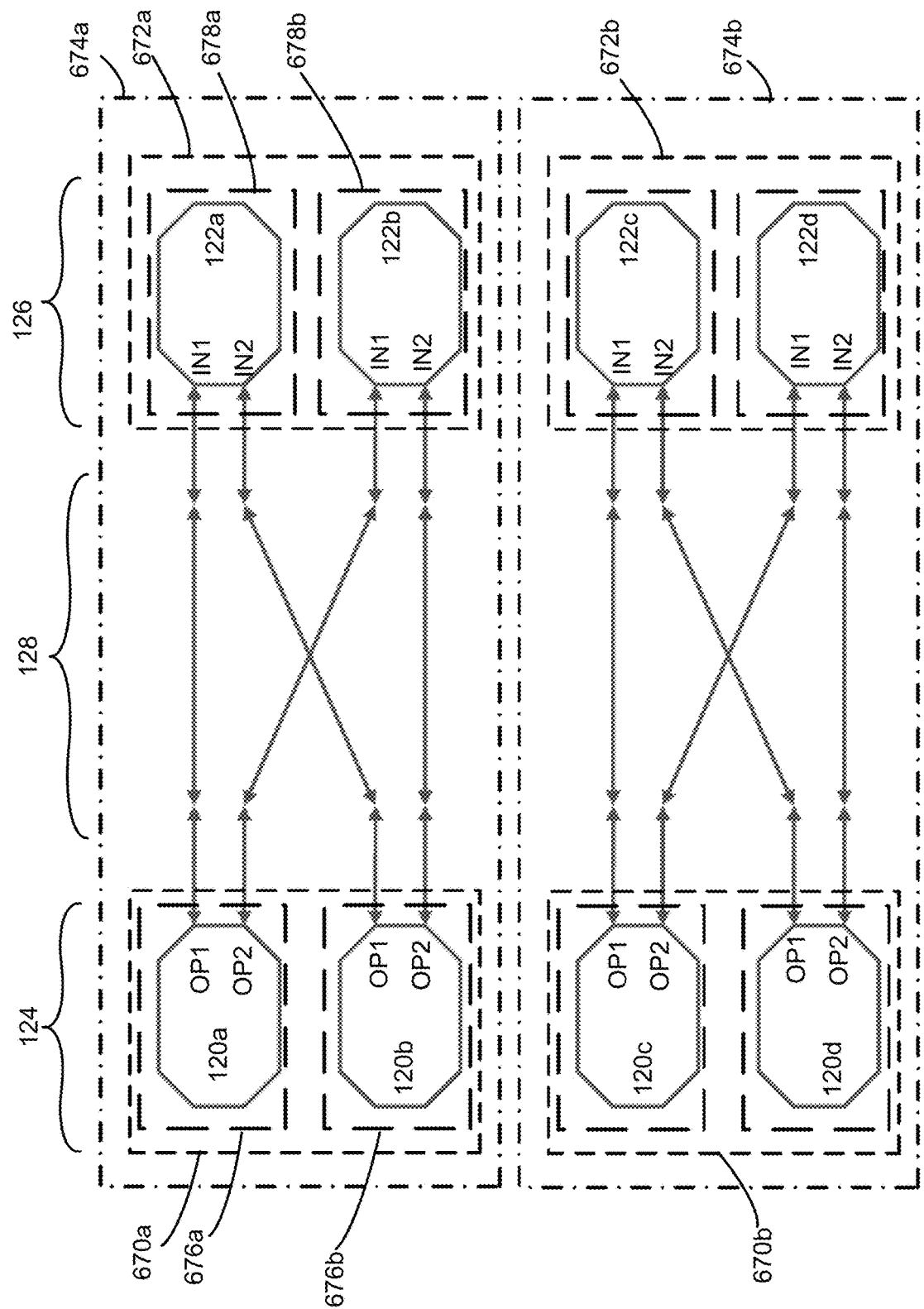
FIG. 6D shows example connection path in a 16×16 switching network, according to one aspect of the present disclosure.

FIG. 6D shows an example partial pattern of connection between the first switching assemblies and the second switching assemblies, for the 16×16 switching network, as previously described with reference to FIG. 1A. As previously described with reference to FIG. 6C, the 16×16 switching network has two layers of switching assemblies, for example, first layer 124, and last layer 126. First layer 124 has eight switching assemblies (only four first switching assemblies 120a-120d are shown here). Number of adjacent layers is one, shown by first adjacent layer 128. Number of subgroups in each adjacent layer is four. In each of the subgroups, there are two switching assemblies. For the first layer 124, two of the four subgroups, for example, subgroup 670a and subgroup 670b are shown. Subgroup 670a has first switching assemblies 120a and 120b. Subgroup 670b has first switching assemblies 120c and 120d. For the last layer 126, two of the four subgroups, for example, subgroup 672a and subgroup 672b are shown. Subgroup 672a has second switching assemblies 122a and 122b. Subgroup 672b has second switching assemblies 122c and 122d. First group 674a is formed by subgroups 670a and 672a. Second group 674b is formed by subgroups 670b and 672b. Two more groups are not shown here.

Now, example connection between switching assemblies in first group 674a is described. As previously described, each of the first switching assemblies 120a and 120b have two forward outputs and each of the second switching assemblies 122a and 122b have two forward inputs, that are selectively coupled using output of first forward elements of the first switching assemblies and the inputs of second forward elements of the second switching assemblies. Further, each of the first switching assemblies 120a and 120b have two reverse inputs and each of the second switching assemblies 122a and 122b have two reverse outputs that are selectively coupled using outputs of the second reverse elements of the second switching assemblies and the inputs of the first reverse elements of the first switching assemblies. Now, example forward connection between the first switching assemblies in the subgroup 670a and the second switching assemblies in the subgroup 672a will be described.

In one example, each of the subgroups are divided into a top portion and a bottom portion. For example, for the subgroup 670a with two switching assemblies, top portion 676a includes just first switching assembly 120a with first output OP1 and second output OP2 and the bottom portion 676b includes just first switching assembly 120b, with first output OP1 and second output OP2. Similarly, for the subgroup 672a with two switching assemblies, top portion 678a includes just second switching assembly 122a with first input IN1 and second input IN2 and the bottom portion 678b includes just second switching assembly 122b with first input IN1 and second input IN2.

The connections are performed as follows. The first output OP1 of top group is coupled to first input IN1 of top group. The second output OP2 of bottom group is coupled to second input IN2 of bottom group. The second output OP2 of top group is coupled to first input IN1 of bottom group. The first output OP1 of bottom group is coupled to second input IN2 of top group. Same connection path is followed for rest of the groups, for example, second group 674b. And, connection path in the reverse direction from outputs of second switching assemblies to the inputs of first switching assemblies will be the same, as shown by the bi-directional arrows, but will be between outputs of second reverse elements of second switching assemblies to the inputs of the first reverse elements of the first switching assemblies.

Now, example connection paths for a 32×32 switching network 100b, as previously described with reference to FIG. 1C will be described. Referring back to table 620 of FIG. 6C and row 642, we notice that the 32×32 switching network 100b has three layers and two adjacent layers, first adjacent layer and second adjacent layer. These three layers correspond to first layer 124, intermediate layer 140 and last layer 126. Further, first adjacent layer 128 includes first layer 124 and intermediate layer 140. The second adjacent layer 144 includes intermediate layer 140 and last layer 126. Further, for the first adjacent layer 128, there are two switching assemblies in each subgroup and there are eight subgroups. And, for the second adjacent layer 144, there are four switching assembles in each subgroup and there are four subgroups.

In one example, the connection path for the switching assemblies in the first adjacent layer will be same as described with reference to FIG. 6D, except that the connection path is between selective first switching assemblies and selective intermediate switching assemblies. Now, referring to FIG. 6E, the connection path between selective intermediate switching assemblies and selective second switching assemblies in the second adjacent layer 144 will be described.

Figure 6E:
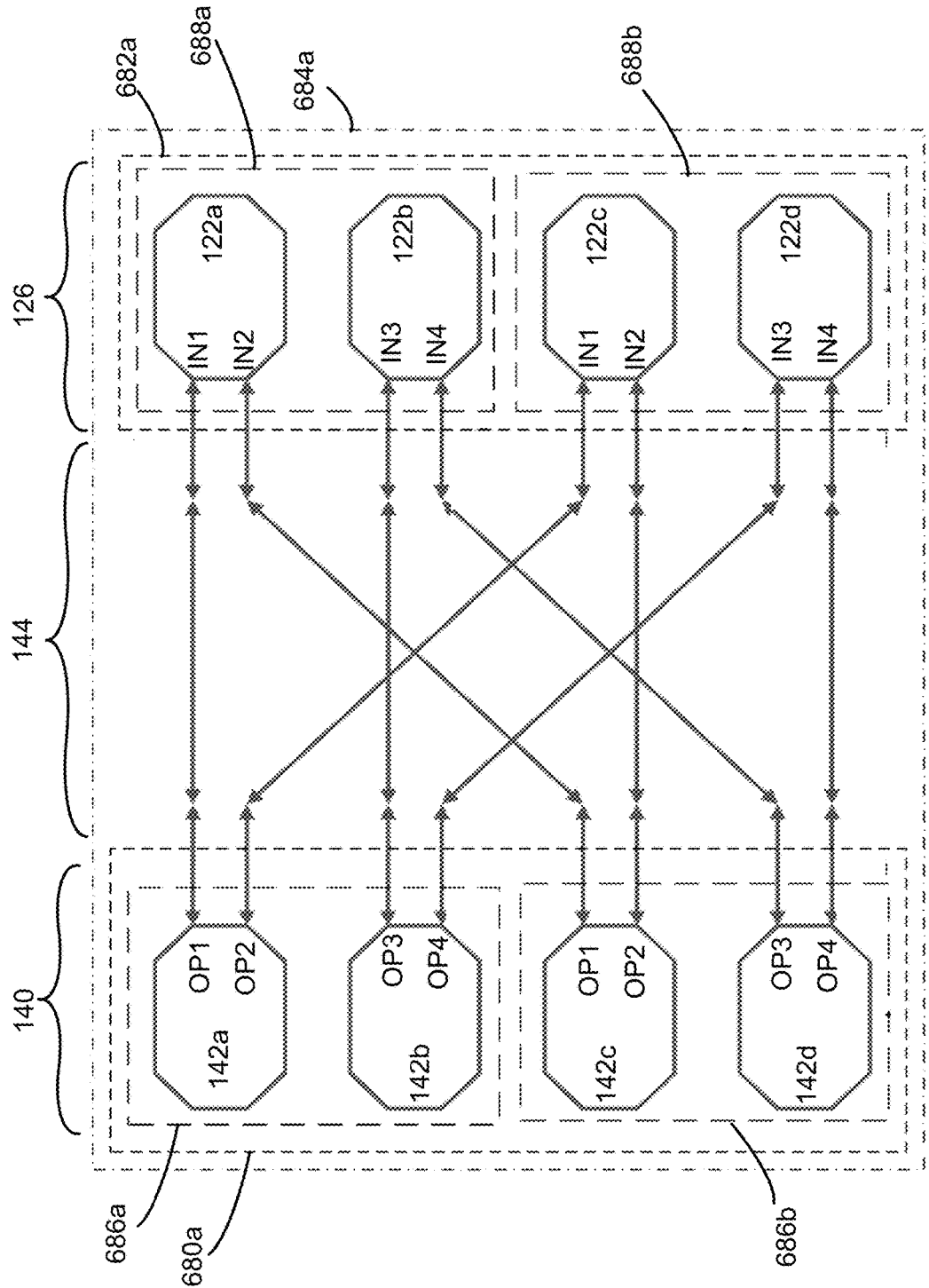
FIG. 6E shows example connection path in a second adjacent layer of a 32×32 switching network, according to one aspect of the present disclosure.

FIG. 6E shows one of the subgroups out of four subgroups. For the intermediate layer 140, one of the four subgroups, for example, subgroup 680a is shown. Subgroup 680a has intermediate switching assemblies 142a, 142b, 142c, and 142d. For the last layer 126, one of the four subgroups, for example, subgroup 682a is shown. Subgroup 682a has second switching assemblies 122a, 122b, 122c, and 122d. First group 684a is formed by subgroups 680a and 682a. Three more groups are not shown here.

Now, example connection between switching assemblies in first group 684a is described. As previously described, each of the intermediate switching assemblies 142a, 142b, 142c, and 142d have two forward outputs and each of the second switching assemblies 122a, 122b, 122c, and 122d have two forward inputs, that are selectively coupled using output of the intermediate forward elements of the intermediate switching assemblies and the inputs of the second forward elements of the second switching assemblies. Further, each of the intermediate switching assemblies 142a, 142b, 142c, and 142d have two reverse inputs and each of the second switching assemblies 122a, 122b, 122c, and 122d have two reverse outputs that are selectively coupled using output of the second reverse elements of the second switching assemblies and inputs of the intermediate reverse elements of the intermediate switching assemblies. Now, example forward connection between the intermediate switching assemblies in the subgroup 680a and the second switching assemblies in the subgroup 682a will be described.

In one example, each of the subgroups are divided into a top portion and a bottom portion. For example, for the subgroup 680a with four switching assemblies, top portion 686a includes two intermediate switching assemblies 142a and 142b. The intermediate switching assembly 142a has first output OP1 and second output OP2. The intermediate switching assembly 142b has first output OP3 and second output OP4. The bottom portion 686b includes two intermediate switching assemblies 142c and 142d. The intermediate switching assembly 142c has first output OP1 and second output OP2. The intermediate switching assembly 142d has first output OP3 and second output OP4. Similarly, for the subgroup 682a with four switching assemblies, top portion 688a includes two second switching assemblies 122a, and 122b. The second switching assembly 122a has first input IN1 and second input IN2. The second switching assembly 122b has first input IN3 and second input IN4. The bottom portion 688b includes two second switching assemblies 122c and 122d. The second switching assembly 122c has first input IN1 and second input IN2. The second switching assembly 122d has first input IN3 and second input IN4.

The connections are performed as follows. The first output OP1 of top group 686a is coupled to first input IN1 of top group 688a. The first output OP3 of top group 686a is coupled to first input IN3 of top group 688a. The second output OP2 of bottom group 686b is coupled to second input IN2 of bottom group 688b. The second output OP4 of bottom group 686b is coupled to second input IN4 of bottom group 688b. The second output OP2 of top group 686a is coupled to first input IN1 of bottom group 688b. The second output OP4 of top group 686a is coupled to first input IN3 of bottom group 688b. The first output OP1 of bottom group 686b is coupled to second input IN2 of top group 688a. The first output OP3 of bottom group 686b is coupled to second input IN4 of top group 688a. Same connection path is followed for rest of the three groups. And, connection path in the reverse direction from outputs of second switching assemblies to the inputs of intermediate switching assemblies will be the same, as shown by the bi-directional arrows, but will be between outputs of second reverse elements of second switching assemblies to the inputs of the intermediate reverse elements of the intermediate switching assemblies.

Having described interconnections for switching networks with two adjacent layers, a general logic for connection between two adjacent layers can be described as follows. First, based on the calculations shown in FIG. 6C, for a given adjacent layer, determine the number of subgroups and number of switching assemblies in each subgroup. Next, divide the switching assemblies in each subgroup into a top portion and a bottom portion. In the top portion, couple first output of each of the source switching assemblies to first input of each of the adjacent destination switching assem-
blies. For example, first output OP1 of source switching assembly 142a is coupled to first input IN1 of the adjacent destination switching assembly 122a. Next, in the bottom portion, connect second output of each of the source switching assemblies to second input of each of the adjacent destination switching assemblies. For example, second output OP2 of source switching assembly 142c is coupled to second input IN2 of adjacent destination switching assembly 122c.

Next, couple second outputs of source switching assemblies in the top portion to corresponding first inputs of destination switching assemblies in the bottom portion, in sequence. For example, couple second output OP2 of first source switching assembly 142a in the top portion to first input IN1 of first destination switching assembly 122c in the bottom portion. Similarly, couple second output OP4 of second source switching assembly 142b in the top portion to first input IN3 of second destination switching assembly 122d in the bottom portion.

And, finally, couple first outputs of source switching assemblies in the bottom portion to corresponding second inputs of destination switching assemblies in the top portion, in sequence. For example, couple first output OP1 of first source switching assembly 142c in the bottom portion to second input IN2 of first destination switching assembly 122a in the top portion. Similarly, couple first output OP3 of second source switching assembly 142d in the bottom portion to second input IN4 of second destination switching assembly 122b in the top portion.

Figure 6F:
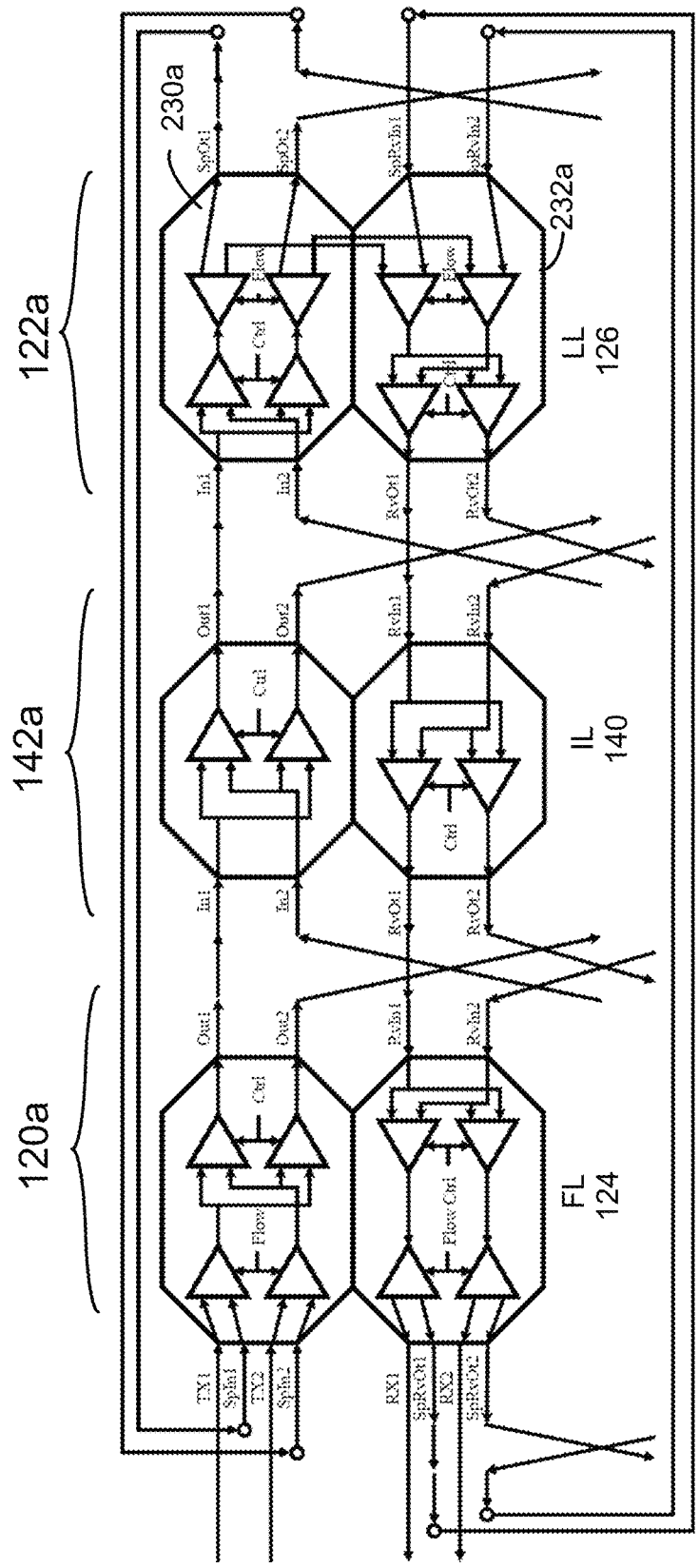
FIG. 6F shows an example flow of data from TX1 port to RX1 port of example 32×32 switching network shown in FIG. 1C, according to one aspect of the present disclosure.

Now, referring to FIG. 6F, an example flow of data from TX1 to RX1 is described, for the 32×32 switching network 100b, as previously described with reference to FIG. 1C. FIG. 6F shows the first switching assembly 120a, intermediate switching assembly 142a, and second switching assembly 122a. First switching assembly 120a is part of first layer 124. Second switching assembly 122a is part of last layer 126. And, the intermediate switching assembly 142a is part of intermediate layer 140. In the first pass, the TX1 data moves to the output of first switching assembly 120a as Out1(FL). This output is presented as input In1(IL) to intermediate switching assembly 142a. The output Out1(IL) of the intermediate switching assembly 142a is presented as input In1(LL) to second switching assembly 122a. The input In1(LL) received by the second switching assembly 122a comes out as output SpOt1. Next, as previously described with reference to FIG. 6A, this output is used in the forward output matrix 520a (corresponding to first entry in first row of forward output matrix 520a) and rearranged in forward input matrix 564a. Based on the rearrangement in forward input matrix 564a, this input corresponds to first entry in first row of forward input matrix 564a, with a value of 1.

Based on this rearrangement, the output SpOt1 is fed back as input SpIn1 in the first switching assembly 120a. Now, in the second pass, the SpIn1 input moves to output of first switching assembly 120a as Out1(FL). This output is presented as input In1(IL) to intermediate switching assembly 142a and comes out as output Out1(IL) from the intermediate switching assembly 142a. Next, the output Out1(IL) from the intermediate switching assembly 142a is applied as input In1 (LL) to the second switching assembly 122a. The input In1(LL) received by the second switching assembly 122a is looped back inside the second switching assembly, from second forward element 230a to second reverse element 232a.

Now, in the third pass, the looped back input to second reverse element 232a comes out of second switching assembly 122a as output RvOt1(LL). This output is fed as input RvIn1(IL) to intermediate switching assembly 142a and comes out as output RvOt1(IL). This output RvOt1(IL) is fed to first switching assembly 120a as RvIn1(FL), and comes out as output SpRvOt1.

Next, as previously described with reference to FIG. 6B, this output is used in the reverse output matrix 5520a (corresponding to first entry in first row of reverse output matrix 5520a) and rearranged in reverse input matrix 5564a. Based on the rearrangement in the reverse input matrix 5564a, this input corresponds to first entry in the first row of reverse input matrix 5564a, with a value of 1.

Based on this rearrangement, the output SpRvOt1 is fed back as input SpRvIn1 in the second switching assembly 122a. Now, in the fourth pass, the SpRvIn1 input moves to output of second switching assembly 122a as RvOt1(LL). This output is presented as input RvIn1(IL) to intermediate switching assembly 142a and comes out as output RvOt1 (IL). The output RvOt1 (IL) from the intermediate switching assembly 142a is then fed to first switching assembly 120a as RvIn1(FL). The input RvIn1(FL) received by the first switching assembly 120a is output as output RX1. This concludes the flow of data presented at input TX1 flowing through the first switching assembly 120a, intermediate switching assembly 142a and second switching assembly 122a and comes out as output at RX1.

Figure 7:
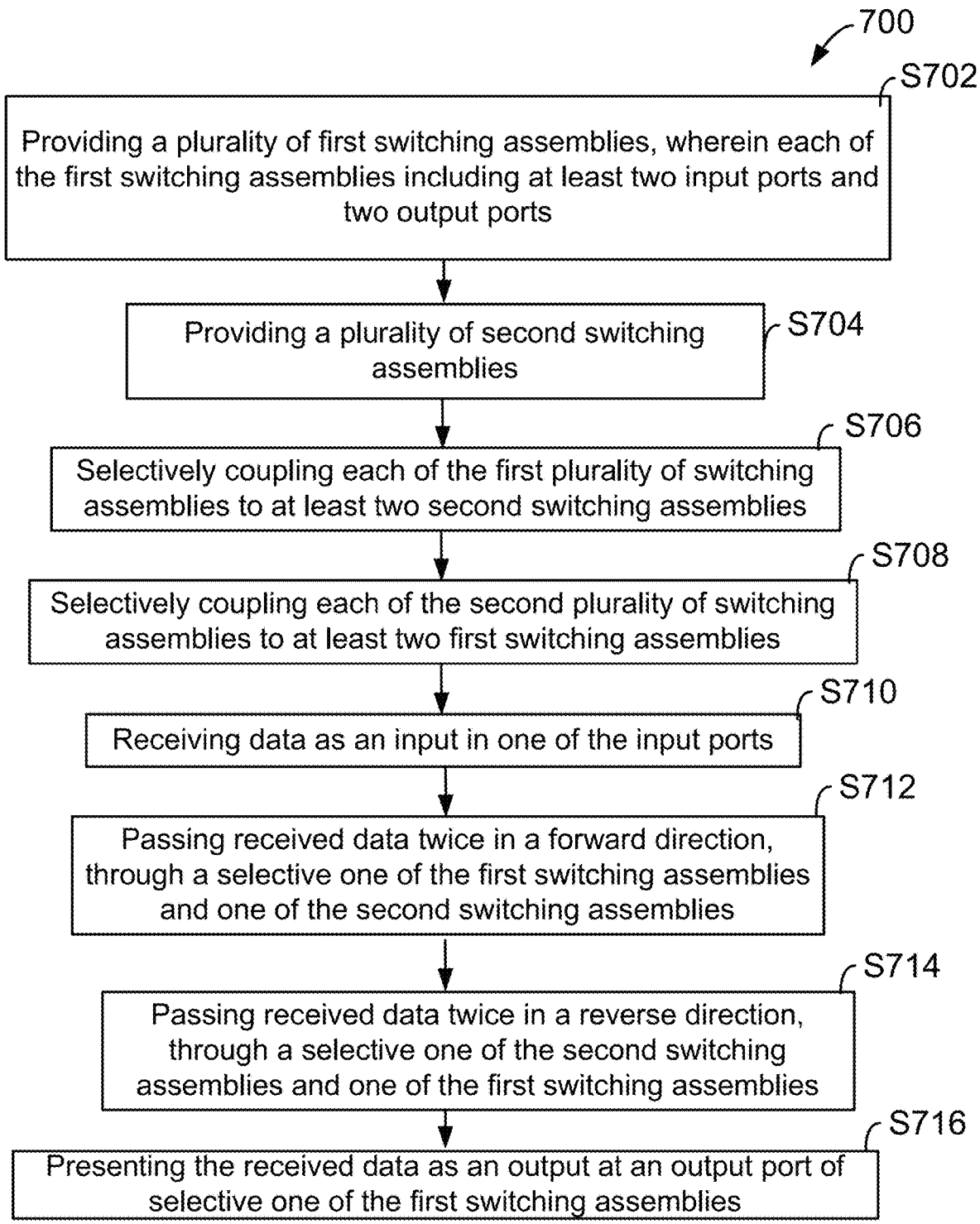
FIG. 7 shows an example flow diagram, according to one aspect of the present disclosure.

Now, referring to FIG. 7, an example flow diagram 700 is disclosed. In block S702, a plurality of first switching assemblies are provided, wherein each of the first switching assemblies include at least two input ports and two output ports. For example, referring to FIG. 1A, a plurality of first switching assemblies 120a-120h are provided, with TX1-TX16 input ports and RX1-RX16 output ports. In block S704, a plurality of second switching assemblies are provided. For example, referring to FIG. 1A, a plurality of second switching assemblies 122a-122h are provided.

In block S706, each of the first plurality of switching assemblies are coupled to at least two second switching assemblies. For example, first switching assembly 120a is at least coupled to two second switching assemblies 122a and 122b.

In block S708, each of the second plurality of switching assemblies are coupled to at least two first switching assemblies. For example, second switching assembly 122a is at least coupled to two first switching assemblies 120a and 120b.

In block S710, data is received as an input in one of the input ports. For example, data is received as an input at input port TX1 of first switching assembly 120a.

In block S712, the received data is passed twice in a forward direction, through a selective one of the first switching assemblies and one of the second switching assemblies. For example, referring to FIG. 5G, received data at input port TX1 is passed once through the first switching assembly 120a to second switching assembly 122a in a first pass, in the forward direction, and again passed a second time, through the first switching assembly 120a to second switching assembly 122a in a second pass, in the forward direction.

In block S714, the received data is passed twice in a reverse direction, through a selective one of the second switching assemblies and one of the first switching assemblies. For example, referring to FIG. 5G, received data at input port TX1 is passed once through the second switching assembly 122a to first switching assembly 120a in a third pass, in the reverse direction, and again passed a second time, through the second switching assembly 122a to first switching assembly 120a in a fourth pass, in the reverse direction.

In block S716, the received data is presented as an output at an output port of selective one of the first switching assemblies. For example, after the fourth pass, the received data at TX1 input port is presented at the RX1 output port of the first switching assembly 120a.

Figure 8:
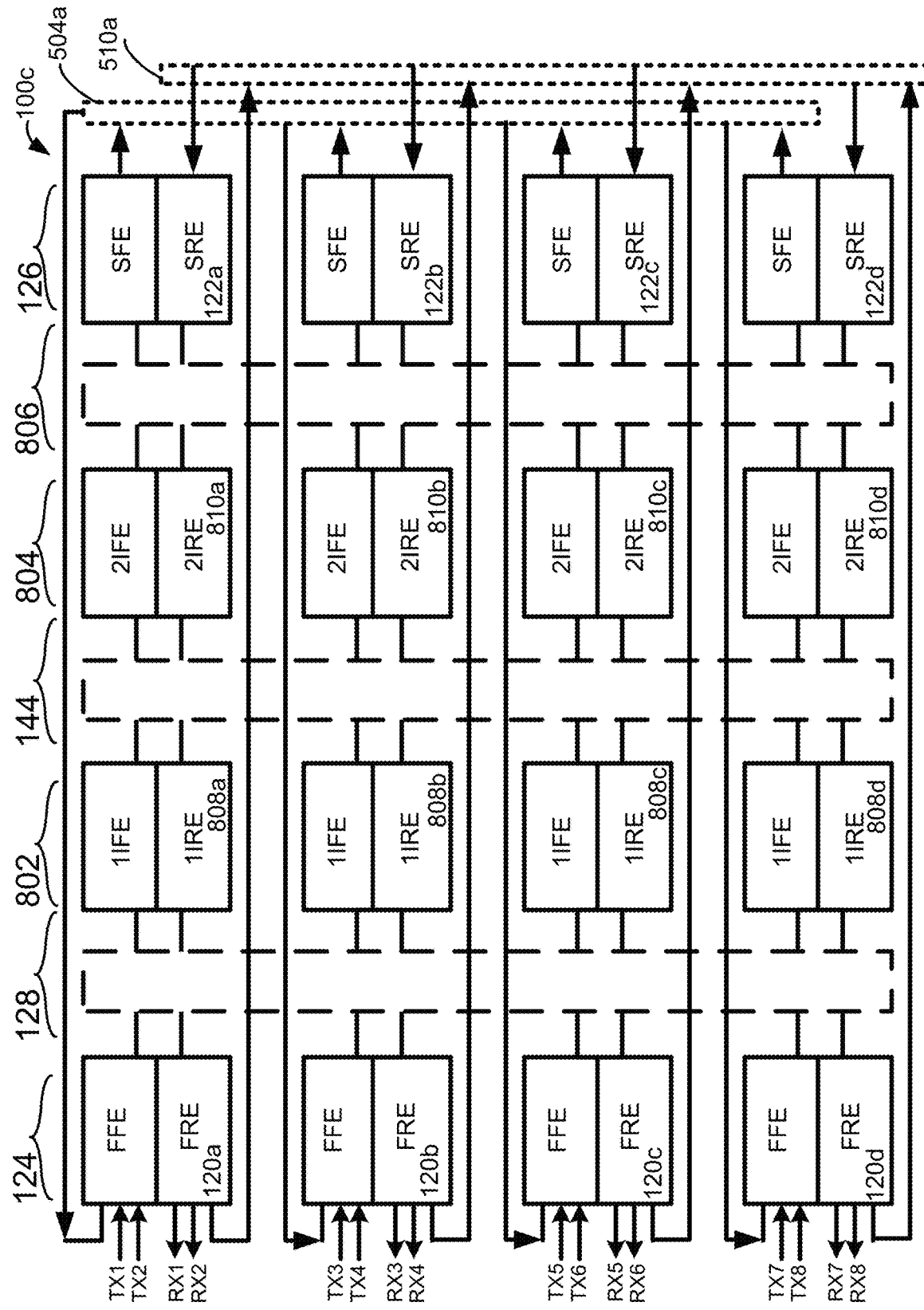
FIG. 8 shows an example four layer switching network, according to one aspect of the present disclosure.

Now, referring to FIG. 8, another switching network 100c is disclosed. Switching network 100c has four layers, a first layer 124 of a plurality of first switching assemblies, a last layer 126 with a plurality of second switching assemblies, a first intermediate layer 802 with a plurality of first intermediate switching assemblies and a second intermediate layer 804 with a plurality of second intermediate switching assemblies. Given that there are four layers (or L=4), based on the table 130 described with reference to FIG. 1B, the switching network 100c can be configured as either a 128×128 switching network or a 256×256 switching network. Further, referring to table 620 of FIG. 6C, we notice that for a 128×128 switching network, number of switching assemblies per layer will be 64, number of adjacent layers will be 3, number of switching assemblies in each subgroup in the first adjacent layers will be 2, with 32 subgroups, number of switching assemblies in each subgroup in the second adjacent layers will be 4, with 16 subgroups, and number of switching assemblies in each subgroup in the third adjacent layers will be 8, with 8 subgroups.

Similarly, we notice that for a 256×256 switching network, number of switching assemblies per layer will be 128, number of adjacent layers will be 3, number of switching assemblies in each subgroup in the first adjacent layers will be 2, with 64 subgroups, number of switching assemblies in each subgroup in the second adjacent layers will be 4, with 32 subgroups, and number of switching assemblies in each subgroup in the third adjacent layers will be 8, with 16 subgroups.

Switching network 100c is similar to switching network 100a in that it has a plurality of first switching assemblies, and a plurality of second switching assemblies, however, the number of first switching assemblies in the first layer 124 and number of second switching assemblies in the last layer 126 will be either 64 for a 128×128 switching network or 128 for a 256×256 switching network. And, switching network 100c is similar to switching network 100b in that it has a plurality of first switching assemblies, a plurality of intermediate switching assemblies, and a plurality of second switching assemblies, however, the number of first switching assemblies in the first layer 124, number of first intermediate switching assemblies in the first intermediate layer 802, number of second intermediate switching assemblies in the second intermediate layer 804 and number of second switching assemblies in the last layer 126 will be either 64 for a 128×128 switching network or 128 for a 256×256 switching network.

Further, in the switching network 100c, the first layer 124 and first intermediate layer 802 form a pair of first adjacent layer 128, the first intermediate layer 802 and second intermediate layer 804 form a pair of second adjacent layer 144. And the second intermediate layer 804 and the last layer 126 form a pair of last adjacent layer 806. In one example, selective groups of switching assemblies in the pair of first adjacent layers 128 are selectively coupled, as previously described with reference to FIG. 6D. And, selective groups of switching assemblies in the pair of second adjacent layers 144 are selectively coupled, as previously described with reference to FIG. 6E. Finally, selective groups of switching assemblies in the last adjacent layers 806 are selectively coupled, with 8 switching assemblies in each subgroup, and each group is formed by 8 switching assemblies in the second intermediate layer 804 and 8 switching assemblies in the last layer 126. The connection path between switching assemblies in each group will be performed, as previously described with reference to FIGS. 6C, 6D, and 6E.

Now, referring back to FIG. 8, only four of the switching assemblies are shown in each of the first layer 124, first intermediate layer 802, second intermediate layer 804 and last layer 126. For example, first switching assemblies 120a-120d, first intermediate switching assemblies 808a-808d, second intermediate switching assemblies 810a-810d, and second switching assemblies 122a-122d are shown.

Further, selective outputs of selective second switching assemblies are coupled to selective inputs of selective first switching assemblies, by using first modified forward connection 504a. And, selective outputs of selective first switching assemblies are coupled to selective inputs of selective second switching assemblies, by using first modified reverse connection 510a. First modified forward connection 504a is determined by selectively transforming a forward output matrix to a forward input matrix, as previously described with reference to FIGS. 5B, 6, and 6A. Similarly, first modified reverse connection 510a is determined by selectively transforming a reverse output matrix to a reverse input matrix, as previously described with reference to FIGS. 5F, 6, and 6B.

First intermediate switching assembly 808a is similar to intermediate switching assembly 142a previously described with reference to FIG. 2C. Rest of the first intermediate switching assemblies in first intermediate layer 802 are similar to first intermediate switching assembly 808a. Second intermediate switching assemblies 810a is similar to intermediate switching assembly 142a previously described with reference to FIG. 2C. Rest of the second intermediate switching assemblies in second intermediate layer 804 are similar to second intermediate switching assembly 810a.

As previously described with reference to FIG. 2A, the first switching assembly 120a includes a first forward element 202a and a first reverse element 204a. Rest of the first switching assemblies in the first layer 124 are similarly constructed as the first switching assembly 120a. Further, as previously described with reference to FIG. 2B, the second switching assembly 122a includes a second forward element 230a and a second reverse element 232a. Rest of the second switching assemblies in the last layer 126 are similarly constructed as the second switching assembly 122a.

Figure 8A:
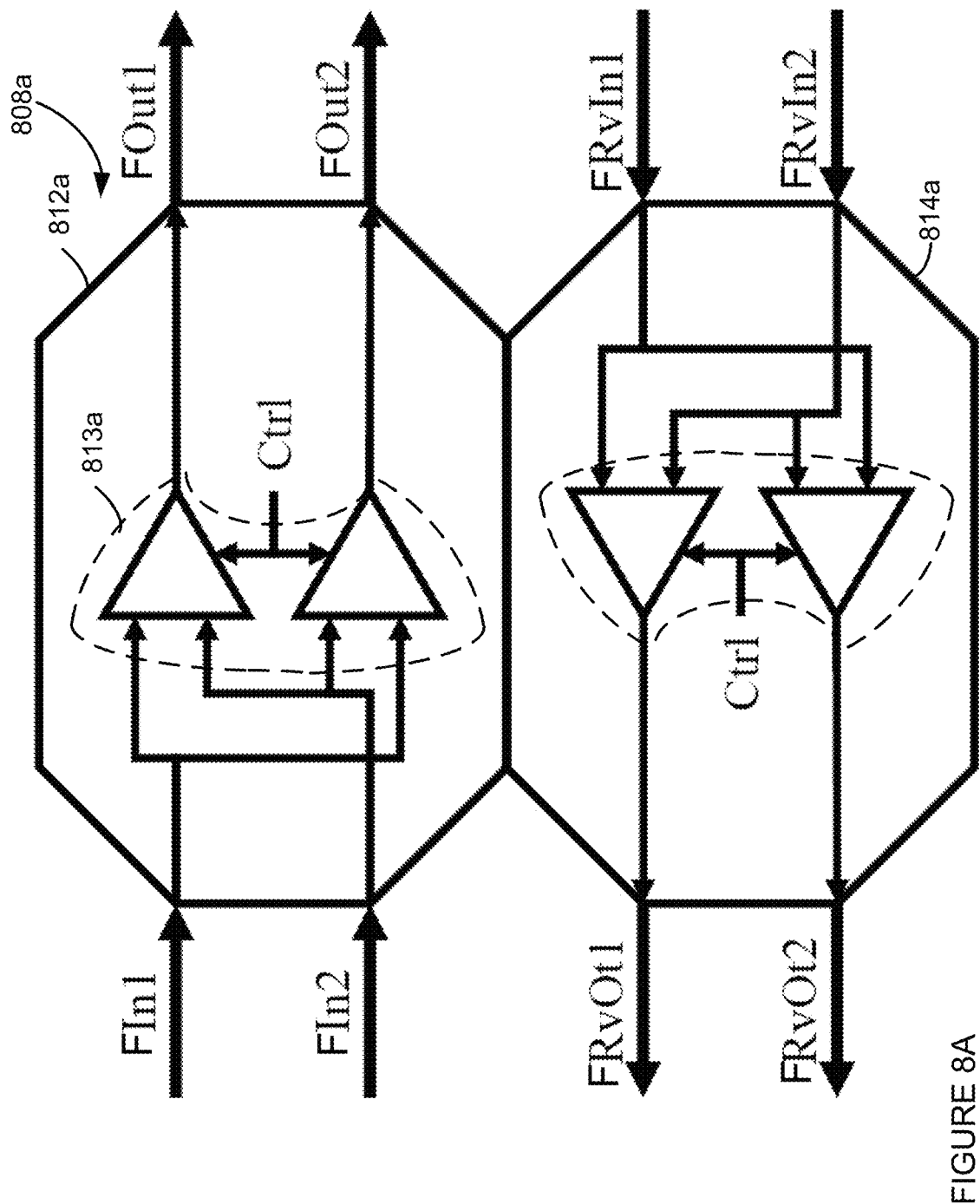
FIG. 8A shows an example first intermediate switching assembly of the example switching network of FIG. 8, according to one aspect of the present disclosure.

Now, referring to FIG. 8A, an example first intermediate switching assembly 808a is described. First intermediate switching assembly 808a includes a first intermediate forward element 812a and a first intermediate reverse element 814a. First intermediate forward element 812a is similar to intermediate forward element 260a and first intermediate reverse element 814a is similar to intermediate reverse element 262a. The inputs to the first intermediate forward element 812a are labeled as FIn1 and FIn2. The outputs of the first intermediate forward element 812a are labeled as FOut1 and FOut2. Similarly, the inputs to the first intermediate reverse element 814a are labeled as FRvIn1 and FRvIn2. The outputs of the first intermediate reverse element 814a are labeled as FRvOt1 and FRvOt2.

Figure 8B:
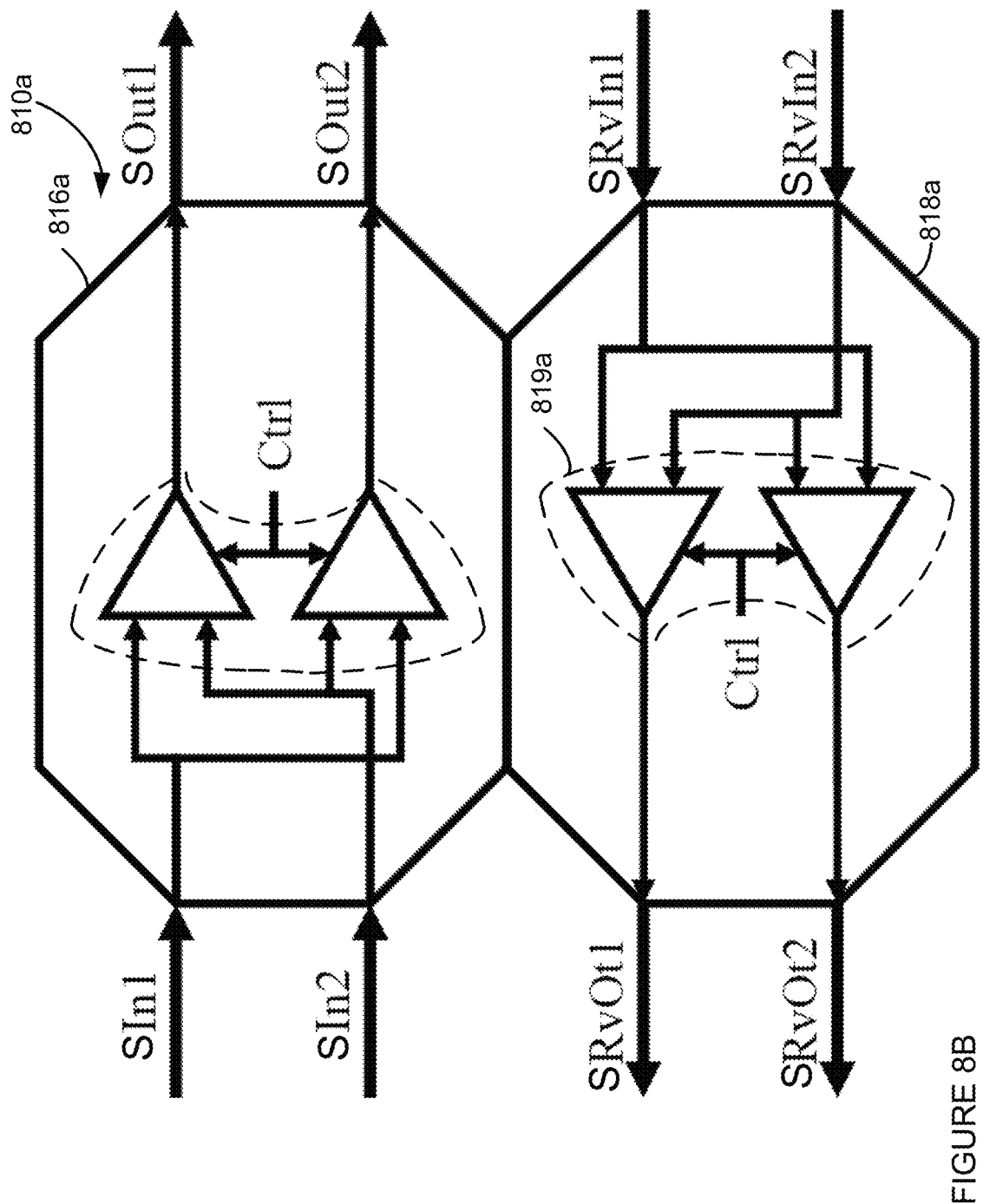
FIG. 8B shows an example second intermediate switching assembly of the example switching network of FIG. 8, according to one aspect of the present disclosure.

Now, referring to FIG. 8B, an example second intermediate switching assembly 810a is described. Second intermediate switching assembly 810a includes a second intermediate forward element 816a and a second intermediate reverse element 818a. Second intermediate forward element 816a is similar to intermediate forward element 260a and second intermediate reverse element 818a is similar to intermediate reverse element 262a. The inputs to the second intermediate forward element 816a are labeled as SIn1 and SIn2. The outputs of the second intermediate forward element 816a are labeled as SOut1 and SOut2. Similarly, the inputs to the second intermediate reverse element 818a are labeled as SRvIn1 and SRvIn2. The outputs of the second intermediate reverse element 818a are labeled as SRvOt1 and SRvOt2.

Figure 8C:
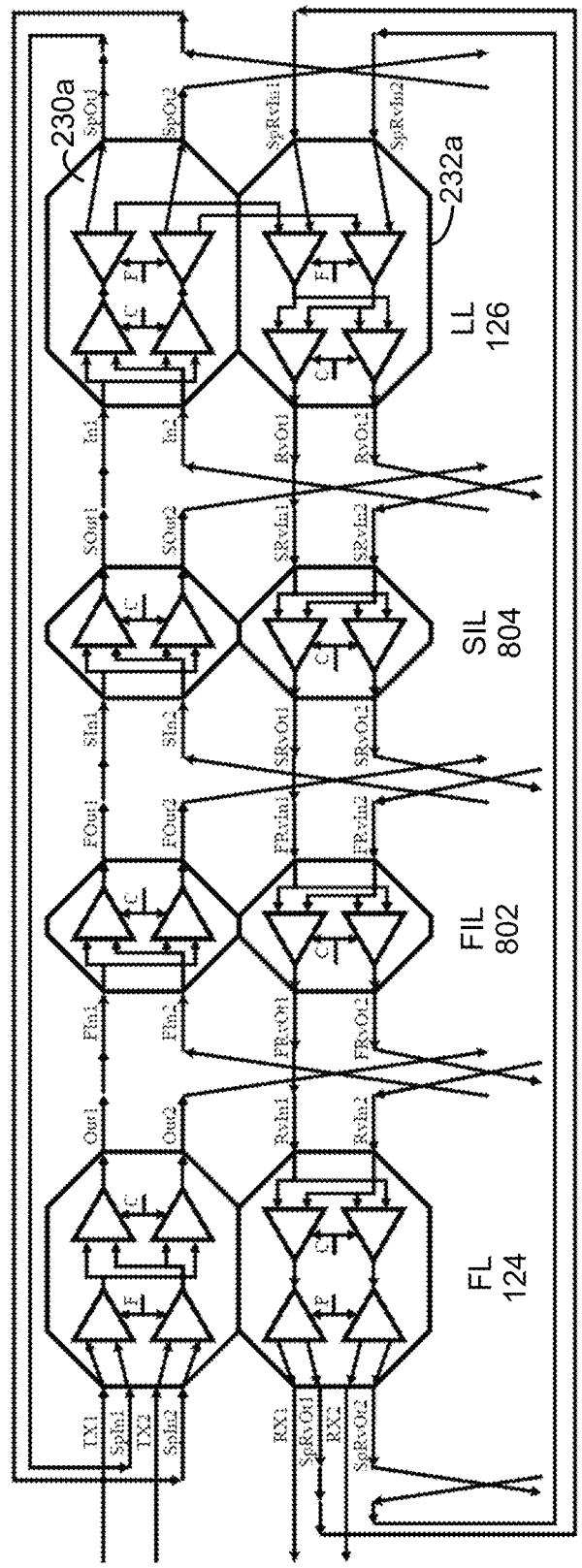
FIG. 8C shows an example flow of data from TX1 port to RX1 port of example switching network shown in FIG. 8, according to one aspect of the present disclosure.

Now, referring to FIG. 8C, an example flow of data from TX1 to RX1 is described, for the switching network 100c, as previously described with reference to FIG. 8. FIG. 8C shows the first switching assembly 120a, first intermediate switching assembly 808a, second intermediate switching assembly 810a, and second switching assembly 122a. First switching assembly 120a is part of first layer 124. Second switching assembly 122a is part of last layer 126. And, the first intermediate switching assembly 808a is part of first intermediate layer 802. And, the second intermediate switching assembly 810a is part of the second intermediate layer 804. In the first pass, the TX1 data moves to the output of first switching assembly 120a as Out1. This output is presented as input FIn1 to first intermediate switching assembly 808a. The output FOut1 of the first intermediate switching assembly 808a is presented as input SIn1 to the second intermediate switching assembly 810a. The output SOut1 of the second intermediate switching assembly 810a is presented as input In1 to the second switching assembly 122a. The input In1 received by the second switching assembly 122a comes out as output SpOt1. Next, based on the first modified forward connection 504a, this output SpOt1 is rearranged and presented as input SpIn1 to the first switching assembly 120a.

Now, in the second pass, the SpIn1 input moves to output of first switching assembly 120a as Out1. This output is presented as input FIn1 to first intermediate switching assembly 808a and comes out as output FOut1 from the first intermediate switching assembly 808a. Next, the output FOut1 from the first intermediate switching assembly 808a is applied as input SIn1 to the second intermediate switching assembly 810a and comes out as output SOut1. This output SOut1 is presented to the second switching assembly 122a as In1. The input In1 received by the second switching assembly 122a is looped back inside the second switching assembly, from second forward element 230a to second reverse element 232a.

Now, in the third pass, the looped back input to second reverse element 232a comes out of second switching assembly 122a as output RvOt1. This output is fed as input SRvIn1 to the second intermediate switching assembly 810a and comes out as output SRvOt1. This output SRvOt1 is fed to the first intermediate switching assembly 808a as FRvIn1 and comes out as FRvOt1. This output FRvOt1 is fed to the RvIn1 input of the first switching assembly 120a, and comes out as output SpRvOt1. Next, based on the first modified reverse connection 510a, this output SpRvOt1 is rearranged and presented as input SpRvIn1 to the second switching assembly 122a.

Now, in the fourth pass, the SpRvIn1 input moves to output of second switching assembly 122a as RvOt1. This output is presented as input SRvIn1 to the second intermediate switching assembly 810a and comes out as output SRvOt1. The output SRvOt1 from the second intermediate switching assembly 810a is then fed to first intermediate switching assembly 808a as input FRvIn1. The input FRvIn1 comes out of the first intermediate switching assembly 808a as FRvOt1. The output FRvOt1 is fed to the first switching assembly 120a as input RvIn1. Input RvIn1 received by the first switching assembly 120a is output as output RX1. This concludes the flow of data presented at input TX1 flowing through the first switching assembly 120a, first intermediate switching assembly 808a, second intermediate switching assembly 810a and second switching assembly 122a and comes out as output at RX1.

Having described example construction and operation of a four-layer switching network, with two layers of intermediate switching assemblies, other switching networks with multiple layers of intermediate switching assemblies may be constructed. In such an example, there will be multiple pairs of adjacent layers, with a first adjacent layer including first layer of a bank of first switching assembly, and first intermediate layer of a bank of first intermediate switching assemblies. And, a last adjacent layer including a last intermediate layer of a bank of last intermediate switching assemblies and last layer of a bank of second switching assembly. One or more additional intermediate layers will include one or more banks of additional intermediate switching assemblies and may be disposed between the first adjacent layer and the last adjacent layer. Each pair of additional adjacent intermediate layers will define additional intermediate adjacent layers.

As previously described, if we number adjacent layers in sequence as AL1, AL2, . . . , ALx, the number of switching assemblies in each subgroup of adjacent layer ALx will be $2^x$. As an example, for an adjacent layer 3, the number of switching assemblies in each subgroup will be 8, as shown in column 644 of table 620 in FIG. 6C. And, selective subgroups of switching assemblies in each adjacent layer form a group and are selectively coupled as previously described.

For example, referring back to FIG. 8, the first layer 124 and first intermediate layer 802 would define a first adjacent layer. The second intermediate layer 804 and last layer 126 would define a last adjacent layer. And, the first intermediate layer 802 and the second intermediate layer 804 would define a first additional intermediate adjacent layer.

Having described different multi-layered switching networks, for example, switching network 100b and 100c, now various performance considerations in processing a received data at one of the input ports of the switching network and delivering the received data to a designated output port will now be described.

Now, referring back to FIGS. 8 and 8C, we notice that in the switching network 100c, the received data at TX1 port is processed by the switching network and selectively delivered at designated output port, which, in this example, is output port RX1. Let us assume that processing of received data by each of the switching assemblies requires 0.1 microsecond (μs). In the example switching network 100c, in the first pass, the received data passes through four switching assemblies (120a, 808a, 810a, and 122a) in the forward direction. Pass through each of the switching assemblies 120a, 808a, 810a, and 122a during the first pass are labeled F1, F2, F3, and F4 respectively.

In the second pass, the received data passes through four switching assemblies (120a, 808a, 810a, and 122a) in the forward direction and loops back in the fourth switching assembly. Pass through each of the switching assemblies 120a, 808a, 810a, and 122a during the second pass are labeled F5, F6, F7, and F8 respectively.

In the third pass, the received data passes through four switching assemblies (122a, 810a, 808a, and 120a) in the reverse direction. Pass through each of the switching assemblies 122a, 810a, 808a, and 120a in reverse direction during the third pass are labeled DL1, R7, R6, and R5 respectively.

Finally, in the fourth pass, the received data passes through four switching assemblies (122a, 810a, 808a, and 120a) in the reverse direction and comes out of the RX1 output of first switching assembly 120a. Pass through each of the switching assemblies 122a, 810a, 808a, and 120a in reverse direction during the fourth pass are labeled R4, R3, R2, and R1 respectively.

In summary, the received data passes through 4+4+4+4=16 switching assemblies. If each of the switching assembly takes 0.1 μs, then, a total of 1.6 μs is needed to process the received data at an input port to be delivered at an output port. If we are processing 1000 input data through the switching network 100c, it will take a total of 1000×1.6 μs=1600 μs or 1.6 ms (millisecond). So, total execution time Ttot for P=1000 input data will be P×(total execution time per data)=1000×1.6 μs=1600 μs or 1.6 ms. In such an example, a clock cycle with a clock pulse width of 1.6 μs may be used, so that the received data at one of the input ports is delivered at one of the designated output port, at the end of the clock cycle. As one skilled in the art appreciates, in such an implementation, subsequent received data can only be processed by the switching network 100c, after 1.6 μs. In general, the processing of the received data goes through a single stage of F1, F2, F3, F4, F5, F6, F7, F8, DL1, R7, R6, R5, R4, R3, R2, and R1, in this example.

In some examples, it may be beneficial to divide the processing of received data into a plurality of sequential stages. In other words, dividing the processing of received data into multiple stages. In one example, processing of one or more of plurality of additional received data may be initiated, before completion of processing of the first received data through sixteen switching assemblies. In order to permit such a processing of one or more of plurality of additional received data, we have to use one or more stage registers to temporarily store the processed received data after each stage. In one example, one or more stage registers are selectively disposed in the first switching assemblies, first intermediate switching assemblies, second intermediate switching assemblies and second switching assemblies. Now, some example implementation with one or more stage registers will be described.

Example 1

Figure 8D:
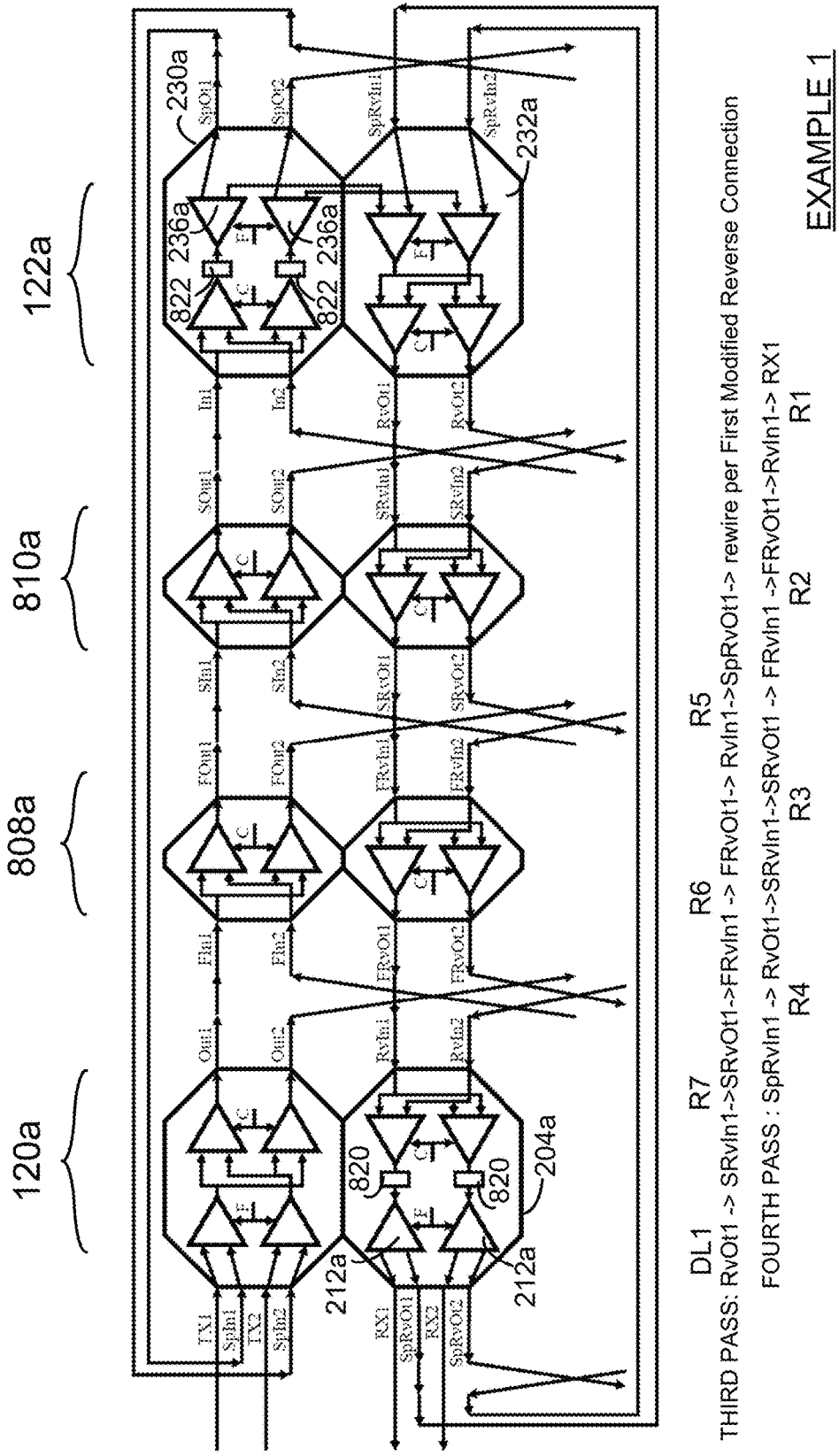
FIG. 8D shows an example switching network, with at least one stage register, according to one aspect of the present disclosure.

Now, referring to FIG. 8D, a first example of implementing one or more stage registers is described. In this example, the received data is processed in five stages, with two stage registers. A first reverse stage register 820 is disposed in the first reverse element 204a, before the first output selector 212a. A second forward stage register 822 is disposed in the second forward element 230a, before the second output selector 236a. In this example, five stages are (F1-F4), (F5-F8), (DL1, R7-R5), (R4-R1), and (O/P). In this example, last stage O/P is required, as the first reverse stage register 820 is disposed before the first output selector 212a, so, one more clock cycle is needed to get the received data to the output of first switching assembly 120a. A stage delay is defined as the maximum time required to process the received data through each of the stages. As previously described, processing through each switching assembly takes 0.1 μs. Stages (F1-F4), (F5-F8), (DL1, R7-R5) and (R4-R1) have four switching assemblies each and stage (O/P) goes through a partial switching assembly. The maximum time required to process is defined by stages (F1-F4), (F5-F8), (DL1, R7-R5), and (R4-R1) with four switching assemblies. Therefore, in this example, the stage delay is 0.4 μs.

Now, referring to FIG. 8E, an example table 824 is described. Table 824 shows progression of a sequence of received data D1, D2, D3, D4, etc. through various stages of the switching network. Column 826 shows the clock cycles, for example, clock cycles 0 through 11. Column 828 shows received input data. Columns 830-838 show progression of the received input data as clock cycles increment. Stages (F1-F4) and (F5-F8) use second forward stage register 822 to temporarily store the processed received data. Stages (DL1, R7-R5) and (R4-R1) use first reverse stage register 820 to temporarily store the processed received data. Cells in each of the columns 830, 832, 834, 836, and 838 show specific received data at the end of a corresponding clock cycle.

For example, referring to row 840, at the end of clock cycle 0, received input data D1 has passed through stage (F1-F4) and stored in second forward stage register 822. Now, referring to row 842, at the end of clock cycle 2, the received input data D1 has passed through stage (DL1, R7-R5) and stored in first reverse stage register 820. Further, at the end of clock cycle 2, the received input data D2 has passed through stage (F1-F4) and stored in second forward stage register 822. Now, referring to row 844, we notice that at the end of clock cycle 4, the received input data D1 has passed through the O/P stage and available at the output. Similarly, referring to row 846, at the end of clock cycle 6, the received input data D2 has passed through the O/P stage and available at the output. We further notice that the received input data D3, and D4 are available at the output at the end of clock cycle 8 and clock cycle 10 respectively. In summary, we notice that the first received data D1 is available at the output after five clock cycles. And, subsequent received data D2, D3, D4 etc. are available at the output at the end of subsequent two clock cycles.

Now, as previously described, stage delay in this example is 0.4 µs. Difference in number of clock cycles for consecutive outputs is 2, except the first output that takes 3 additional clock cycles, for a total of 5 clock cycles. So, in this example, the pipeline execution time Ttot=((Incremental time for first output)×(stage delay))+(P×(cycles per output)× (stage delay)), for P number of received inputs. In this example, Ttot=(1×(5−2)×0.4)+(P×2×0.4) µs. So, for processing 1000 received inputs, in this example, the total pipeline execution time is Ttot=(1×(3)×0.4)+(1000×2×0.4) µs, which is equal to 801.2 µs or 0.8012 ms. As previously described, this is a significant improvement over a single stage switching network, which had a total execution time Ttot of 1600 µs.

Now, another example implementation will be described.

Example 2

Figure 8F:
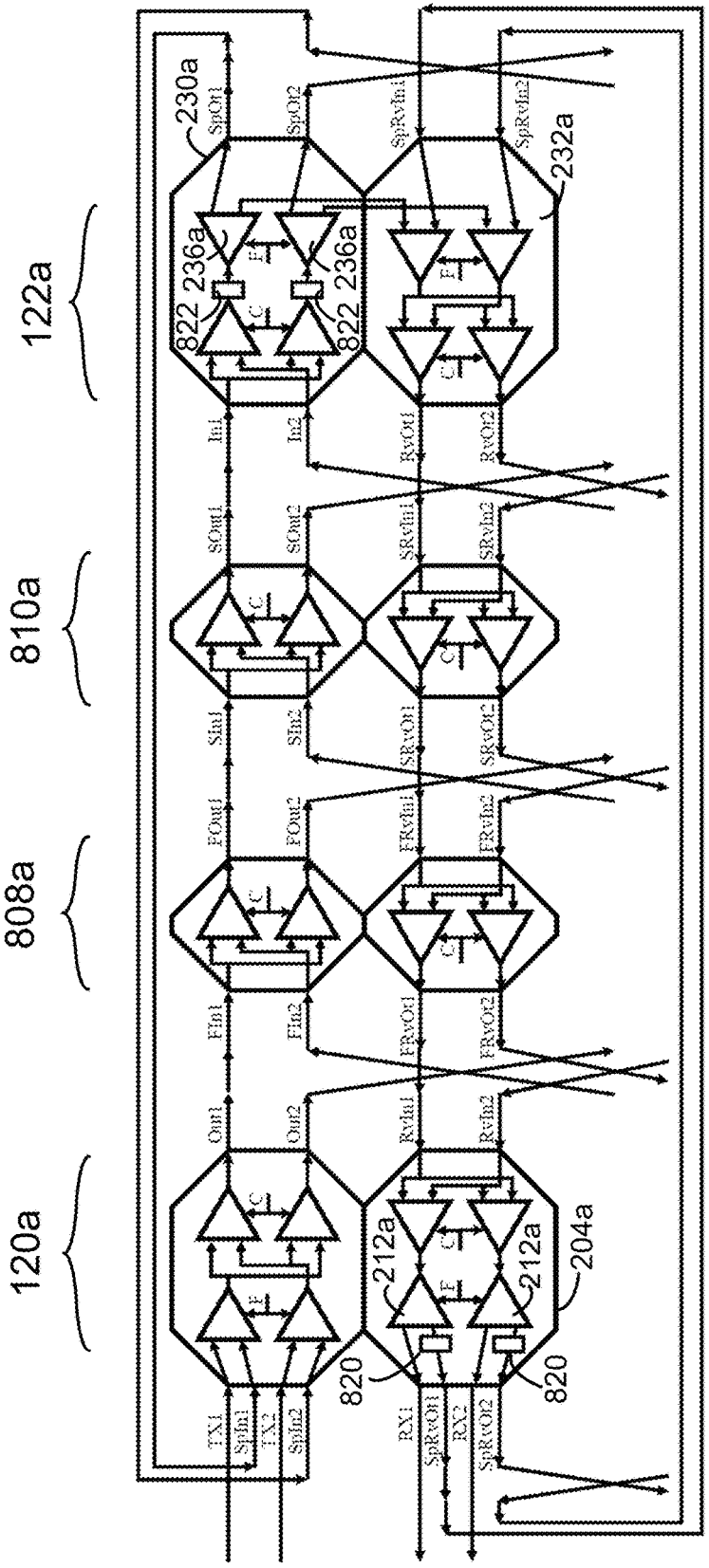
FIG. 8F shows another example switching network, with at least one stage register, according to one aspect of the present disclosure.

Now, referring to FIG. 8F, a second example of implementing one or more stage registers is described. In this example, the received data is processed in four stages, with two stage registers. A first reverse stage register 820 is disposed in the first reverse element 204a, after the first output selector 212a, only for the outputs corresponding to SpRvOt1 and SpRvOt2. A second forward stage register 822 is disposed in the second forward element 230a, before the second output selector 236a. In this example, four stages are (F1-F4), (F5-F8), (DL1, R7-R5), and (R4-R1-O/P). A stage delay is defined as the maximum time required to process the received data through each of the stages. As previously described, processing through each switching assembly takes 0.1 µs. Stages (F1-F4), (F5-F8), (DL1, R7-R5) and (R4-R1-O/P) have four switching assemblies each. The maximum time required to process is defined by stages (F1-F4), (F5-F8), (DL1, R7-R5), and (R4-R1-O/P) with four switching assemblies. Therefore, in this example, the stage delay is 0.4 µs.

Figure 8G:
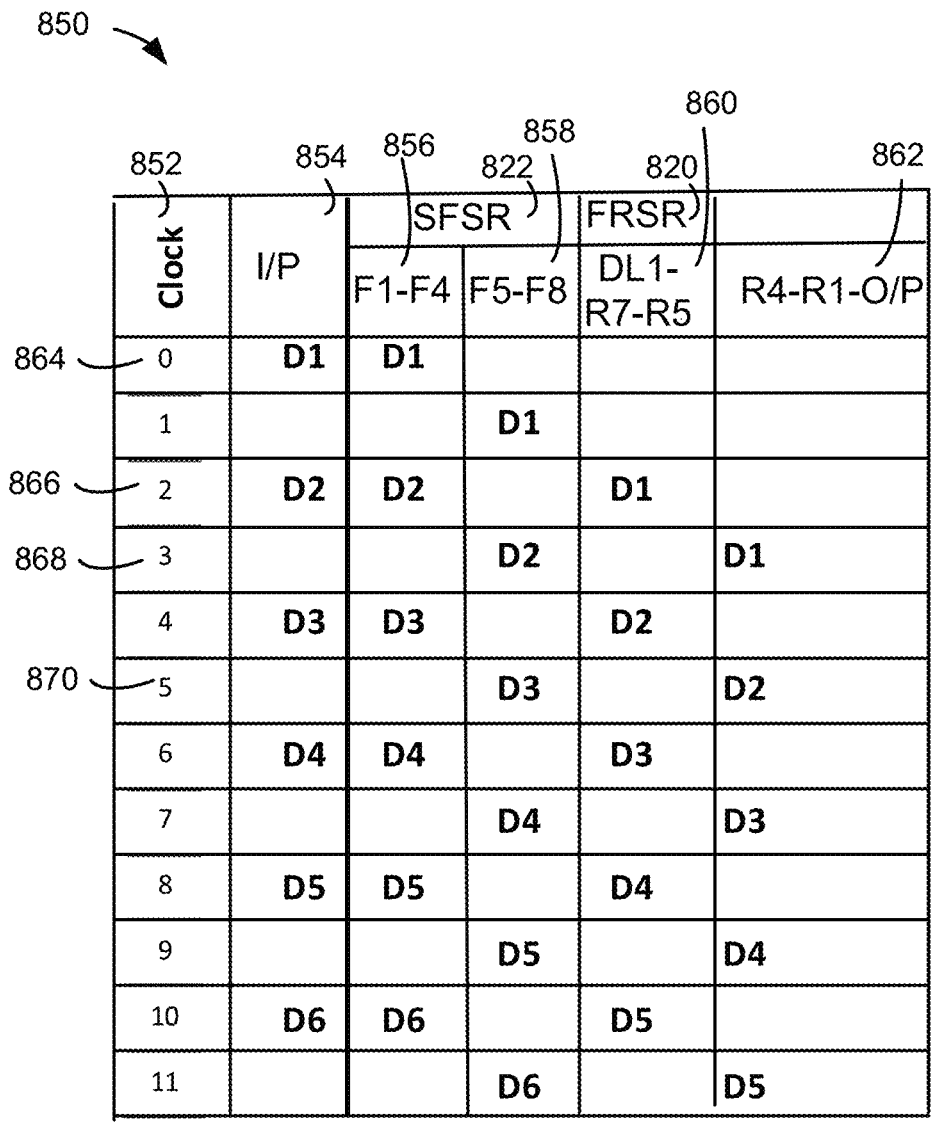
FIG. 8G shows an example table, showing data flow through the switching network of FIG. 8F.

Now, referring to FIG. 8G, an example table 850 is described. Table 850 shows progression of a sequence of received data D1, D2, D3, D4 etc. through various stages of the switching network. Column 852 shows the clock cycles, for example, clock cycles 0 through 11. Column 854 shows received input data. Columns 856-862 show progression of the received input data as clock cycles increment. Stages (F1-F4) and (F5-F8) use second forward stage register 822 to temporarily store the processed received data. Stages (DL1, R7-R5) use first reverse stage register 820 to temporarily store the processed received data. Unlike in Example 1, in this example, fourth stage (R4-R1-O/P) does not use any stage registers. Cells in each of the columns 856, 858, 860, and 862 show specific received data at the end of a corresponding clock cycle.

For example, referring to row 864, at the end of clock cycle 0, received input data D1 has passed through stage (F1-F4) and stored in second forward stage register 822. Now, referring to row 866, at the end of clock cycle 2, the received input data D1 has passed through stage (DL1, R7-R5) and stored in first reverse stage register 820. Further, at the end of clock cycle 2, the received input data D2 has passed through stage (F1-F4) and stored in second forward stage register 822. Now, referring to row 868, we notice that at the end of clock cycle 3, the received input data D1 has passed through the (R4-R1-O/P) stage and available at the output. Similarly, referring to row 870, at the end of clock cycle 5, the received input data D2 has passed through the (R4-R1-O/P) stage and available at the output. We further notice that the received input data D3, and D4 are available at the output at the end of clock cycle 7 and clock cycle 9 respectively. In summary, we notice that the first received data D1 is available at the output after four clock cycles. And, subsequent received data D2, D3, D4 etc. are available at the output at the end of subsequent two clock cycles.

Now, as previously described, stage delay in this example is 0.4 µs. Difference in number of clock cycles for consecutive outputs is 2, except the first output that takes 2 additional clock cycles, for a total of 4 clock cycles. So, in this example, the pipeline execution time Ttot=((Incremental time for first output)×(stage delay))+(P×(cycles per output)× (stage delay)), for P number of received inputs. In this example, Ttot=(1×(4−2)×0.4)+(P×2×0.4) µs. So, for processing 1000 received inputs, in this example, the total pipeline execution time is Ttot=(1×(2)×0.4)+(1000×2×0.4) µs, which is equal to 800.8 µs or 0.8008 ms. As previously described, this is a significant improvement over a single stage switching network, which had a total execution time Ttot of 1600 µs. And, as compared to Example 1, total execution time Ttot for this example is 0.4 µs better. As one skilled in the art appreciates, this is due to the fact that first output comes one clock cycle earlier in this Example 2, as compared to Example 1.

Example 3

Figure 8H:
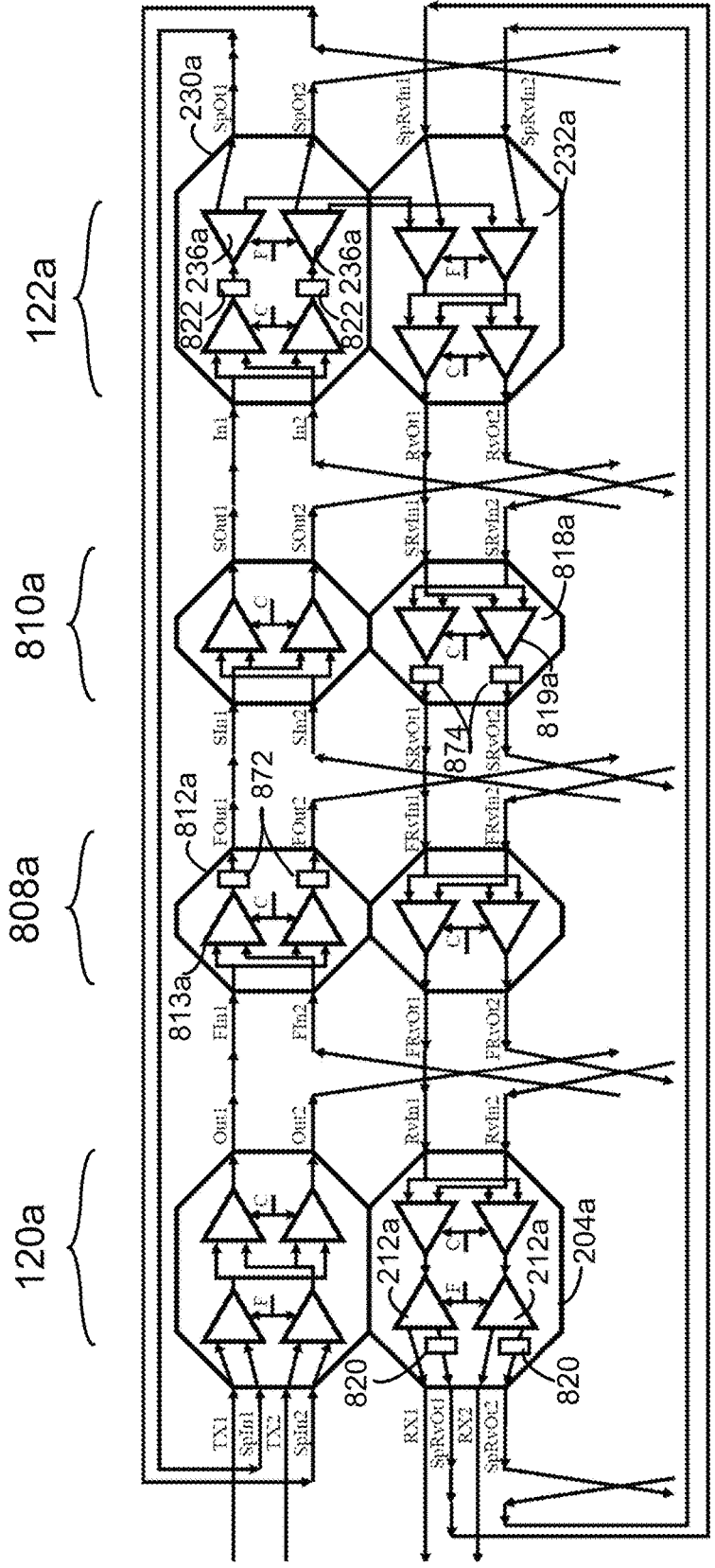
FIG. 8H shows yet another example switching network, with at least one stage register, according to one aspect of the present disclosure.

Now, referring to FIG. 8H, a third example of implementing one or more stage registers is described. In this example, the received data is processed in eight stages, with four stage registers. A first reverse stage register 820 is disposed in the first reverse element 204a, after the first output selector 212a, only for the outputs corresponding to SpRvOt1 and SpRvOt2. A second forward stage register 822 is disposed in the second forward element 230a, before the second output selector 236a. A first forward stage register 872 is disposed in the first intermediate forward element 812a, after the first intermediate forward switch 813a. A second reverse stage register 874 is disposed in the second intermediate reverse element 818a, after the second intermediate reverse switch 819a. In this example, eight stages are (F1-F2), (F3-F4), (F5-F6), (F7-F8), (DL1-R7), (R6-R5), (R4-R3), and (R2-R1-O/P). A stage delay is defined as the maximum time required to process the received data through each of the stages. As previously described, processing through each switching assembly takes 0.1 µs. Maximum number of switching assemblies in each stage, in this example, is two. Therefore, in this example, the stage delay is 0.2 µs.

Figure 8J:
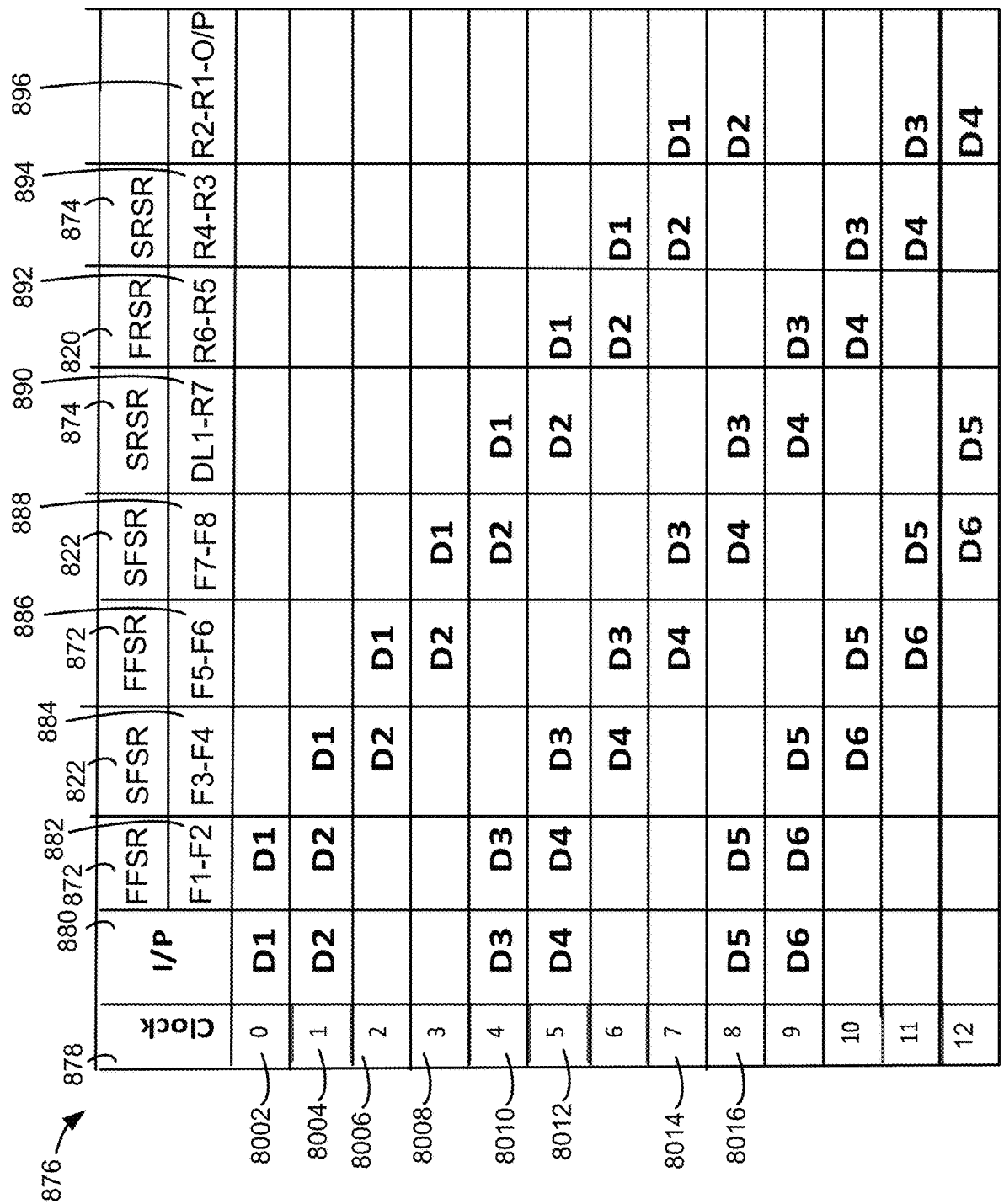
FIG. 8J shows an example table, showing data flow through the switching network of FIG. 8H.

Now, referring to FIG. 8J, an example table 876 is described. Table 876 shows progression of a sequence of received data D1, D2, D3, D4, etc. through various stages of the switching network. Column 878 shows the clock cycles, for example, clock cycles 0 through 11. Column 880 shows received input data. Columns 882-896 show progression of the received input data as clock cycles increment. Stages (F1-F2) and (F5-F6) use first forward stage register 872 to temporarily store the processed received data. Stages (F3-F4), and (F7-F8) use second forward stage register 822 to temporarily store the processed received data. Stages (DL1-R7) and (R4-R3) use second reverse stage register 874 to temporarily store the processed received data. Stage (R6-R5) use first reverse stage register 820 to temporarily store the processed received data. Unlike in Example 1, in this example, eighth stage (R2-R1-O/P) does not use any stage registers. Cells in each of the columns 882-896 show specific received data at the end of a corresponding clock cycle.

For example, referring to row 8002, at the end of cycle 0, received input data D1 has passed through stage (F1-F2) and stored in first forward stage register 872. Now, referring to row 8004, at the end of clock cycle 1, the received input data D1 has passed through stage (F3-F4) and stored in second forward stage register 822. Further, at the end of clock cycle 1, the received input data D2 has passed through stage (F1-F2) and stored in first forward stage register 872. Now, referring to row 8006, at the end of clock cycle 2, the received input data D1 has passed through stage (F5-F6) and stored in first forward stage register 872. Further, at the end of clock cycle 2, the received input data D2 has passed through stage (F3-F4) and stored in second forward stage register 822. Now, referring to row 8008, at the end of clock cycle 3, the received input data D1 has passed through stage (F7-F8) and stored in second forward stage register 822. Further, at the end of clock cycle 3, the received input data D2 has passed through stage (F5-F6) and stored in first forward stage register 872. As one skilled in the art appreciates, we can now process next received data D3 because there is no chance of collision between next received data D3 and previously received data D1 and D2 at any stage of data flow. So, we process next received data D3 at the input port. Now, referring to row 8010, at the end of clock cycle 4, the received input data D1 has passed through stage (DL1-R7) and stored in second reverse stage register 874. Further, at the end of clock cycle 4, the received input data D2 has passed through stage (F7-F8) and stored in second forward stage register 822. Further, at the end of clock cycle 4, the received input data D3 has passed through stage (F1-F2) and stored in first forward stage register 872. As one skilled in the art appreciates, we can now insert another received data, for example, D4 because there is no chance of collision between D4 and previously received data D3, D2, and D1 at any stage of data flow. So, we transmit new received data D4 at the input port. Now, referring to row 8012, at the end of clock cycle 5, the received input data D1 has passed through stage (R6-R5) and stored in first reverse stage register 820. Further, at the end of clock cycle 5, the received input data D2 has passed through stage (DL1-R7) and stored in second reverse stage register 874. Further, at the end of clock cycle 5, the received input data D3 has passed through stage (F3-F4) and stored in second forward stage register 822. Further, at the end of clock cycle 5, the received input data D4 has passed through stage (F1-F2) and stored in first forward stage register 872. Now, referring to row 8014, we notice that at the end of clock cycle 7, the received input data D1 has passed through the (R2-R1-O/P) stage and available at the output. Similarly, referring to row 8016, at the end of clock cycle 8, the received input data D2 has passed through the (R2-R1-O/P) stage and available at the output. We further notice that received input data D3 is available at the output at the end of clock cycle 11. In summary, we notice that first received data D1 is available at the output after eight clock cycles. And, subsequent received data D2 is available at the output at the end of subsequent clock cycles. And, three clock cycles thereafter, received data D3 will be available at the output. At one clock cycle thereafter, received data D4 will be available at the output. In summary, two received data is available at the output three clock cycles and one clock cycle thereafter, giving an average of two clock cycles.

Now, as previously described, stage delay in this example is 0.2 µs. Difference in number of clock cycles for consecutive outputs on an average is 2, except the first output that takes 6 additional clock cycles, for a total of 8 clock cycles. So, in this example, the pipeline execution time Ttot= ((Incremental time for first output)×(stage delay))+(P× (cycles per output)×(stage delay)), for P number of received inputs. In this example, Ttot=(1×(8-2)×0.2)+(P×2×0.2) µs. So, for processing 1000 received inputs, in this example, the total pipeline execution time is Ttot=(1×(6)×0.2)+(1000×2×0.2) µs, which is equal to 401.2 µs or 0.4012 ms. As previously described, this is a significant improvement over a single stage switching network, which had a total execution time Ttot of 1600 µs. And, as compared to Examples 1 and 2, total execution time Ttot for this example is about half. As one skilled in the art appreciates, this configuration requires two additional stage registers, but the performance is double the performance of configuration with two stage registers.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that phraseology or terminology employed herein is for the purpose of description and not of limitation.

While embodiments of the present invention are described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A switching network, including:
   a plurality of first switching assemblies;

a plurality of second switching assemblies;

a plurality of intermediate switching assemblies;

wherein, each of the first switching assemblies, intermediate switching assemblies and the second switching assemblies having at least two input ports and two output ports, selective one of the two input ports configured to receive a data to be processed by the switching network and deliver the received data at a designated one of the two output ports, wherein, each of the first switching assemblies, intermediate switching assemblies, and the second switching assemblies having a forward element and a reverse element, the forward element permits flow of the received data in a forward direction and the reverse element permits flow of the received data in a reverse direction, and wherein, the received data passes through one or more selective first switching assemblies, one or more intermediate switching assemblies and one or more selective second switching assemblies through a first pass and a second pass in the forward direction, and a third pass and a fourth pass in the reverse direction, before the received data is delivered at the designated one of the two output ports.

2. The switching network of claim 1, wherein, a plurality of additional data is received as a plurality of additional received data in one or more of the input ports to be delivered to selective one or more of the designated output ports, wherein, processing of one or more of the plurality of additional received data is initiated through the switching network, before the received data is delivered to the designated one of the output ports.

3. The switching network of claim 2, wherein, the received data received in one of the designed input ports and delivered to one of the designated output ports is processed in a plurality of sequential stages; and one or more of the plurality of additional received data is processed after the received data is processed in one or more of the plurality of sequential stages.

4. The switching network of claim 3, wherein at least one stage register is selectively disposed in selective one of the one or more of the sequential stages.

5. The switching network of claim 4, wherein the at least one stage register is selectively disposed in at least one of first switching assemblies, at least one of the intermediate switching assemblies, or at least one of the second switching assemblies in the selective one of the one or more of the sequential stages.

6. The switching network of claim 2, wherein, before a completion of the one or more of the first pass, the second pass, third pass, and the fourth pass, one or more of the plurality of additional data is processed through the switching network is initiated.

7. The switching assembly of claim 6, wherein, a path in the forward direction through the selective one of the first switching assemblies and the selective one of the second switching assemblies is independent of a path in the reverse direction through the selective one of the second switching assemblies and the selective one of the first switching assemblies.

8. The switching network of claim 4, wherein the at least one stage register is selectively disposed in at least one of first switching assemblies, and at least one of the second switching assemblies in the selective one of the one or more of the sequential stages.

9. The switching network of claim 4, wherein the at least one stage register is selectively disposed in at least one of first switching assemblies, at least one of the intermediate switching assemblies, and at least one of the second switching assemblies in the selective one of the one or more of the sequential stages.

10. A method for a switching network, including:

providing a plurality of first switching assemblies;

providing a plurality of second switching assemblies;

providing a plurality of intermediate switching assemblies;

wherein, each of the first switching assemblies, intermediate switching assemblies and the second switching assemblies having at least two input ports and two output ports, selective one of the two input ports configured to receive a data to be processed by the switching network and deliver the received data at a designated one of the two output ports, wherein, each of the first switching assemblies, intermediate switching assemblies, and the second switching assemblies having a forward element and a reverse element, the forward element permitting flow of the received data in a forward direction and the reverse element permitting flow of the received data in a reverse direction, and wherein, the received data passes through one or more selective first switching assemblies, one or more intermediate switching assemblies and one or more selective second switching assemblies through a first pass and a second pass in the forward direction, and a third pass and a fourth pass in the reverse direction, before delivering the received data at the designated one of the two output ports.

11. The method of claim 10, wherein, receiving a plurality of additional data as a plurality of additional received data in one or more of the input ports to be delivered to selective one or more of the designated output ports;

initiating processing of one or more of the plurality of additional received data through the switching network, before delivering the received data to the designated one of the output ports.

12. The method of claim 11, further including:

dividing the processing of the received data received in one of the designed input ports and delivered to one of the designated output ports into a plurality of sequential stages; and initiating processing of one or more of the plurality of additional received data after completion of processing of the received data in one or more of the plurality of sequential stages.

13. The method of claim 12, further including selectively disposing at least one stage register in selective one of the one or more of the sequential stages.

14. The switching network of claim 13, further including, selectively disposing the at least one stage register in at least one of first switching assemblies, at least one of the intermediate switching assemblies, or at least one of the second switching assemblies in the selective one of the one or more of the sequential stages.

15. The method of claim 11, wherein, before a completion of the one or more of the first pass, the second pass, third pass, and the fourth pass, initiating processing of one or more of the plurality of additional data through the switching network.

16. The method of claim 15, wherein, a path in the forward direction through the selective one of the first switching assemblies and the selective one of the second switching assemblies is independent of a path in the reverse direction through the selective one of the second switching assemblies and the selective one of the first switching assemblies.

17. The method of claim 13, further including, selectively disposing the at least one stage register in at least one of first switching assemblies, and at least one of the second switching assemblies in the selective one of the one or more of the sequential stages.

18. The method of claim 13, further including, selectively disposing the at least one stage register in at least one of first switching assemblies, at least one of the intermediate switching assemblies, and at least one of the second switching assemblies in the selective one of the one or more of the sequential stages.

\* \* \* \* \*